US006248686B1

(12) United States Patent
Inagaki et al.

(10) Patent No.: US 6,248,686 B1
(45) Date of Patent: Jun. 19, 2001

(54) ORGANIC/INORGANIC COMPLEX POROUS MATERIALS

(75) Inventors: Shinji Inagaki; Shiyou Guan; Yoshiaki Fukushima, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/347,005

(22) Filed: Jul. 2, 1999

(30) Foreign Application Priority Data

Jul. 3, 1998 (JP) .................................... 10-204346
Jun. 16, 1999 (JP) .................................... 11-208074

(51) Int. Cl.[7] .............................. B01J 21/00; B01J 21/08; B01J 32/00; B01J 101/40
(52) U.S. Cl. ......................... 502/158; 502/401; 502/407; 556/410; 556/431; 556/434
(58) Field of Search ..................................... 423/210, 325, 423/335, 703; 502/62, 64, 65, 66, 71, 158, 232, 407, 415

(56) References Cited

U.S. PATENT DOCUMENTS 5,599,759 * 2/1997 Inagaki et al. ...................... 502/80
5,869,724 * 2/1999 Kirkland et al. .................... 556/410

FOREIGN PATENT DOCUMENTS

WO 98/34723    8/1998   (WO) .

* cited by examiner

Primary Examiner—Mark L. Bell
Assistant Examiner—Michael J. DiVerdi
(74) Attorney, Agent, or Firm—Oblon, Spivak, McClelland, Maier & Neustadt, P.C.

(57) ABSTRACT

Organic/inorganic complex porous materials are disclosed having a main skeletal chain containing metal atoms, oxygen atoms, and organic groups. Preferably, the metal atoms, oxygen atoms and organic groups are bound by ionic bonds and/or covalent bonds, and the organic group is bound to at least two metal atoms in the main chain of the skeleton of the porous material. More preferably, 60% or more of the total pore volume in the porous material has a pore diameter in a range of ±40% of the pore diameter, as determined from the maximum peak in a pore size distribution curve. Alternatively, at least one peak is present at a diffraction angle that preferably corresponds to a d value of at least 1 nm in an x-ray diffraction pattern. Method of making such organic/inorganic complex materials are also disclosed.

26 Claims, 53 Drawing Sheets

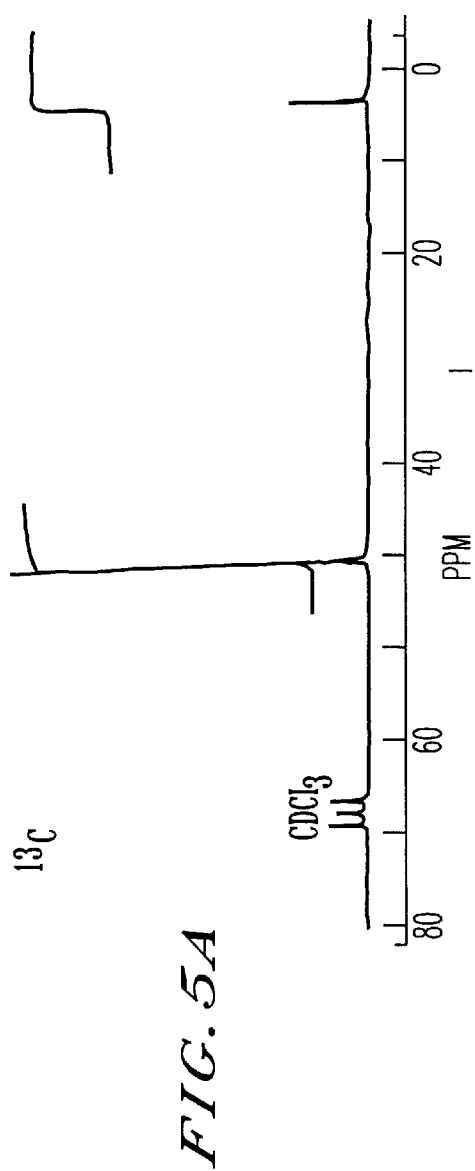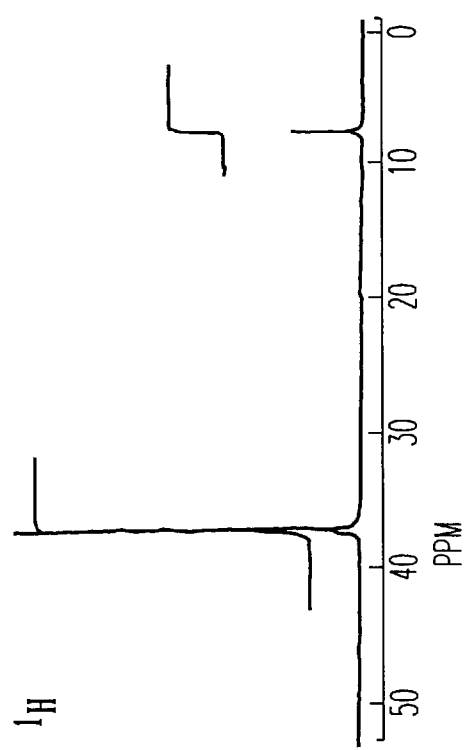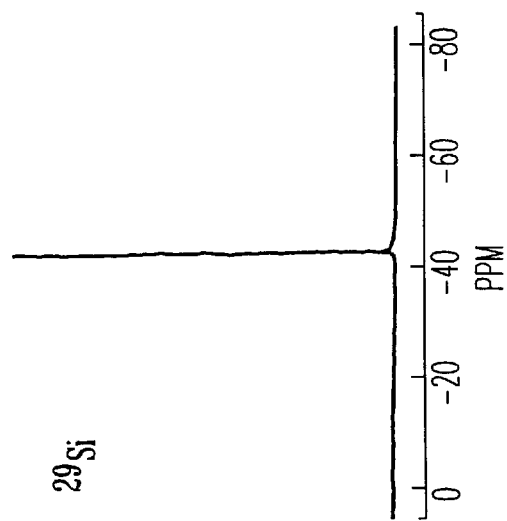
FIG. 5A
FIG. 5B
FIG. 5C

| SAMPLE | $(R^2O)_3Si-R^1-Si(OR^2)_3$ | | | $C_{16}S$ | $C_{16}S/Si$ | $C_{16}S/H_2O/6N\ NaOH$ |
|---|---|---|---|---|---|---|
| | $-R^1-$ | $R^2$ | g(mmol) | g(mmol) | (mmol tt) | (g/g/g) |
| 61 | $-CH_2-$ | Et | 1.277(3.75) | 0.216(0.675) | 0.09 | 0.216/15/0.75 |
| 62 | $-C_2H_4-$ | Et | 1.33(3.75) | 0.216(0.675) | 0.09 | 0.216/15/0.75 |
| 63 | $-C_2H_4-$ | Me | 2.03(7.5) | 0.432(1.35) | 0.09 | 0.432/30/1.5 |
| 64 |  | Et | 0.661(1.875) | 0.108(0.338) | 0.09 | 0.108/7.5/0.375 |
| 65 |  | Et | 0.775(1.875) | 0.108(0.338) | 0.09 | 0.108/7.5/0.375 |
| 66 | | Et | 0.377(0.936) | 0.108(0.338) | 0.18 | 0.108/7.5/0.375 |
| 67 |  | Et | 0.755(1.875) | 0.054(0.169) | 0.045 | 0.054/7.5/0.375 |

| SAMPLE | $(R^2O)_3Si-R^1-Si(OR^2)_3$ | | $C_{18}S$ | $C_{18}S/Si$ | $C_{18}S/H_2O/6N\ NaOH$ |
|---|---|---|---|---|---|
| | $-R^1-$ | $R^2$ g(mmol) | g(mmol) | (mmol/t) | (g/g/g) |
| 68 | $-CH_2-$ | Et 1.427(4.19) | 0.833(2.397) | 0.29 | 0.833/25/2.0 |
| 69 | $-C_2H_4-$ | Et 1.486(4.19) | 0.833(2.394) | 0.29 | 0.833/25/2.0 |
| 70 | $-C_2H_4-$ | Me 2.266(8.379) | 1.667(4.788) | 0.29 | 0.833/50/2.0 |
| 71 | $-C_2H_4-\text{C}_6\text{H}_4-C_2H_4-$ | Me 1.569(4.19) | 0.833(2.394) | 0.29 | 0.833/25/2.0 |
| 72 | $\text{-CH=CH-}$ (trans) | Et 1.477(4.19) | 0.833(2.394) | 0.29 | 0.833/25/2.0 |
| 73 | $-\text{C}_6\text{H}_4-$ | Et 1.687(4.19) | 0.833(2.394) | 0.29 | 0.833/25/2.0 |

*FIG. 55*

ORGANIC/INORGANIC COMPLEX POROUS MATERIALS

BACKGROUND OF THE INVENTION

1. Field of the Invention

The present invention relates to porous materials that can be used as adsorption materials for concentration of organic substances and/or separation of undesired substances, and as catalyst materials for selective catalytic reactions. The porous materials comprise organic groups integrated into the inorganic porous structure.

2. Description of the Related Art

Known mesoporous molecular sieves (hereinafter, referred to as mesoporous materials) consist of an inorganic oxide porous substance and have a pore diameter of 1.5 to 30 nm, which is larger than known zeolite pore diameters. The pore size distribution is generally uniform and the pores are regularly arranged. The pore structure of such mesoporous materials is large enough to absorb large molecules and the pore wall structure can be as thin as about 1 nm. Further, such mesoporous materials are known to have large specific surface areas (about 1000 m$^2$/g) and large pore volumes (about 1 cc/g). For these reasons, such mesoporous materials enable reactive catalysts, adsorbents composed of a functional organic compound and other molecules to rapidly diffuse into the pores and are therefore, advantageous over zeolites, which have smaller pore sizes. Consequently, such mesoporous materials have been used in high-speed catalytic reactions that require fast reactions and as large capacity adsorbents, which are capable of adsorbing a large amount of an adsorbing material.

Examples of such mesoporous materials are FSM-16 (T. Yanagisawa et al., Bull. Chem. Soc., Jpn., 63,988 (1990), S. Inagaki et al., J. Chem. Soc., Chem. Commun., 680 (1993)) and the M41Ss (e.g., MCM-41, MCM-48) (C. T. Kresge et al., Nature, 359,710 (1992), J. S. Beck et al., J. Am. Chem. Soc., 114, 10834 (1992)).

PCT publication No. WO9834723 describes trials that were conducted in which an organic group was attached onto the surface of an inorganic skeleton of these mesoporous materials, namely onto the inner surface of a pore, so as to impart a selective adsorption ability and specific catalyst function to the mesoporous substance. Another trial was conducted in which organic groups were introduced during the synthesis the mesoporous material. Such mesoporous materials were formed with organic groups bound as side chains to the base skeleton made of the inorganic material. Specifically, the organic groups were suspended from the surface of the base skeleton made of the inorganic material. Consequently, the pore wall was basically composed of a skeleton made of inorganic materials and the organic groups project from the surface of the pore wall to form a layer composed of the organic groups.

In such a structure, the surface characteristics of the porous material may be determined by the characteristics of the organic groups. As a result, such porous materials were restricted to adsorbing substances to which the organic groups have affinities. Further, catalytic function or adsorption function derived from the inorganic skeleton can be masked, because the catalytic active sites or adsorption sites in the inorganic skeleton are covered by the organic groups.

The thickness of the pore wall also may increase corresponding to the introduction of the organic group, and substantial decreases in pore diameter and pore volume may result. Further, such organic groups may release under high temperatures or in a catalytic reaction and adsorption reaction, thus leading to the loss of desirable surface properties and the contamination of the treated material by the released organic group.

SUMMARY OF THE INVENTION

Therefore, one object of the present teachings is to provide improved mesoporous materials that contain one or more organic groups integral to the structure of the mesoporous materials.

Preferably, complex porous materials are taught that comprise a skeleton of the porous material containing at least two metal atoms, at least one oxygen atom and at least one organic group. Naturally, the organic group contains at least one carbon atom. The metal atoms, oxygen atoms and organic groups may be bound by ionic bonds and/or covalent bonds. More preferably, the organic group is covalently bound to at least two metal atoms. Most preferably, the oxygen atom is bound to at least one metal atom.

In such a porous material, the organic group is integrated into at least a part of the porous skeleton and the base skeleton itself has a hybrid composition composed of organic and inorganic materials. As a result, a porous material can be synthesized having a novel organic/inorganic structure, because the organic group is integrally bound with in the skeleton by at least two metal atoms. Consequently, the organic group forms a part of the skeleton and porous materials are taught in which the organic group is held within the porous material in a stable manner.

One advantage of such a porous material is that the pore walls exhibit properties of the organic group without utilizing a surface organic layer. Further, the introduction of the organic group into the porous material does not substantially reduce the pore diameter and pore volume, as is the case for porous materials formed with a surface organic layer.

Preferably, 60% or more of the total pore volume in the porous material has a pore diameter in a range of ±40% of the pore diameter revealing the maximum peak in a pore size distribution curve or at least one peak is present at a diffraction angle that preferably corresponds to a d value of at least 1 nm in an x-ray diffraction pattern. When the pore volume distribution is in this range or at least one peak is present at a specific diffraction angle in the x-ray diffraction (XRD) pattern, the porous material functions as a useful molecular sieve and may be an excellent adsorbent and/or catalyst material.

Methods for producing such porous materials are also taught. Preferably, such porous materials are synthesized using a polycondensation reaction of an organometallic compound having at least one organic group bound to at least two metal atoms. Preferably, at least one hydrolysis group also is bound to the metal atom of the organometallic compound. Further, the polycondensation reaction is preferably performed in the presence of a surfactant. If such an organometallic compound is polycondensed using the surfactant as a template, a porous material can be obtained as a polycondensate having a metal atom-organic group bond in a main chain, because the organometallic compound contains the metal atom-organic group bond.

Other objects, features and advantages of the present invention will be readily understood by a person of skill in the art after reading the following detailed description together with the drawings and claims.

BRIEF DESCRIPTION OF THE DRAWINGS

FIG. 5A shows the $^{13}$C-NMR spectra of BTMe synthesized in Example 1;

FIG. 5B shows the $^{29}$Si-NMR spectra of BTMe synthesized in Example 1;

FIG. 5C shows the $^{1}$H-NMR spectra of BTMe synthesized in Example 1;

FIG. 55 is a view showing raw materials and mixture ratio for samples 68 to 73 prepared in Example 18;

DETAILED DESCRIPTION OF THE INVENTION

Figure 1:
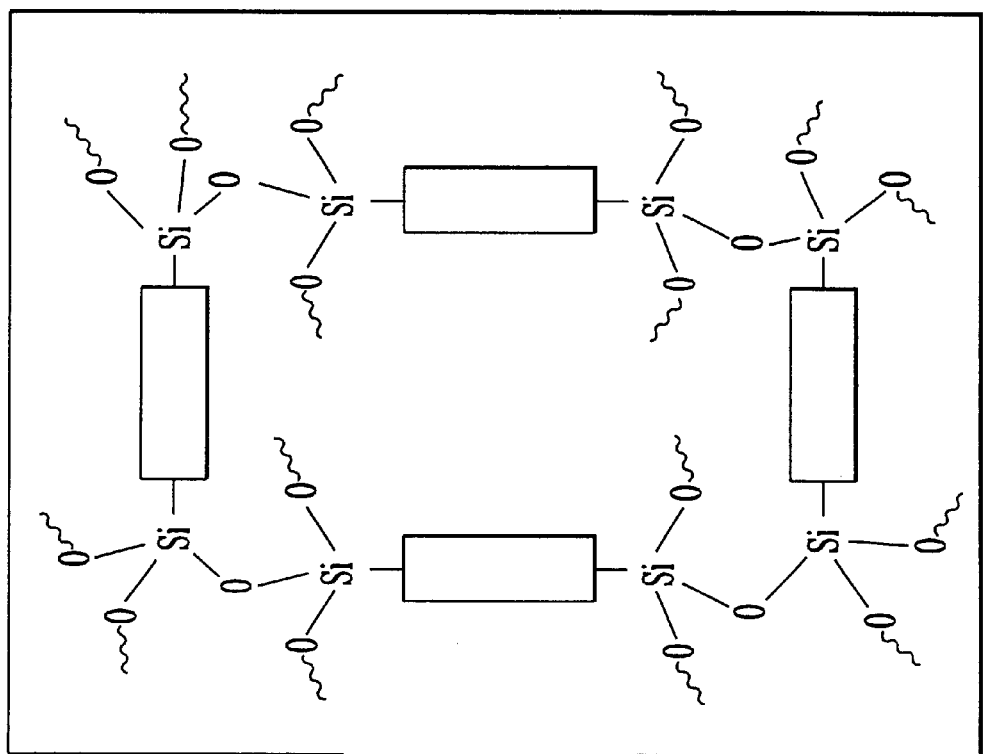
FIG. 1 is a schematic view showing the structure of a preferred composition that forms the pore wall of a porous material.
Figure 1:
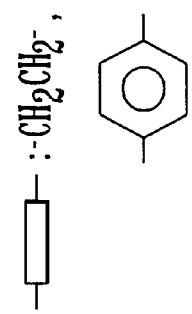
Figure 1:
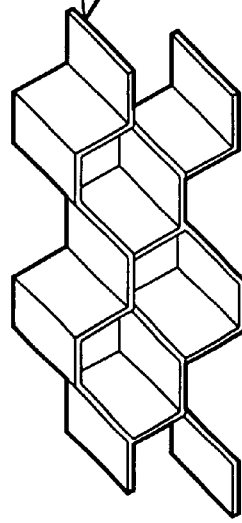
Figure 2:
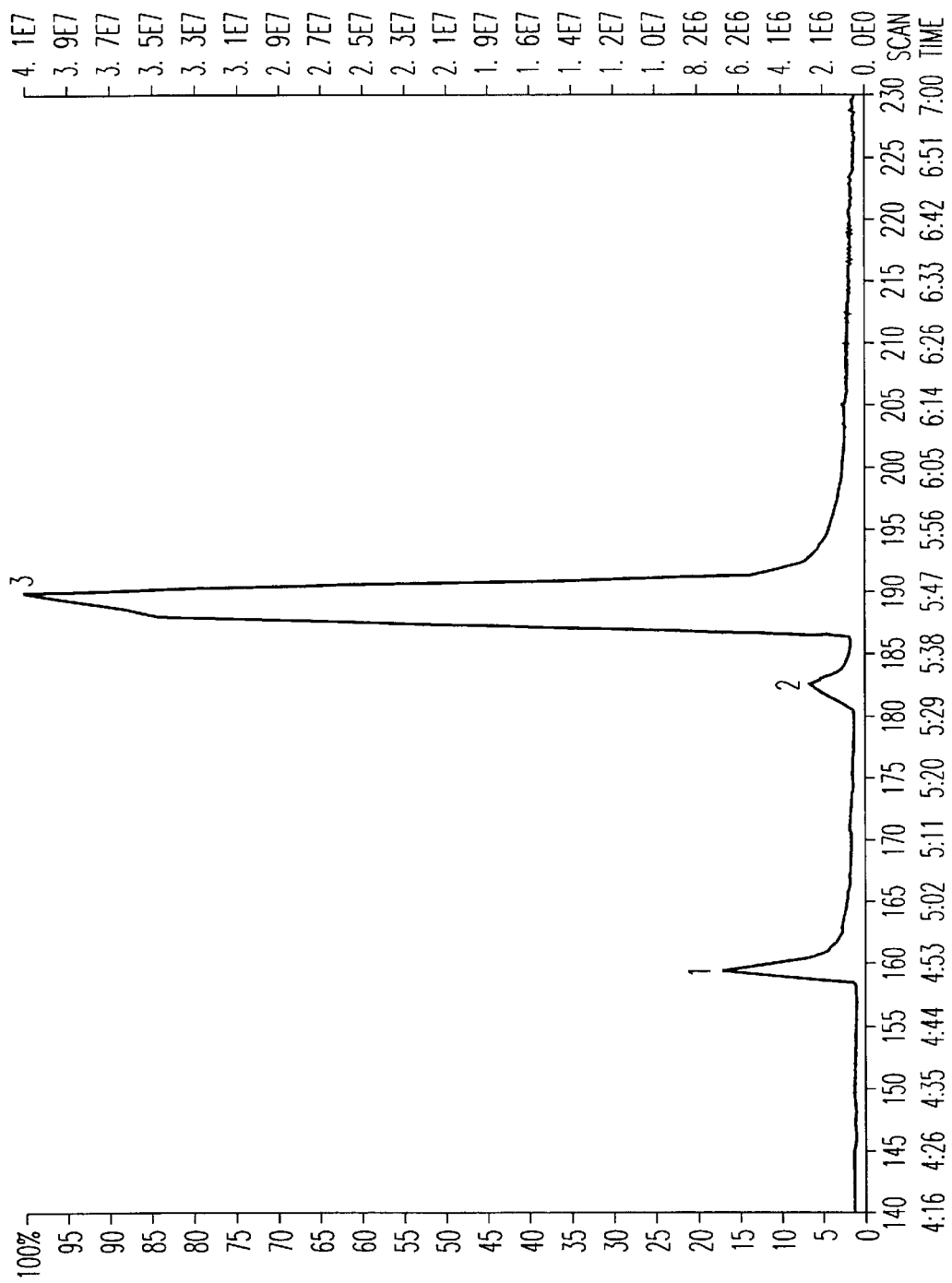
FIG. 2 is a view showing a GC spectrum of BTMe synthesized in Example 1.
Figure 3A:
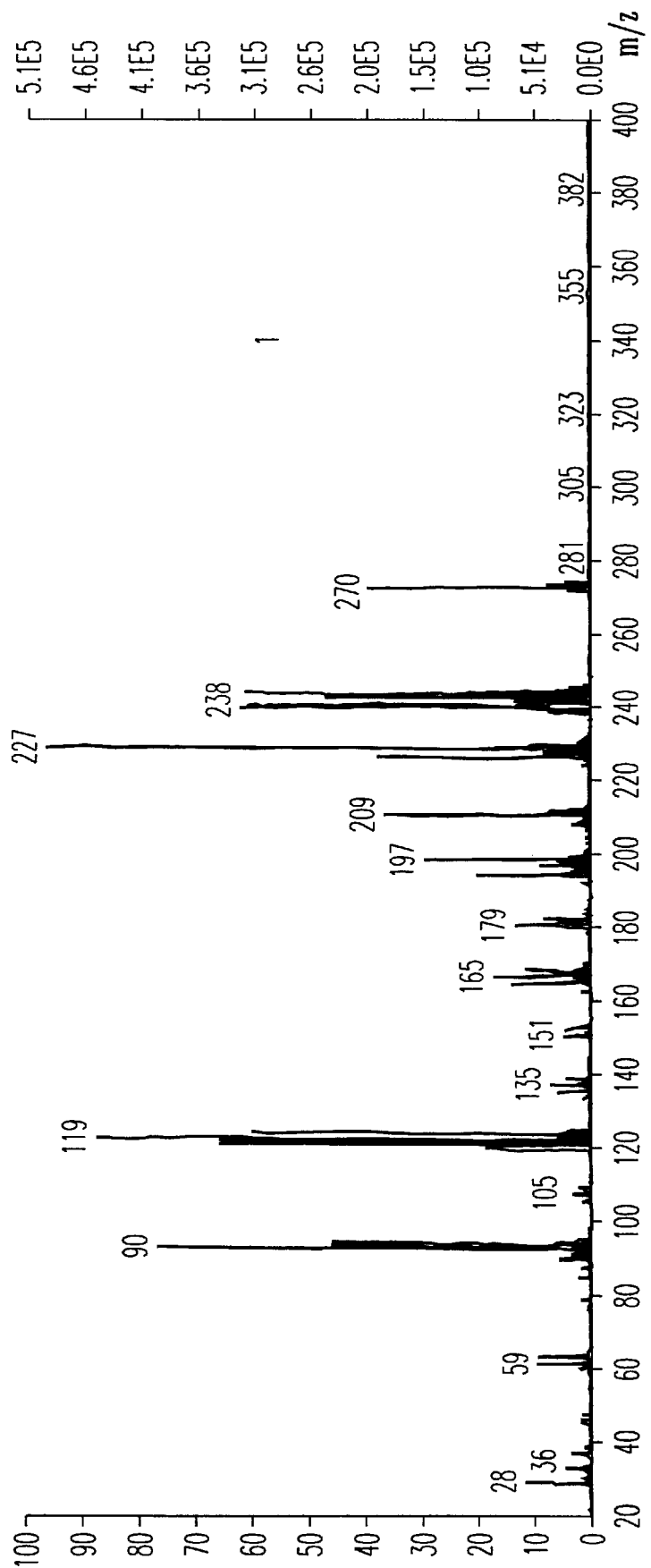
FIGS. 3A through 3C are views showing MS spectra of each peak of the GC spectra in the examples 1.
Figure 3B:
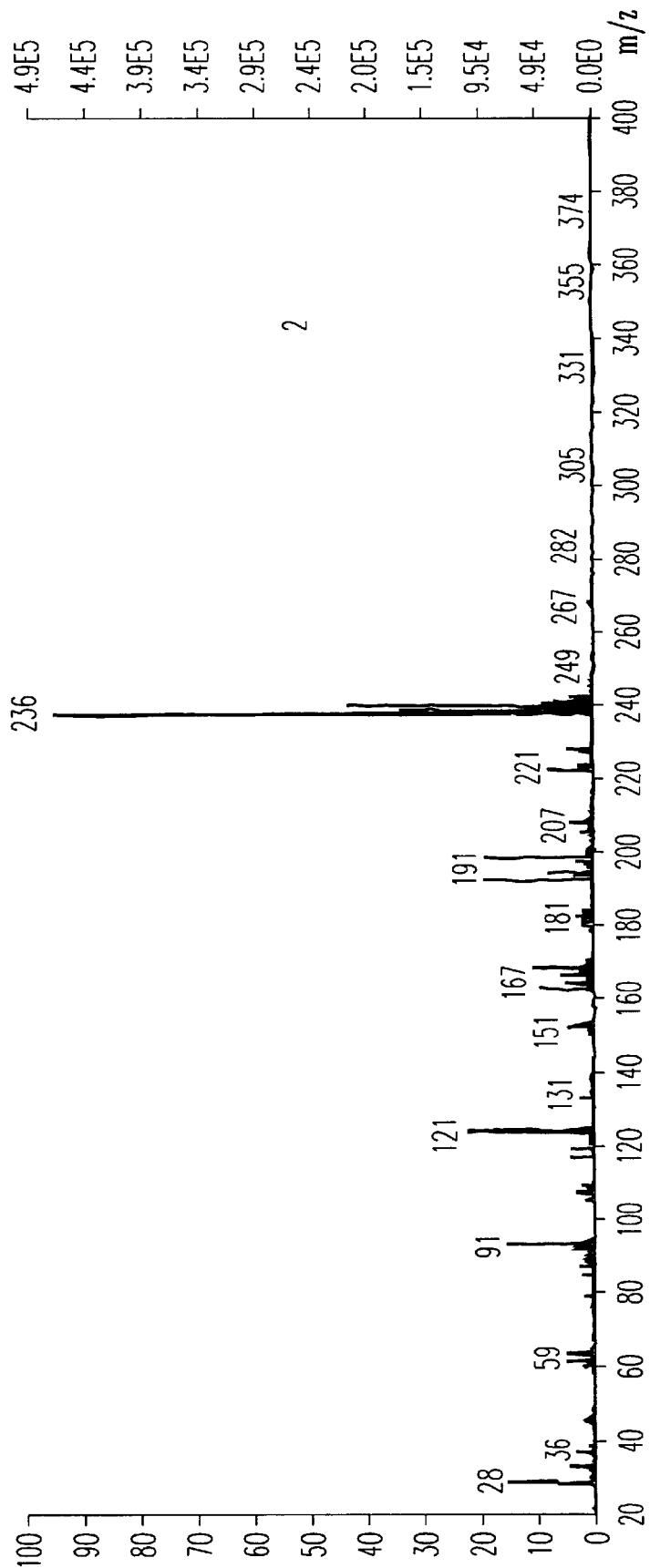
Figure 3C:
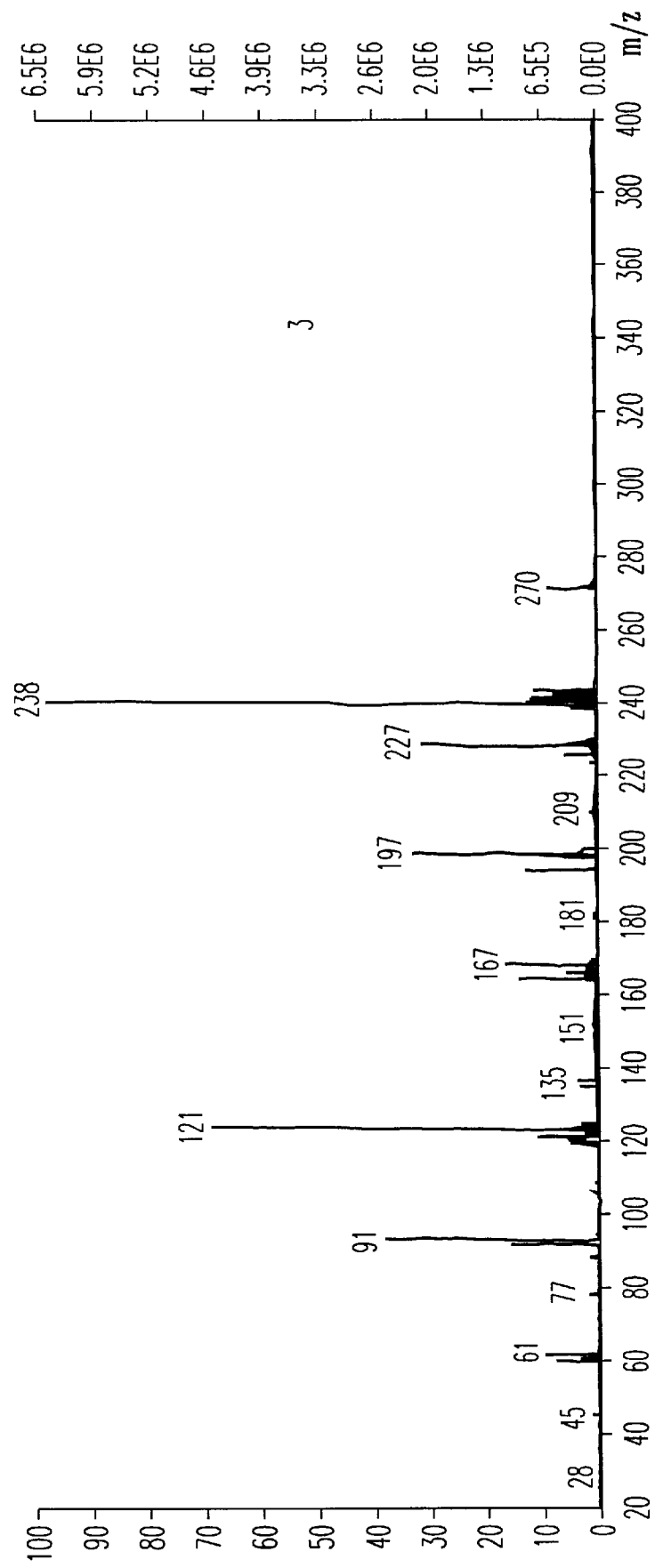
Figure 4A:
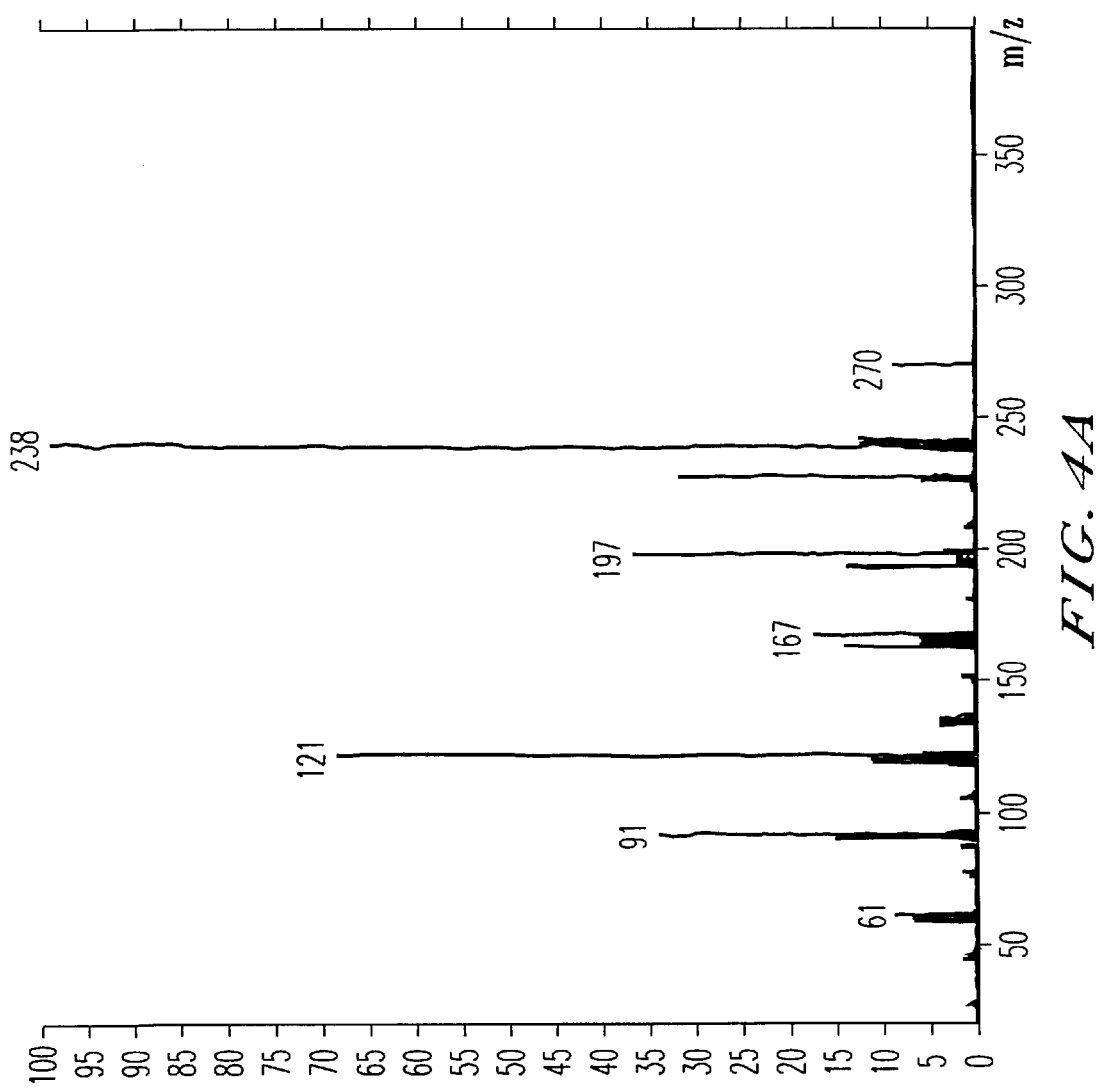
FIG. 4A shows a MS spectrum of a standard substance.
Figure 4B:
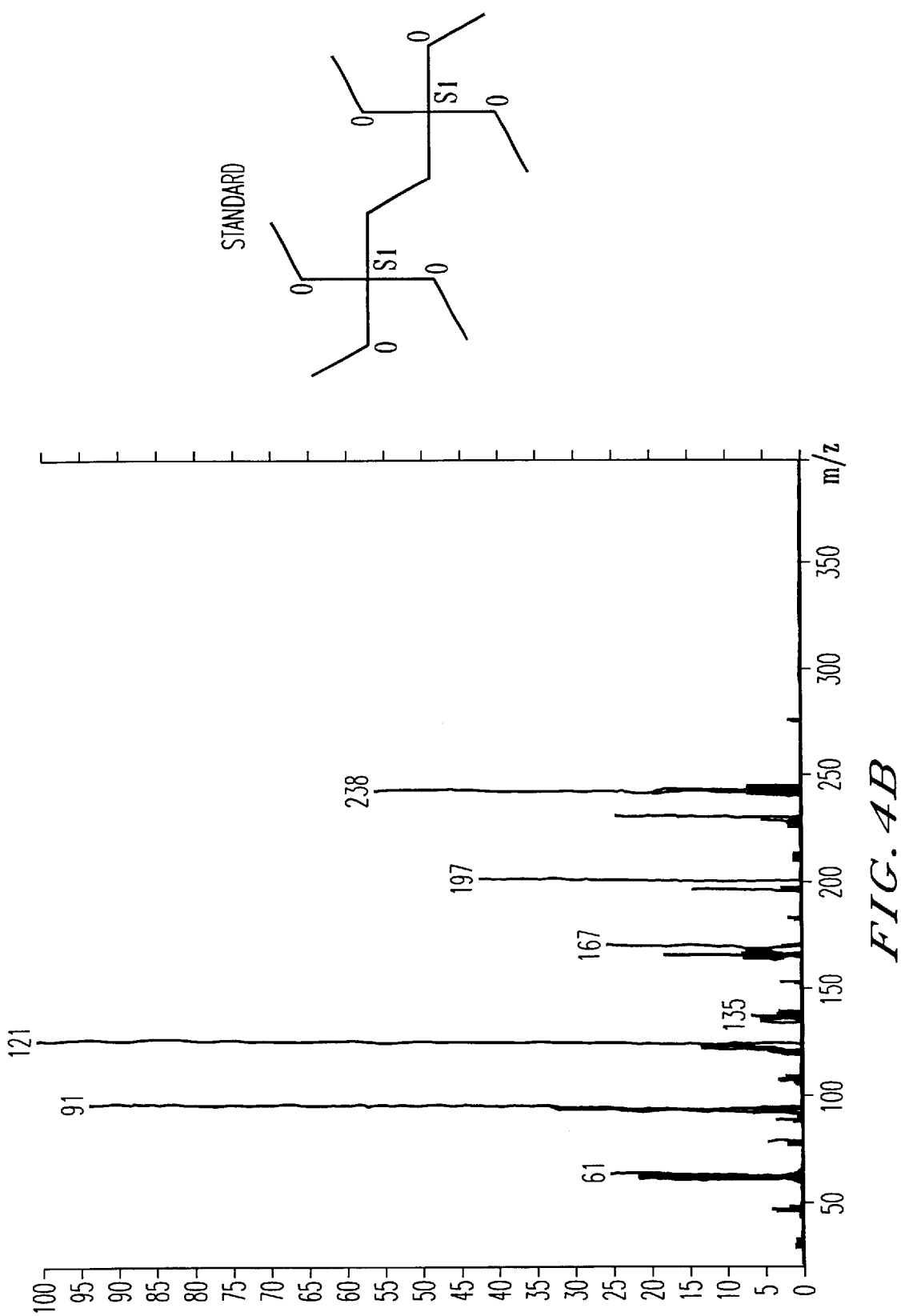
FIG. 4B shows a MS spectrum of the peak 3 of the GC spectra in the example 1.

Preferably, the organic/inorganic complex porous material comprises a main chain containing at least two metal atoms, at least one oxygen atom and at least one organic group, which organic group is bound to the at least two metal atoms. Because the main chain forms the pore walls of the porous material and has an organic group incorporated into the pore wall, the pore wall can exhibit useful properties of the organic group and/or the organic/inorganic complex structure. For example, the pore wall surface may become hydrophobic, due to the hydrophobic properties of the particular organic group incorporated into the pore wall and thus, adsorptive properties for an organic substance can be increased. Alternatively, adsorptive or catalytic properties specific for a select organic group can be exhibited by incorporating appropriate organic groups into the main chain.

Further, the pore diameter (pore size) and pore volume of the porous material can be maximized, because the organic groups are integrated into the pore wall instead of being suspended from the surface of the pore wall. Thus, large pore diameters and pore volumes can be formed. In addition, the organic groups incorporated into the main chain are not likely to be released at relatively high temperatures or during catalytic reactions or during adsorption operations, which could eliminate the desired surface properties of porous material and release the organic group into the product. As a result, heat resistance, as well as the stability of the porous material during catalysis and adsorption, are improved.

(Characteristics of the Main Chain)

Preferably, the main chain in the porous material contains at least one organometallic bond between a metal atom and a carbon atom. In addition, the main chain may comprise other bonds, including but not limited to, carbon-carbon bonds, metal-oxygen bonds, and carbon-oxygen bonds. The structure of the main chain is not particularly restricted, and may have such representative structures as straight chain, network and branched.

Various metal atoms may be utilized, such as silicon, aluminum, zirconium, tantalum, niobium, tin, hafnium, magnesium, molybdenum, cobalt, nickel, gallium, beryllium, yttrium, lanthanum, lead, vanadium and the like. Silicon is particularly preferred. The main chain may comprise metal atoms from a single metal or combinations of metal atoms may be utilized.

One preferred example of a main chain comprises a —Si—O— metal-oxygen bond and may have, for example, a polysilane skeleton, a silicate skeleton obtained by polycondensation of a silicate and/or a polysiloxane. Aluminum, titanium, magnesium, zirconium, tantalum, niobium, molybdenum, cobalt, nickel, gallium, beryllium, yttrium, lanthanum, hafnium, tin, lead, vanadium, boron, and the like, can be included with and/or substituted for the silicon atom in the above-described polysilane, silicate and polysiloxane skeletons.

Inorganic oxides also may be utilized to form the main chain, such as non-Si line zirconia, titania, niobium oxide, tantalum oxide, tungsten oxide, tin oxide, hafnium oxide, alumina and the like. Further, complex oxides may be obtained by integrating the above-described compounds to be added to the silicate skeleton into base skeletons of these inorganic oxides.

(Representative Organic Groups)

In such a main chain, at least one carbon atom is provided in the form of an organic group and the organic group need only contain one carbon atom. Preferably, the organic group is bound to two different metal atoms. More preferably, the organic group is bound to at least two different metal atoms via organo-metallic bonds. Such a bonding structure is shown schematically in FIG. 1. Thus, the organic group may be disposed between two metal atoms in the main chain, and one or more carbon atoms in the organic group may be covalently or ionically bound to the two metal atoms. For example, the organic group may be disposed between two silicon atoms in a silicate skeleton. A representative structure is shown schematically in FIG. 1. The portion of the organic group bound to the metal atom may be, but is not required to be, the terminal portion organic group.

The organic group is not particularly restricted because the choice of organic group will affect the properties of the porous material. Thus, a person of skilled in the art will find advantages to varying the nature of the organic group to suit a particular use of the mesoporous material. For example, various hydrocarbons such as an alkylene group, alkenylene group, vinylene group, alkynylene group, phenylene group, hydrocarbons containing a phenylene group and the like, may be used. In addition, organic groups derived from compounds having at least one carbon atom and an organic functional group such as an amido group, amino group, imino group, mercapto group, sulfone group, carboxyl group, ether group, acyl group and the like, may be used. These organic groups may be used alone or in combinations of two or more.

Preferred organic groups include, but are not limited to, a methylene group (—$CH_2$—), ethylene group (—$CH_2CH_2$—), trimethylene (propylene) group (—$CH_2CH_2CH_2$—), tetramethylene (butylene) group (—$CH_2CH_2CH_2CH_2$—), 1,2-butylene group (—CH($C_2H_5$)$CH_2$—), 1,3-butylene group (—CH($CH_3$)$CH_2CH_2$—), 2,3-butylene group (—CH($CH_3$)CH($CH_3$)—) derived from an alkyl group, phenylene group (—$C_6H_4$—), diethyl phenylene group (—$C_2H_4$—$C_6H_4$—$C_2H_4$—) derived from phenyl group, vinylene group (—CH=CH—), propenylene group (—$CH_2$CH=CH—), butenylene group (—$CH_2$CH=CH$CH_2$—) derived from a vinyl group amido group (—CO—NH—) derived from amido group, dimethylamino group (—$CH_2$—NH—$CH_2$—), trimethylamino group (—$CH_2$—N($CH_3$)—$CH_2$—) derived from amino group.

Additional preferred organic groups include an alkyl group having a valency of at least two, an alkenyl group having a valency of at least two and an aromatic ring-containing a hydrocarbon group having a valency of at least two.

(Other Atoms and Bonds)

Other atoms and bonds may be incorporated into the main chain and such other atoms and bonds are not particularly restricted. For example, an oxygen atom may be bound to two metal atoms. Specifically, oxygen atoms may be included in the main chain in the form of bonds such as Si—O, Al—O, Ti—O, Nb—O, Sn—O, Zr—O and the like. These bonds correspond to bonds between an oxygen atom and metal atoms contained in polymetaloxanes of various transition metals such as polysiloxane, polyalloxane and the like and may be used alone or in combinations of two or more. Further, atoms such as nitrogen, sulfur, various halogens and the like may be incorporated into the main chain.

Various metal atoms, organic functional groups and inorganic functional groups also may be added as one or more side chains that branch from the main chain. It is preferable that these atoms and groups are bound to the side chain part of the organic groups integrated in the main chain. For example, organic groups may be bound as side chains from the main chain. Representative examples include organic groups having a mercapto group, carboxyl group, lower alkyl group such as a methyl group and ethyl group and the like, phenyl group, amino group, amido group, imino group, sulfone group, vinyl group and the like.

(Pore Distribution in the Porous Material)

Preferably, 60% or more of the total pore volume is included in a pore diameter range of ±40% from the mean pore diameter, as determined from a maximum peak in a pore size distribution curve. The "pore size distribution curve" means a curve drawn, for example, by plotting a value (dv/dD) obtained by differentiating the pore volume (V) with respect to the pore diameter (D). The pore diameter at the point at which the value dv/dD of the pore size distribution curve is largest (maximum peak) is called the mean pore diameter. The pore size distribution curve can be calculated from various calculation formula using an adsorption isotherm obtained, for example, from measurement of nitrogen gas adsorption by the porous material.

A representative measuring method for determining the adsorption isotherm will be described and nitrogen is the gas most commonly used with this method. First, the porous material is cooled with liquid nitrogen to −196° C. and nitrogen gas is introduced. The amount of nitrogen gas adsorbed can be measured, for example, by a volumetrical method or gravimetrical method. The nitrogen gas pressure is gradually increased and the amount of adsorbed nitrogen gas by the porous material is plotted against each equilibrium pressure to create an adsorption isotherm. A pore size distribution curve can then be calculated from this adsorption isotherm using a calculation formula according to the Cranston-Inklay method, Pollimore-Heal method, BJH method and the like.

The phrase "60% or more of the total pore volume is included in the pore diameter range of ±40% of the mean pore diameter in the pore size distribution curve" can be explained by the following example. If the maximum peak in the pore size distribution curve is determined to be 3.00 nm, the mean pore diameter is 3.00 nm. Consequently, the sum of the pore volumes of the pores having a pore diameter between 1.80 to 4.20 nm preferably occupies at least 60% of the total pore volume (total volume of pores having a pore volume of not more than 50 nm, which is the upper limit that can be measured by the gas adsorption method). Thus, the integrated value of the pore size distribution curve in the pore diameter range from 1.80 to 4.20 nm preferably occupies at least 60% of the total integrated value of the curve. More preferably, the pore diameters are sufficiently uniform to function as molecular sieves, and exhibit a high selectivity for a reacted material or product of a catalytic reaction. This selectivity is extremely effective, for example, for performing selective catalytic reactions in a multi-component system.

(Mean Pore Diameter)

Preferably, the porous material has a mean pore diameter of about 1 to about 30 nm. If the mean pore diameter is in this range, compounds having a large molecular diameter can easily and quickly diffuse into the pores. Therefore, fast catalytic reactions and adsorptions are enabled. The specific surface area of the porous material is not particularly restricted, but preferably is at least about 700 $m^2/g$. The specific surface area can be calculated as a BET specific surface area using BET calculation formula from the adsorption isotherm obtained, for example, from measurement of the nitrogen gas adsorption by the porous material. Other calculation formula also can be used to calculate the specific surface area.

(X-ray Diffraction (XRD) Pattern of the Porous Material)

Preferably, the porous material has one or more peaks at a diffraction angle corresponding to a d value of at least about 1 nm in an XRD pattern of the porous material. The x-ray diffraction peak means that a periodic structure having a d value corresponding to the peak angle thereof is present in a sample. The above-described x-ray diffraction pattern reflects a structure in which pores are regularly arranged at an interval of at least 1 nm. Porous materials having such a diffraction pattern are believed to have a uniform pore diameter judging from the regularity in structure exhibited in the x-ray diffraction pattern.

(Pore Shape)

The pores may have, for example, the shape of a one-dimensional tunnel, a three-dimensional bonding box-form or spherical pore. Representative examples include, but are not limited to, a two-dimensional hexagonal structure (P6 mm), a three-dimensional hexagonal structure ($P6_3$/mmc), cubic (Ia3d, Pm3n), lamella, irregular structures and the like.

(Form of the Porous Material)

The porous material may be formed as a particle (e.g., powder), granule, supporting film, self supporting film, transparent film, oriented film, sphere, fibrous, patterning on a substrate, a clearly recognizable particle having a diameter on the order of 1 μm and the like. If the porous material is formed as a particle, the preferred shapes of the particle are spherical shapes and hexagonal rod shapes.

(Representative Methods for Making Porous Material)

Porous material can be synthesized for example by polycondensation of an organometallic compound that has an organic group bound to at least two metal atoms, wherein at least one hydrolysis group, such as an alkoxyl group or a halogen group, is preferably bound to the metal atom. The alkoxyl group or the halogen group can act as a hydrolysis groups in the polycondensation reaction. Alternatively, the porous material can be synthesized by polycondensing such organometallic compounds with other condensable inorganic or organic compounds.

Preferably, the organometallic compound, comprises an organic group having at least one carbon atom and the carbon atom or atoms in the organic group is bound to two or more metal atoms. Preferably, two different carbon atoms are bound to two different metal atoms.

Various metal atoms may be utilized, such as silicon, aluminum, zirconium, tantalum, niobium, tin, hafnium, magnesium, molybdenum, cobalt, nickel, gallium, beryllium, yttrium, lanthanum, lead, vanadium and the like. Silicon is particularly preferred. The main chain may comprise metal atoms from a single metal or combinations of metal atoms may be utilized. In the organometallic compound used in the present invention, various metal atoms can be used alone or in combination of two or more.

This metal atom corresponds to a metal atom contained in a main chain of the porous material of the present invention.

The organic group is not particularly restricted because the choice of organic group will affect the properties of the porous material. Thus, a person of skilled in the art will find advantages to varying the nature of the organic group to suit a particular use of the mesoporous material. For example, various hydrocarbons such as an alkylene group, alkenylene group, vinylene group, alkynylene group, phenylene group, hydrocarbons containing a phenylene group and the like, may be used. In addition, organic groups derived from compounds having at least one carbon atom and an organic functional group such as an amido group, amino group, imino group, mercapto group, sulfone group, carboxyl group, ether group, acyl group and the like, may be used. These organic groups may be used alone or in combinations of two or more.

Preferred organic groups include, but are not limited to, a methylene group ($-CH_2-$), ethylene group ($-CH_2CH_2-$), trimethylene (propylene) group ($-CH_2CH_2CH_2-$), tetramethylene (butylene) group ($-CH_2CH_2CH_2CH_2-$), 1,2-butylene group ($-CH(C_2H_5)CH_2-$), 1,3-butylene group ($-CH(CH_3)CH_2CH_2-$), 2,3-butylene group ($-CH(CH_3)CH(CH_3)-$) derived from an alkyl group, phenylene group ($-C_6H_4-$), diethyl phenylene group ($-C_2H_4-C_6H_4-C_2H_4-$) derived from phenyl group, vinylene group ($-CH=CH-$), propenylene group ($-CH_2CH=CH-$), butenylene group ($-CH_2CH=CHCH_2-$) derived from a vinyl group amido group ($-CO-NH-$) derived from amido group, dimethylamino group ($-CH_2-NH-CH_2-$), trimethylamino group ($-CH_2-N(CH_3)-CH_2-$) derived from amino group.

Additional preferred organic groups include an alkyl group having a valency of at least two, an alkenyl group having a valency of at least two and an aromatic ring-containing a hydrocarbon group having a valency of at least two.

This organic group corresponds to an organic group contained in the porous material of the present invention.

Further, in the organometallic compound, each metal atom bound to an organic group is also bound to at least one hydrolysis group, such as an alkoxyl group or halogen group.

Hydrocarbon groups having an alkoxyl group can be linear, cyclic or alicyclic hydrocarbon groups. Alkyl groups are preferred and linear alkyl groups having 1 to 5 carbon atoms are more preferred. Methyl and ethyl groups are most preferred. Representative halogen groups are chlorine, bromine, fluorine, iodine, and the like. Chlorine and bromine are preferred. Alkoxyl groups and halogen groups can be used alone or in combinations of two or more and the alkoxyl group or halogen group preferably is covalently bound to the metal atom.

Each metal atom bound to an organic group may advantageously have at least one alkoxyl group or halogen group, and may also have two or more alkoxyl groups or halogen groups. This number is preferably two or more, and more preferably three or more, although it depends on the valency of a metal atom. When the metal atom is a silicon atom, three alkoxyl groups or halogen groups are preferred. It is also permissible that a halogen group and an alkoxyl group are bound to a metal atom.

Other groups, in addition to an alkoxyl or halogen group, may be bound to the metal atom. A hydrogen atom, hydroxyl group, and hydrocarbon group and the like are included in these other groups. Preferred hydrocarbon groups are methyl group, or ethyl group and the like which are lower hydrocarbon groups having 1 to 4 carbon atoms, Further, this organometallic compound can be obtained from the above-described various organic groups, various metal atoms and alkoxyl groups or halogen groups in a variety of combinations.

Representative organometallic compounds are shown by the following structures (1), (2), (3), (4), (5), or (6) in which the above-described various organic groups, metal atoms, hydrocarbon groups on alkoxyl groups, or halogen groups are combined to produce preferred compounds:

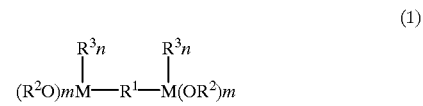

wherein

M is a metal atom, $R^1$ is an organic group, each R is a hydrocarbon group, respectively, each $R^3$ is a hydrogen atom, hydroxyl group, or hydrocarbon group, respectively, m is an integer of at least 1, and n is an integer of 0 or more obtained by subtracting (m+1) from the valency of a metal atom M;

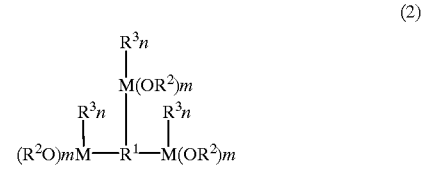

wherein M, $R^1$, $R^2$, $R^3$, m and n have the same definition as structure (1);

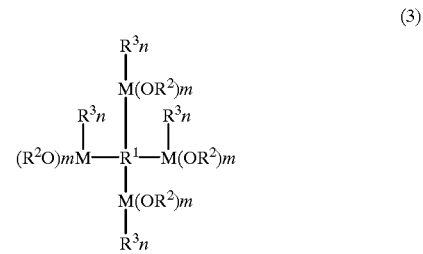

wherein M, $R^1$, $R^2$, $R^3$, m and n have the same definition as structure (1);

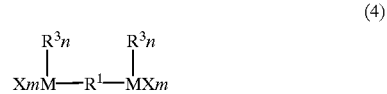

wherein M, $R^1$, $R^3$, m and n have the same definition as structure (1) and X is a halogen group;

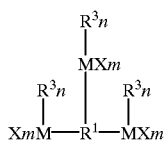

(5)

wherein M, X, $R^1$, $R^3$, m and n have the same definition as structure (4);

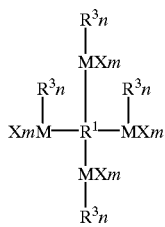

(6)

wherein M, X, $R^1$, $R^3$, m and n have the same definition as structure (4);

Representative organometallic compounds include, but are not limited to:

$(CH_3O)_3Si-CH_2-Si(OCH_3)_3$,
$(C_2H_5O)_3Si-CH_2-CH_2-Si(OC_2H_5)_3$,
$(CH_3O)_3Si-CH_2-CH_2-Si(OCH_3)_3$,
$(C_2H_5O)_3Si-CH_2-CH_2-Si(OC_2H_5)_3$,
$(CH_3O)_3Si-C_6H_4-Si(OCH_3)_3$,
$(C_2H_5O)_3Si-C_6H_4-Si(OC_2H_5)_3$,
$(CH_3O)_3Si-C_2H_4-C_6H_4-C_2H_4-Si(OCH_3)_3$,
$(C_2H_5O)_3Si-C_2H_4-C_6H_4-C_2H_4-Si(OC_2H_5)_3$,
$(CH_3O)_3Si-CH=CH-Si(OCH_3)_3$ and
$(C_2H_5O)_3Si-CH=CH-Si(OC_2H_5)_3$.

The organometallic compounds can contain other atoms and organic or inorganic functional groups in addition to a metal atom and an organic group. These other atoms and functional groups are not particularly restricted. Atoms such as nitrogen, sulfur, various halogens, and the like or functional groups containing these atoms may be contained. Preferably, these atoms or groups are contained in the side chain part of the organic group of the compounds. Preferred functional groups are a mercapto group, carboxyl group, alkyl group having lower number of carbons such as methyl group or ethyl group, phenyl group, amino group, imino group, amido group, sulfone group, vinyl group and the like. These organometallic compounds may be used alone or in combinations of two or more.

(Other Materials)

The organometallic compound may be polycondensed as a sole skeleton component, or other inorganic condensable compounds, such as alkoxysilane and the like, may be polycondensed with the organometallic compound as skeleton components. Representative alkoxy silanes include, but are not limited to, tetramethoxysilanes, tetraethoxysilanes and tetrapropoxysilanes comprising an alkoxyl group having an alkyl group with 1 to 3 carbon atoms. Further, alkylalkoxysilanes having a lower alkyl substituent group with 1 to 3 carbon atoms, such as methyltrimethoxysilane, ethyltrimethoxysilane and the like, can be used. At least one alkoxyl group may advantageously be contained, and the preferable number is 4.

Also, alkoxysilanes and the like having other organic groups or functional groups can be used. Representative organic groups include phenyl groups and the like. Representative functional groups include an amino group, carboxyl group, mercapto group, and the like. Further, a halogen atom may be bound to a silicon atom of an alkoxysilane instead of an alkoxyl group. Halogen group also be used as a hydrolysis group.

Representative inorganic compounds include inorganic compounds comprising other metals, such as titanium and aluminum and the like, in place of the silicon atom of these various alkoxysilanes. Representative non-alkoxysilanes include aluminum isopropoxide and titanium isopropoxide.

Further, sodium silicate, silica and compounds having other metal atoms such as aluminum and the like, instead of silicons can also be used. In addition to sodium silicate, silica and alkoxysilane, compounds containing other elements can also be used as an inorganic skeleton component. For example, by adding as an Al source compound such as pseudo boehmite, sodium aluminate, aluminum sulfate or dialkoxyaluminotrialkoxysilane, porous materials having a skeleton composed of $SiO_2-Al_2O_3$ can also be synthesized. Further, oxide compounds in which Si is substituted by metals such as Ti, Zr, Ta, Nb, Sn, Hf and the like, can also be used. By this substitution, various metals ($M^{n+}$; n represents the valency of the metal) can be introduced into the main chain. For example, by adding titanate compounds, such as $Ti(OC_2H_5)_4$ and the like, vanadyl sulfate ($VOSO_4$), boric acid ($H_3BO_3$) or manganese dichloride ($MnCl_2$), and performing a co-condensation reaction, Ti, V, B or Mn can be introduced into the skeletons of the porous materials.

Also, various metal halides including, for example silicon tetrachloride ($SiCl_4$), can also be used. A halide group is a usual hydrolysis group, and chlorine is a preferred halide.

Naturally, all of these inorganic compounds can be used alone or in combinations of two or more.

(Control of the Pore Structure)

The pore structure can be controlled by regulating the compounding ratios of the organometallic and inorganic compounds. For example, if an inorganic/organic polymerization material ratio (molar ratio) is utilized in the range of 0/100 to 50/50, a cubic structure tends to be form. However, if the molar ratio is increased to the range of 80/20 to 100/0, a hexagonal structure tends to be formed.

(Surfactant)

Preferably, the organometallic compounds are polycondensed in the presence of a surfactant. The surfactant is not particularly restricted, and various surfactants can be utilized, such as cationic surfactants, anionic surfactants, nonionic surfactants, and the like. Each of these surfactants can be used alone or in combinations of two or more.

Representative cationic and anionic surfactants include, but are not limited to, chlorides, bromides, iodides and hydroxides of alkyltrimethylammonium $[C_nH_{2n+1}N(CH_3)_3]$, alkylammonium, dialkyldimethylammonium, benzylammonium, fatty acid salts, alkylsulfonate and alkylphosphate thereof, and polyethylene oxide-based nonionic surfactants. Alkyltrimethylammonium is preferred and alkyltrimethylammonium having 8 to 18 carbon atoms in the alkyl chain are more preferred. Chlorides, bromides and hydroxides of alkyltrimethylammonium are also preferred.

Nonionic surfactants are also not particularly restricted, and for example, a polyethylene oxide-based nonionic surfactant having a hydrocarbon chain as a hydrophobic part and a polyethylene oxide chain as a hydrophilic part, can be used. Representative surfactants include, but are not limited to, $C_{16}H_{33}(OCH_2CH_2)OH$ (hereinafter, this structure is abbreviated as $C_{16}EO_2$), $C_{12}EO_4$, $C_{16}EO_{10}$, $C_{16}EO_{20}$, $C_{18}EO_{10}$, $C_{18}H_{35}EO_{10}$, $C_{12}EO_{23}$, and the like Alternatively, primary alkylamines and the like can be used as the nonionic surfactant.

Representative hydrophobic chains for the surfactant include, but are not limited to, various sorbitan fatty esters containing a fatty acid such as oleic acid, lauric acid, stearic acid, palmitic acid, and the like. Further representative examples include $CH_3C(CH_3)CH_2C(CH_3)_2C_6H_4(OCH_2CH_2)_xOH$ (average x of 10), Triton X-100 (Aldrich), polyethylene oxide (20) sorbitan monolaurate (Tween 20, Aldrich), polyethylene oxide (20) sorbitan monopalmitate (Tween 40), polyethylene oxide (20) sorbitan monostearate, polyethylene oxide (20) sorbitan monooleate (Tween 60), sorbitan monopalmitate (Span 40), and the like.

Also, triblock copolymers having three polyalkylene oxide chains can be used and triblock copolymers having polyethylene oxide chain-polypropylene oxide chain-polyethylene oxide chain are preferred. This surfactant has a structure in which a polypropylene oxide chain is present in the center and polyethylene oxide chains are present on both sides thereof, namely a hydroxyl group is present on each side. The base structure of this triblock copolymer is represented by (EO)x(PO)y(EO)x. The values of x and y are not particularly restricted. Triblock copolymers in which x is about 5 to about 110 and y is about 15 to about 70 are preferred. Triblock copolymers in which x is about 15 to about 20 and y is about 50 to about 60 are more preferred.

Also triblock copolymers in which blocks are arranged in reverse order, namely triblock copolymers having a polypropylene oxide chain-polyethylene oxide chain-polypropylene oxide chain ((PO)x(EO)y(PO)x) can be used. In these copolymers, x and y are not limited, and preferably, x is about 5 to about 110 and y is about 15 to about 70. More preferably, x is about 15 to about 20 and y is about 50 to about 60.

Representative triblock copolymers include, but are not limited to, $EO_5PO_{70}EO_5$, $EO_{13}PO_{30}EO_{13}$, $EO_{20}PO_{30}EO_{20}$, $EO_{26}PO_{39}EO_{26}$, $EO_{17}PO_{56}EO_{17}$, $EO_{17}PO_{58}EO_{17}$, $EO_{20}PO_{70}EO_{20}$, $EO_{80}PO_{30}EO_{80}$, $EO_{106}PO_{70}E_{106}$, $EO_{100}PO_{39}EO_{100}$, $EO_{19}PO_{33}EO_{19}$, and the like. Preferable are $EO_{17}PO_{56}EO_{17}$, $EO_{17}PO_{58}EO_{17}$, and the like. These triblock copolymers are commercially available from BASF and other chemical companies, and triblock copolymers having a desired x value and y value can be obtained for a small-scale production level. The triblock copolymers can be used alone or in combinations of two or more.

Further, star die block copolymers in which two polyethylene oxide chain—polypropylene oxide chain are bound, respectively, to two nitrogen atoms of ethylenediamine can also be used. Representative examples include, but are not limited to, $(EO_{113}PO_{22})_2NCH_2CH_2N(PO_{22}EO_{113})_2$, $(EO_3PO_{18})_2NCH_2CH_2N(PO_{18}EO_3)_2$, $(PO_{19}EO_{16})_2NCH_2CH_2N(EO_{16}PO_{19})_2$, and the like. The star die block copolymers can be used alone or in combinations of two or more.

The resulting pore diameter can be controlled depending on the kind of surfactant used, and in particular, by the length of hydrophobic chain of the surfactant. Further, if the ratio of surfactant to water in the reaction system (S/H$_2$O: g/g) is 20 or more, regular pore structures tend to form. If this ratio is about 20, cubic structures tend to form. If the ratio is 23 or more, hexagonal structures tend to form.

(Polycondensation Reaction)

To perform conducting polycondensation reactions, the above-described skeleton components including the organometallic compound and the surfactant are mixed in a solvent, and an acid or alkali catalyst is added to the mixture. Preferably, the polycondensation reaction is perfomed in a reaction mixture having a pH of 7 or higher.

Also, it is possible that skeleton components are partially polycondensed in the absence of the surfactant, but in the presence of an acid or alkali catalyst, to form an oligomer. The surfactant is then added to the solution containing this oligomer.

Further, for polycondensation reactions performed in the presence of the surfactant, polycondensation using an alkali catalyst and polycondensation using an acid catalyst can be conducted alternately. The order of polycondensation using an alkali catalyst and polycondensation using an acid catalyst is not restricted. The degree of polycondensation tends to increase from polycondensation using an acid catalyst to polycondensation using an alkali catalyst.

In the polycondensation reaction, it is preferable that stirring and standing (no stirring) are conducted alternately. The reaction temperature is preferably from 0° C. to 100° C. Lower temperatures tend to increase the regularity in the structure of the product. Preferably, the reaction temperature is from about 20° C. to about 40° C., if a regular structure is desired. On the other hand, higher reaction temperatures tend to increase the degree of polymerization and, as a result, the stability of the structure is increased. Preferred reaction temperatures are from about 60° C. to about 80° C., if increased stability is desired.

After the polycondensation reaction, aging is conducted for a sufficient condensation reaction, and then the resulting precipitate or gel is filtered, followed by washing if necessary. The filtrate is then dried to obtain a solid product (porous precursor: the surfactant still fills the pores).

(Hydrothermal Treatment)

For aging, when the reactant is dispersed in water and heated at a temperature from about 50° C. to 100° C., the condensation reaction of the skeleton is promoted to form a porous skeleton which is more stable and has improved heat resistance.

Specifically, a porous material precursor is dispersed into an aqueous solution containing the same surfactant as used in the polycondensation reaction (concentration of the surfactant is typically equal to or less than in the polycondensation reaction) or into a solvent such as water and the like, and the precursor is subjected to hydrothermal treatment at a temperature from about 50° C. to 100° C. Specifically, the reaction solution is heated with or without dilution before heating. The heating temperature is preferably from about 60° C. to 100° C., and preferably from about 70° C. to 80° C. It is advantageous if the pH is somewhat alkaline, and preferably from about 8 to about 8.5. The treatment time is not particularly restricted. It is preferably at least 1 hour and more preferably from about 3 to about 8 hours.

After hydrothermal treatment, the precursor is filtered, dried and excess treatment liquid is removed. The precursor can also be dispersed in the above-described aqueous solution or solvent and the pH is adjusted. Stirring treatment is then performed at room temperature for several hours to tens of hours before initiation of this hydrothermal treatment. By this pre-treatment, effects described below based on the above described hydrothermal treatment can be enhanced.

As a result of the hydrothermal treatment as described above, strength and regularity in structure of a porous material after removal of the surfactant can be enhanced. Accordingly, a porous material having improved pore stability and structural regularity, namely, uniformity in pore distribution can be provided as compared with the case wherein the above-described hydrothermal treatment is not performed. Therefore, by subjecting a porous material precursor having a hexagonal structure to the hydrothermal treatment for example, the pore size of the mesoporous material (final product) can be made uniform, so that 60% or more of the total pore volume is included in the range of ±40% from the mean pore diameter in the pore size distribution curve.

(Removal of Surfactant)

At this stage of the synthesis, the solid product obtained in the above-described manner (porous precuesor) already has a base skeleton of a porous material and the surfactant still fills the pores. The intended porous material is thus obtained by removing this surfactant. After the polycondensation reaction or after hydrothermal treatment, the resulting precipitate or gel is filtered, and washed if necessary, then dried to obtain a solid product. Subsequently, the surfactant can be removed from this solid product by baking or by a solvent, such as water, alcohol and the like.

To remove the surfactant by baking, the solid product is heated at a temperature from about 300° C. to about 1000° C., and more preferably from about 400° C. to about 700° C. The heating time is preferably at least 30 minutes, and heating for 1 hour or more may be necessary to completely remove organic components. A gas, such as air or an inert gas such as nitrogen and the like, may be passed at the initiation of burning, because significant combustion gases are produced when air is used.

To remove the surfactant with a solvent, the solid product is dispersed into a solvent having a high solubility for the surfactant, the mixture is stirred and the solid component is recovered. As a solvent, those having high solubility for the surfactant, such as water, ethanol, methanol, acetone, and the like, can be used.

If a cationic surfactant is used, the solid product can be dispersed in ethanol or water into which a small amount of hydrochloric acid is added, and the mixture is stirred with heating at about 50 to 70° C. In this procedure, the cationic surfactant is ion-exchanged with protons ($H^+$) and extracted. In the case of an anionic surfactant, the surfactant can be extracted in a solvent into which an anion is added. In the case of a nonionic surfactant, extraction may sometimes be possible solely with a solvent. Also, irradiation using an ultrasonic wave is a useful method for removing the surfactant. Further, a combination of stirring and standing or repetition thereof is preferable.

The pore diameter of the porous material can be controlled by changing the molecular length of the surfactant used, or by adding a hydrophobic compound, for example, trimethylbenzene, tripropylbenzene, and the like, to the surfactant.

Each of the additional synthesis and method steps disclosed above and below may be utilized separately or in conjunction with other synthesis and method steps to form useful mesoporous materials. Representative examples of the present invention, which examples utilize many of these additional features and method steps in conjunction, will now be described in further detail. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention.

EXAMPLE 1

Synthesis of an Organic Compound Having an Alkoxyl Group

Synthesis of 1,2-bis(trimethoxysilyl)ethane [$(CH_3O)_3Si$—$CH_2$—$CH_2$—$Si(OCH_3)_3$] (hereinafter, abbreviated as BTMe), an organic compound having alkoxyl groups, will be described.

In this example, all operations were conducted under nitrogen gas. Into a 1000 ml triple-necked flask were added 200 g of a $NaOCH_3$—$HOCH_3$ solution (concentration was about 28% and 102 g of anhydrous $CH_3OH$, and to this mixture, 50 g of 1,2-bis(trichlorosilyl)ethane was added dropwise with stirring, while cooling the flask with ice-water. The methanol solvent was removed by distillation at normal pressure and then distillation was conducted under reduced pressure to obtain an initial product, which was further purified by distillation under reduced pressure to obtain the intended product. Structure of the product was identified by gas chromatography mass spectrum (GC-MS) and $^1H$, $^{13}C$, $^{29}Si$ NMR (FIGS. 2 to 5). According to GC-MS, the content of BTMe in the final product was 95% or more, and the yield was 84 mol %. FIGS. 2–5 show these respective spectra.

EXAMPLE 2

Synthesis of Mesoporous Substance (1)

BTMe was hydrolyzed and poly-condensed using NaOH as a catalyst in the presence of the surfactant.

Into a 100 ml beaker were added 1.152 g (3.6 mmol) of n-hexadecyltrimethylammonium chloride [$Cl_6H_{33}N(CH_3)_3Cl$], 30 g of ion-exchanged water and 1.5 g of a 6N NaOH aqueous solution (containing 7.5 mmol of NaOH). 2.03 g (7.5 mmol) of BTMe was added with vigorous stirring at room temperature and stirred for 3 hours. After being left for 14 hours at room temperature, the mixture was stirred for 12.5 hours, and the mixture was further left for 14 hours, then stirred for 6.9 hours and filtered. The precipitate was washed with 300 ml of ion-exchanged water twice and 1.90 g of a solid product was obtained after air-drying.

For removal of the surfactant, 1.0 g of the solid product was added to a mixture of 150 ml of anhydrous ethanol and 3.8 g of concentrated hydrochloric acid. The mixture was stirred for 6 hours at 50° C. and filtered. The recovered precipitate was treated with HCl—EtOH again under the same conditions. The product was washed with 150 ml of anhydrous ethanol twice and air-dried to obtain a porous material.

EXAMPLE 3

Analysis of the Structure of Product

Figure 6:
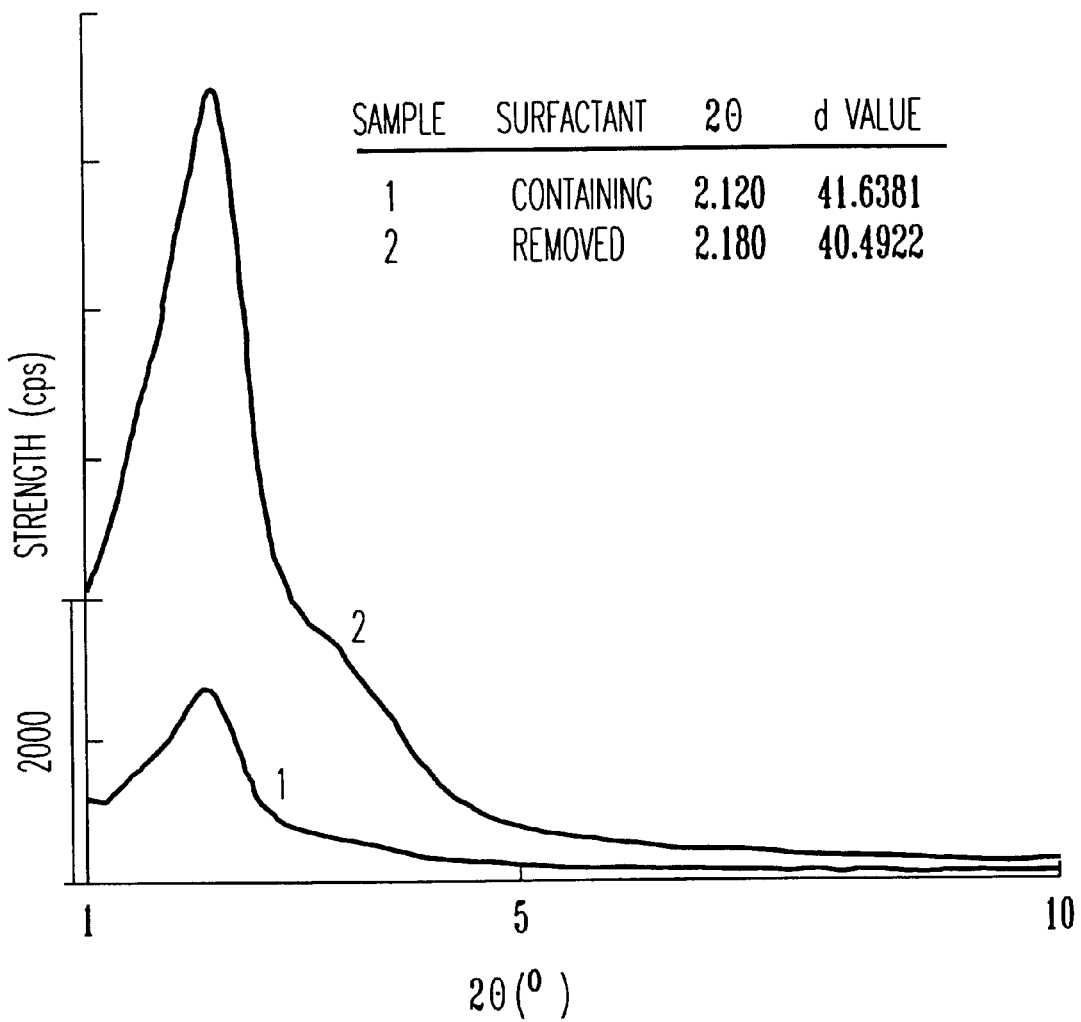
FIG. 6 is a view showing XRD patterns of a porous material precursor (sample 1) and a porous material (sample 2) obtained in Example 2.

FIG. 6 shows XRD patterns in a low angle range of the porous material precursor obtained in Example 2 (sample 1) and the porous material after removal of the surfactant (sample 2). A strong peak of d=4.05 nm and a weak shoulder peak on a higher angle side were observed in sample 2. From these diffraction patterns, the porous material was confirmed to have a periodic structure in the nanometer range.

Figure 7A:
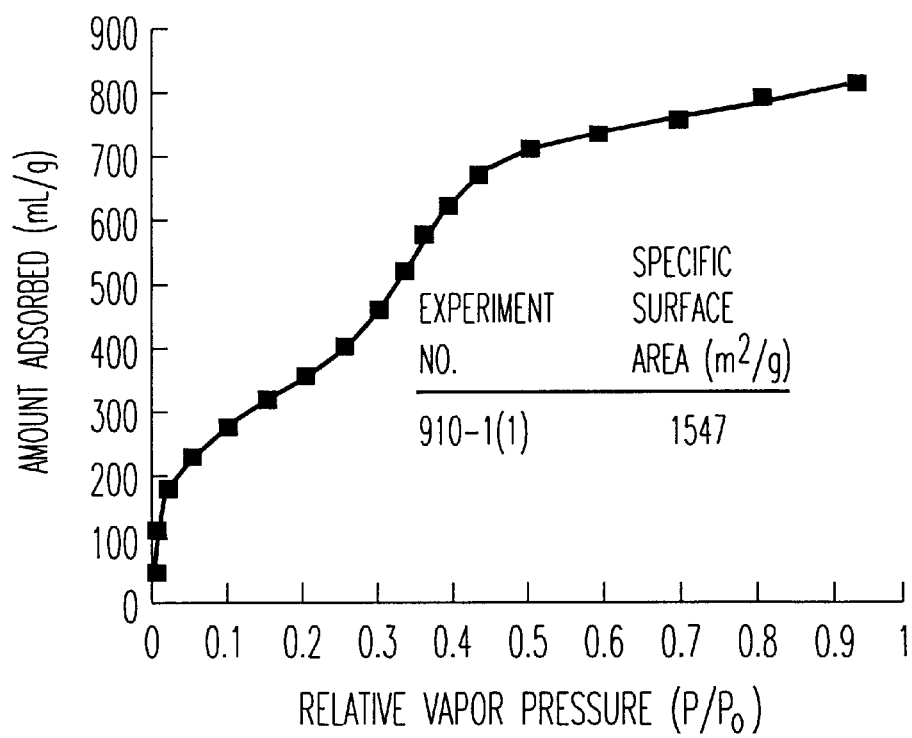
FIG. 7A is a view showing the nitrogen adsorption isotherm of sample 2.
Figure 7B:
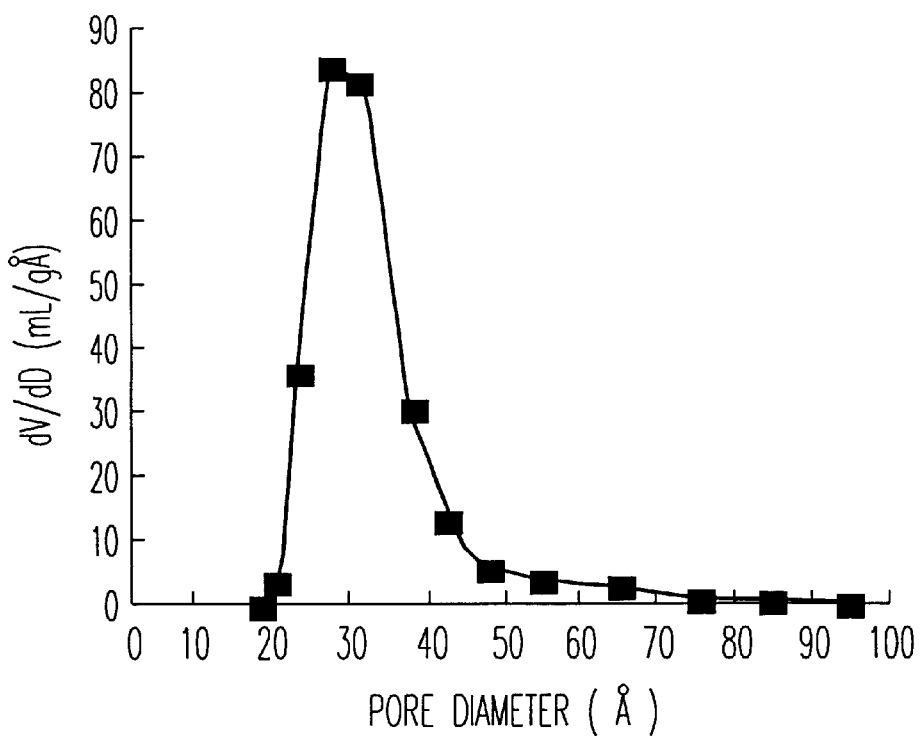
FIG. 7B is a view showing a pore size distribution curve of sample 2.

FIG. 7A shows the nitrogen adsorption isotherm of sample 2 and FIG. 7B shows the pore size distribution curve given by the Cranston-Inklay method. The mean pore diameter was 3 nm and 85% or more of the total pore volume was within the pore diameter range of ±40% from the mean pore diameter. The BET specific surface area calculated from the nitrogen adsorption isotherm was 1547 $m^2/g$ and the pore volume was as large as 1.3 cc/g.

Figure 8A:
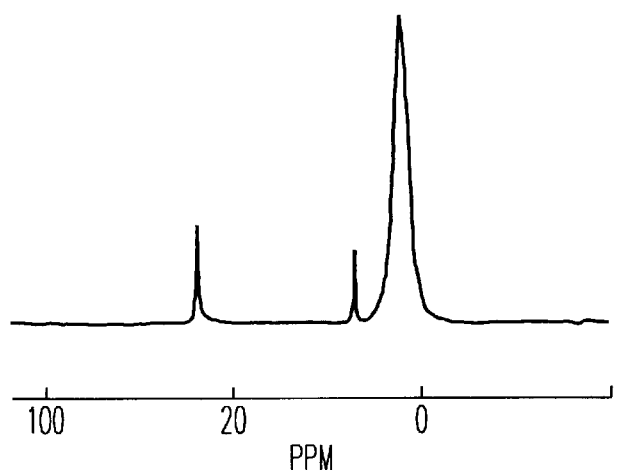
FIG. 8A is a view showing the $^{13}$C-NMR spectrum of sample 2.
Figure 8B:
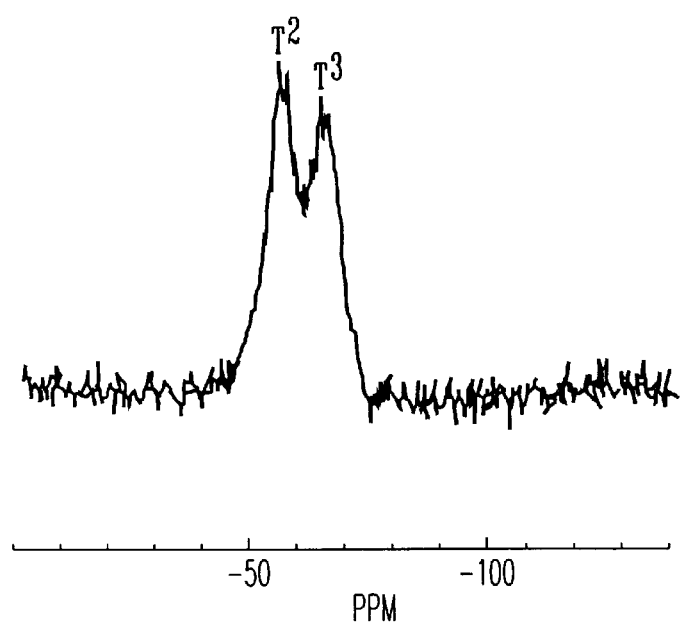
FIG. 8B is a view showing the $^{29}$Si-NMR spectrum of sample 2.
Figures 9A, 9B:
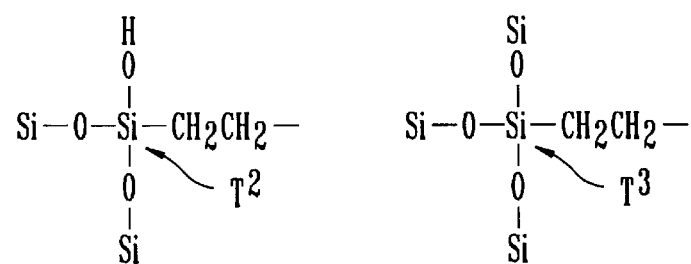
FIG. 9A is a view showing T2 species silicon in the $^{29}$Si-NMR spectrum.
FIG. 9B is a view showing T3 species silicon in the $^{29}$Si-NMR spectrum.

Further, the structure of the pore wall of the porous material (sample 2) was investigated using solid NMR. As shown in FIG. 8A, in the $^{13}C$ NMR spectrum, resonant peaks attributable to —CH$_2$CH$_2$— and un-hydrolyzed, remaining —SiOCH$_3$ were observed at δ=6 ppm and δ=60 ppm, respectively. The peak at δ=18 ppm has been attributed to a carbon atom of ethanol solvent remaining in the final product. According to the $^{29}$Si NMR spectrum shown in FIG. 8B, silicon atoms in the porous material have been primarily attributed to T2 species and T3 species (see FIGS. 9A and 9B), and correspond to the results of the $^{13}$C NMR spectrum. These NMR results show that an organic group, in this case —CH$_2$CH$_2$—, can be integrated into the silicate skeleton.

EXAMPLE 4 pH of the Reaction Solution

The reaction solution pH can exert a large influence on the speed of the polycondensation reaction and the determination of the product structure. Conditions for addition of 1.5 g of 6N NaOH in the polycondensation reaction system shown in Example 2 were changed to several other conditions shown in Table 1, and the reaction solution pH was varied (samples 3 to 6). As the surfactant, dodecyltrimethylammmonium bromide (having 12 carbon atoms) was used and investigated in addition to hexadecyltrimethylammonium chloride (having 16 carbon atoms) as shown in Table 1.

TABLE 1

| Sample | Reaction conditions | Type of surfactant |
| --- | --- | --- |
| 3 | 6N NaOH, 5 g | 12 carbon atoms |
| 4 | 6N NaOH, 1.5 g | 12 carbon atoms |
| 5 | 6N NaOH, 0.1 g | 12 carbon atoms |
| 6 | 4N H$_2$SO$_4$, 41 g | 12 carbon atoms |
| 7 | via oligomer | 12 carbon atoms |
| 8 | via oligomer | 16 carbon atoms |

The via oligomer synthesis was performed as follows. To 2.03 g of BTMe was added 10 g of a 6N NaOH aqueous solution, and the mixture was stirred at room temperature for 1.75 hours. To this solution was added 40.98 g of a 4N H$_2$SO$_4$ aqueous solution into which 2.44 g of dodecyltrimethylammonium bromide had been dissolved. The mixture was stirred for 30 minutes and then left for 47 hours. The produced precipitate was washed twice with 300 ml of ion-exchanged water and air-dried (sample 7). The same synthesis as sample 7 was utilized to prepare sample 8, except that hexadecyltrimethylammonium chloride was used as the surfactant in the same molar amount as the dodecyltrimethylammonium bromide used in preparation of sample 7.

Figure 10:
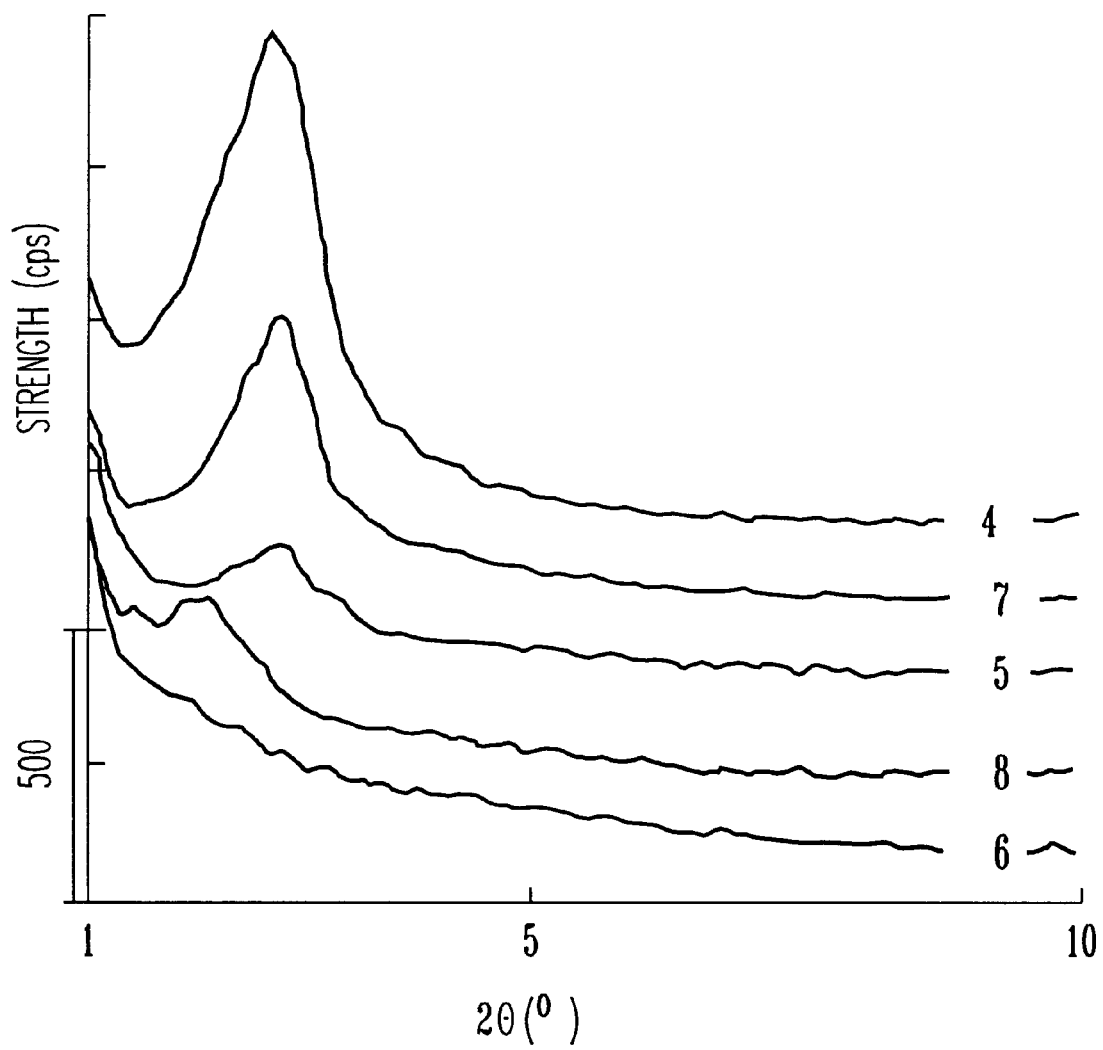
FIG. 10 is a view showing XRD patterns of samples 4 to 8 synthesized in Example 4.

FIG. 10 shows XRD patterns of solid products (before removal of surfactant) synthesized from BTMe in the same manner as the polycondensation reaction system in Example 2, except the solutions added, the particular surfactants and the reaction conditions were changed as shown in Table 1.

When the amount of added NaOH was too large (sample 3; 6N NaOH=5 g), the polycondensation speed was slow, and a precipitate did not appear until a reaction time of about 50 hours. When the amount of added NaOH was less (sample 5; 6N NaOH=0.1 g), the reaction speed was fast; however, regularity in the structure of the product was low. With an intermediate addition amount (sample 4; 6N NaOH=1.5 g), a product having relatively high regularity in structure was obtained.

On the other hand, in a system to which H$_2$SO$_4$ was added (sample 6), although the polycondensation reaction speed was fast, the product did not show clear XRD peaks, thereby indicating low regularity in structure. When lesser amounts of H$_2$SO$_4$ were used as a catalyst (not shown as sample), the reaction speed was slow and a precipitate was not produced, even after one month.

In via oligomer synthesis systems (samples 7, 8), a product having high structural regularity was not obtained. But when a template having 12 carbon atoms was used (sample 7), a product having relatively good regularity was obtained. Thus, the pH of the reaction solution also exerted influence on the structure of the product pore wall.

Figure 11A:
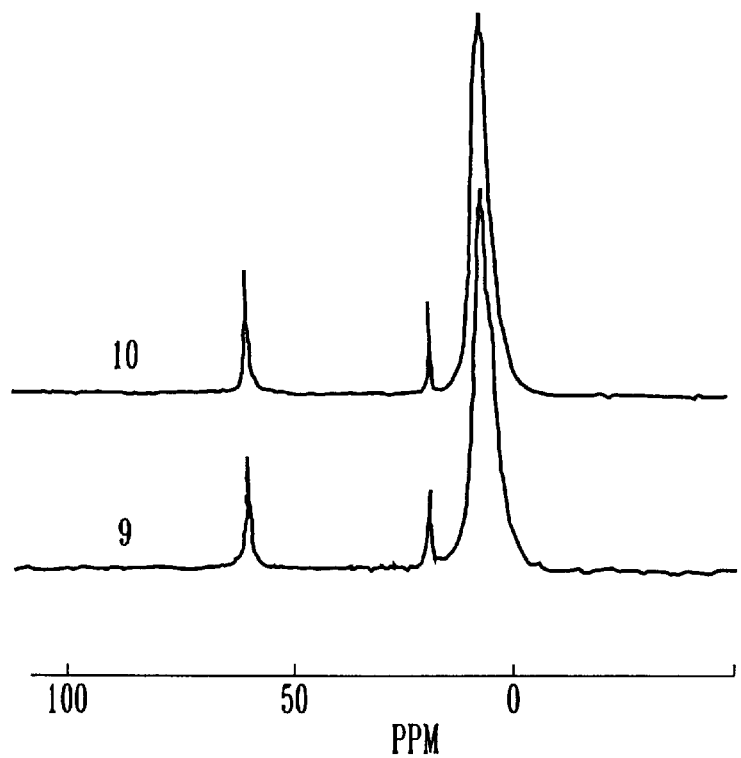
FIG. 11A is a view showing the $^{13}$C-NMR spectra of samples 9 and 10 synthesized in Example 4.
Figure 11B:
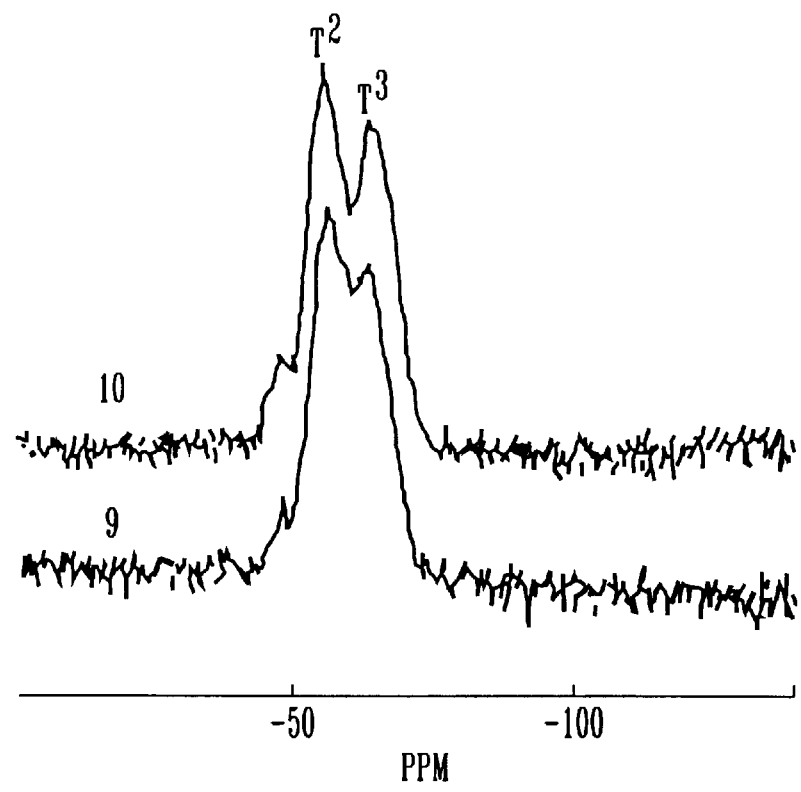
FIG. 11B is a view showing the $^{29}$Si-NMR of samples 9 and 10.

FIG. 11A shows the $^{13}$C NMR spectrum of a porous material (sample 9) obtained by removing the surfactant from sample 7 according to the same steps as in Example 2, and a porous material (sample 10) obtained by the same polycondensation and surfactant removal steps in Example 2, except that 1.8 mmol of dodecyltrimethylammonium bromide was used based on 2.03 g (7.5 mmol) of BTMe. FIG. 11B shows the $^{29}$Si NMR spectra of sample 9 and 10.

In the $^{29}$Si NMR spectrum (FIG. 11B), the T2 and T3 peaks of the product (sample 10) synthesized in a NaOH solution were separate, and the T3 peak of the product (sample 9) synthesized using the via oligomer system was a shoulder peak. Thus, it was recognized that the degree of polymerization was higher under alkaline conditions.

In the $^{13}$C NMR spectrum (FIG. 11A), no differences were observed between samples 9 and 10.

EXAMPLE 5

Reaction Temperatures

Figure 12:
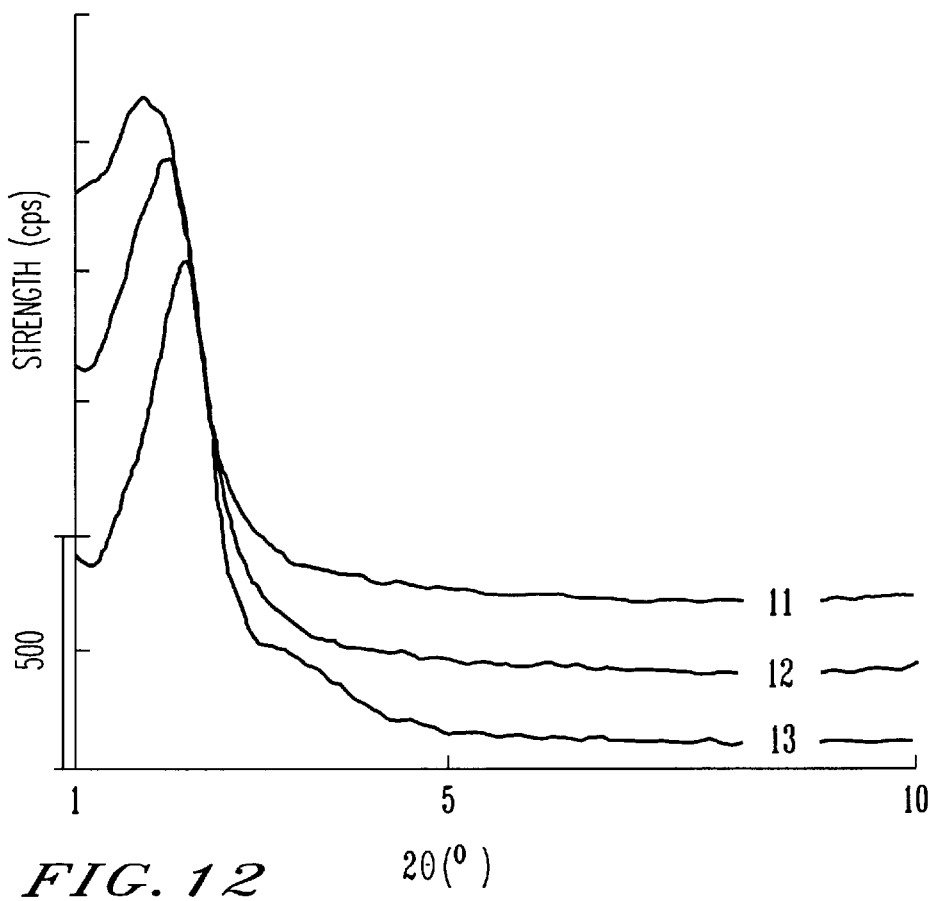
FIG. 12 is a view showing the XRD patterns of samples 11 to 13 obtained in Example 5.
Figure 13:
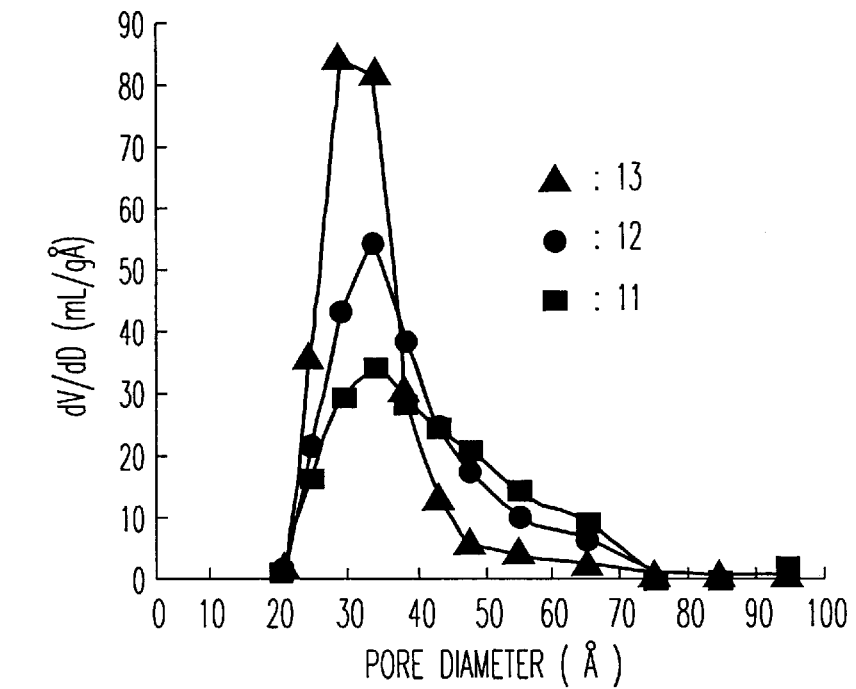
FIG. 13 is a view showing a pore size distribution curve after removal of the surfactant from samples 11 to 13 obtained in Example 5.
Figure 14A:
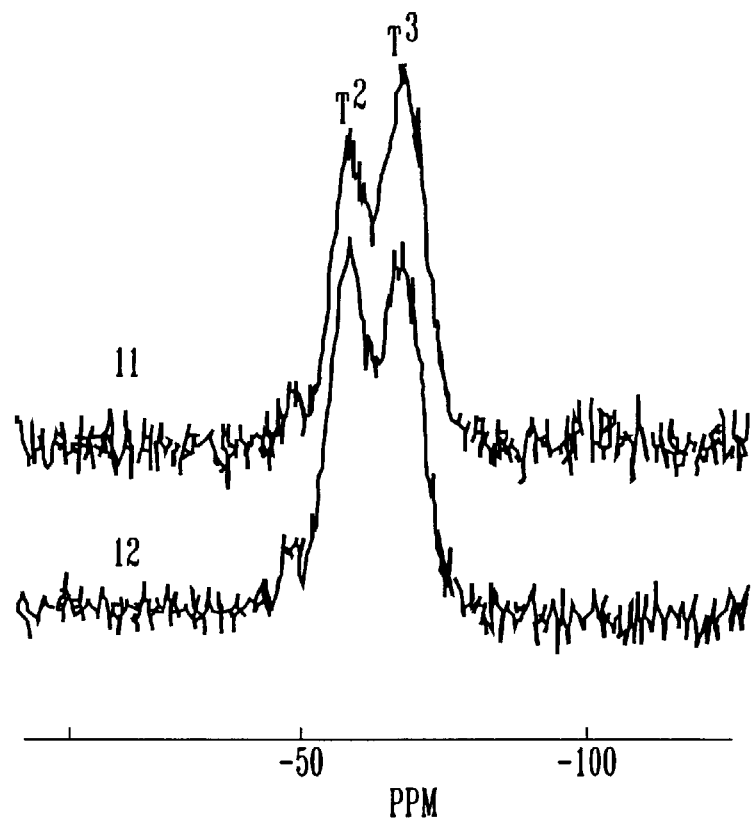
FIG. 14 is a view showing the $^{29}$Si-NMR spectra of samples 11 to 13 obtained in Example 5.
Figure 14B:
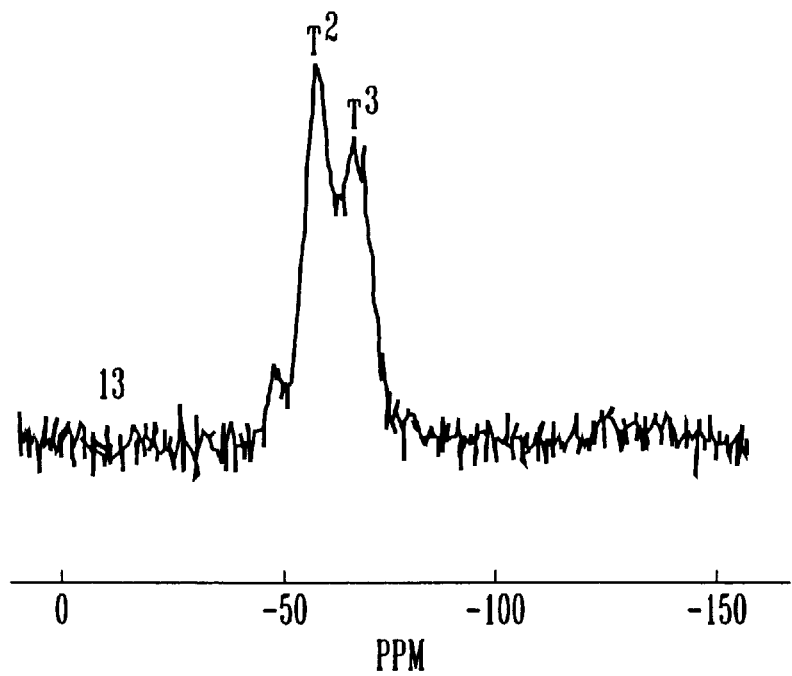

FIG. 12 shows XRD patterns of products (before removal of the surfactant) synthesized under the conditions shown in Table 2. The total reaction time of each sample was about 22.4 hours. The $^{29}$Si NMR spectra for these samples are shown in FIG. 14 and the pore size distribution curves for the porous materials obtained by removing the surfactant according to Example 2 from these samples are shown in FIG. 13.

TABLE 2

| Sample | Reaction condition | Specific surface area (m$^2$/g) |
| --- | --- | --- |
| 11 | 70° C., 30.7 hours | 965 |
| 12 | 70° C., 4.5 hours | 1194 |
| 13 | room temperature, 22.4 hours | 1547 |

According to the results shown in FIG. 12, when the reaction temperature was higher, the diffraction peak shifted to the lower angle side and the peak became broader. This change is believed to be caused by the swelling of the surfactant micelles, due to the increased thermal motion of the surfactant molecules in the reaction mixture. As shown in FIG. 13, in a pore size distribution curve of a sample from which the surfactant had been removed, the pore size distribution became broader as a result of the increased reaction temperature.

Regarding the specific surface area of each sample (as shown in Table 2), the product synthesized at room temperature (sample 13) had a specific surface area of about 1550 m$^2$/g and about 1000 m$^2$/g at 70° C. Further, at 70° C., the specific surface area was less when the reaction time was longer.

In the $^{29}$Si NMR spectrum of FIG. 14, the T3 peak of the product was stronger when reaction temperature is higher (samples 11, 12), indicating that the product synthesized at 70° C. had a higher degree of polymerization and higher stability.

In addition to the above samples, samples were synthesized using the following via oligomer method. To 2.03 g of BTMe were added 3 g of a 6N NaOH aqueous solution and 7 g of water and the mixture was stirred for 2 hours at room temperature. To this mixture was added 40 g of water and hexadodecyltrimethylammonium chloride was added at 70° C. The mixture was stirred for 3 hours at 70° C. Then 4N $H_2SO_4$ was added to adjust the pH of the solution to 8.6, the mixture was stirred for 3.5 hours at 70° C., then left for 14 hours at room temperature, and further stirred for 7 hours at 70° C. The mixture was then washed twice with 300 ml of water and air-dried to obtain sample 14 (temperature during stirring: 70° C., total stirring time: 13.5 hours). Sample 15 was obtained by utilizing the same conditions as sample 14, except that the temperature at which the surfactant was added and the subsequent stirring temperature were reduced to 46° C.

Figure 15:
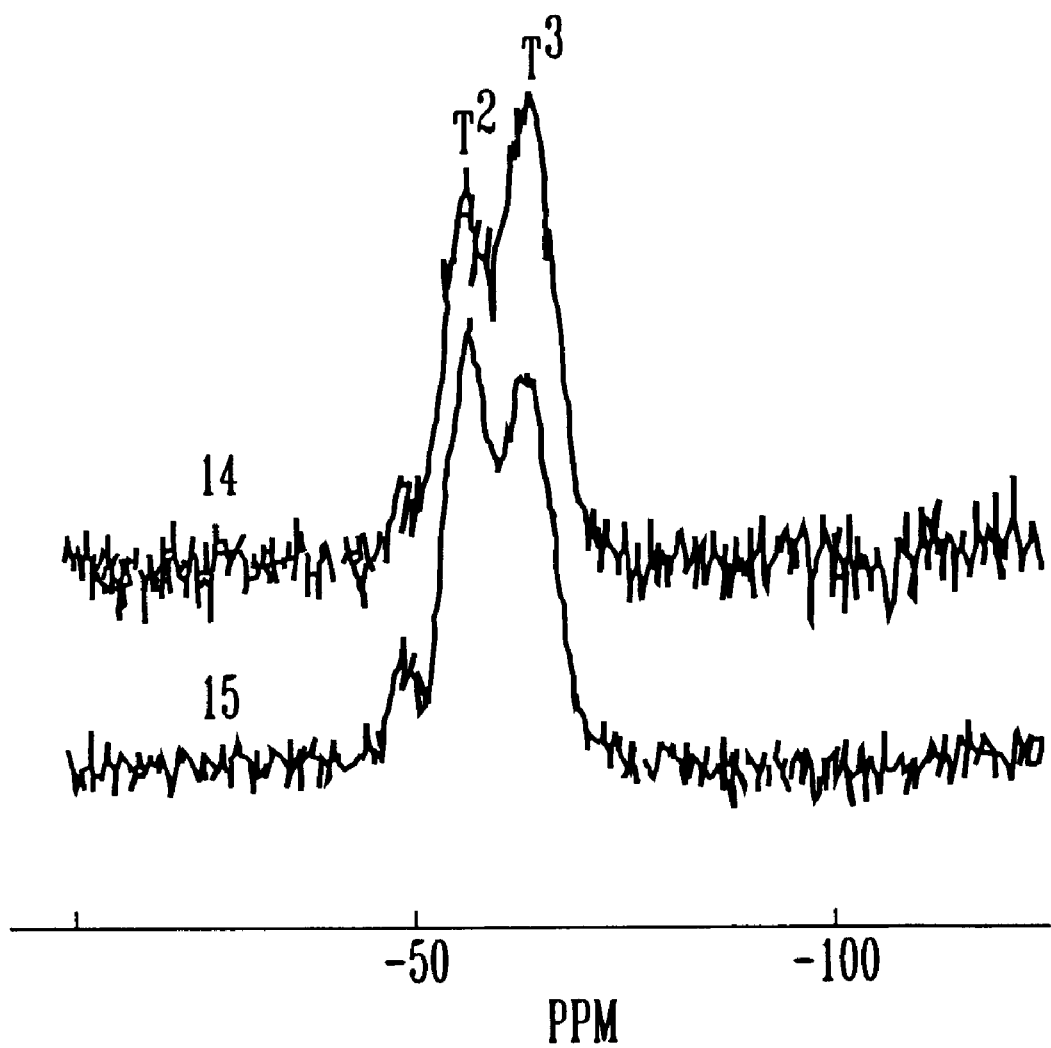
FIG. 15 is a view showing the $^{29}$Si-NMR spectra of samples 14 and 15 obtained in Example 5.

The $^{29}$Si NMR spectra of samples 14 and 15 are shown in FIG. 15. This figure shows that the T3 peak of the product was stronger when reaction temperature is higher, thereby indicating that the product synthesized at 70° C. had a higher degree of polymerization and higher stability.

EXAMPLE 6

Alkyl Chain Length of the Surfactant and the BTMe/Surfactant Ratio

The alkyl chain length of the surfactant was found to affect the reaction speed, the pore diameter and the regularity of product structure. Products (before removal of surfactant) were obtained by utilizing the polycondensation reaction system of Example 2 (same reaction molar ratio, reaction conditions and the like), except that sample 16 was prepared using hexadecyltrimethylammonium chloride (having 16 carbon atoms) as the surfactant, sample 17 was prepared using dodecyltrimethylammonium bromide (having 12 carbon atoms) as the surfactant and sample 18 was prepared without a surfactant. The precipitate appeared earlier in sample 16 than in sample 17. In the case of no surfactant (sample 18), no precipitate was formed. Also, in a system using octyltrimethylammonium chloride having 8 carbon atoms, precipitate was not obtained even according to the polycondensation reaction of Example 2.

Figure 16:
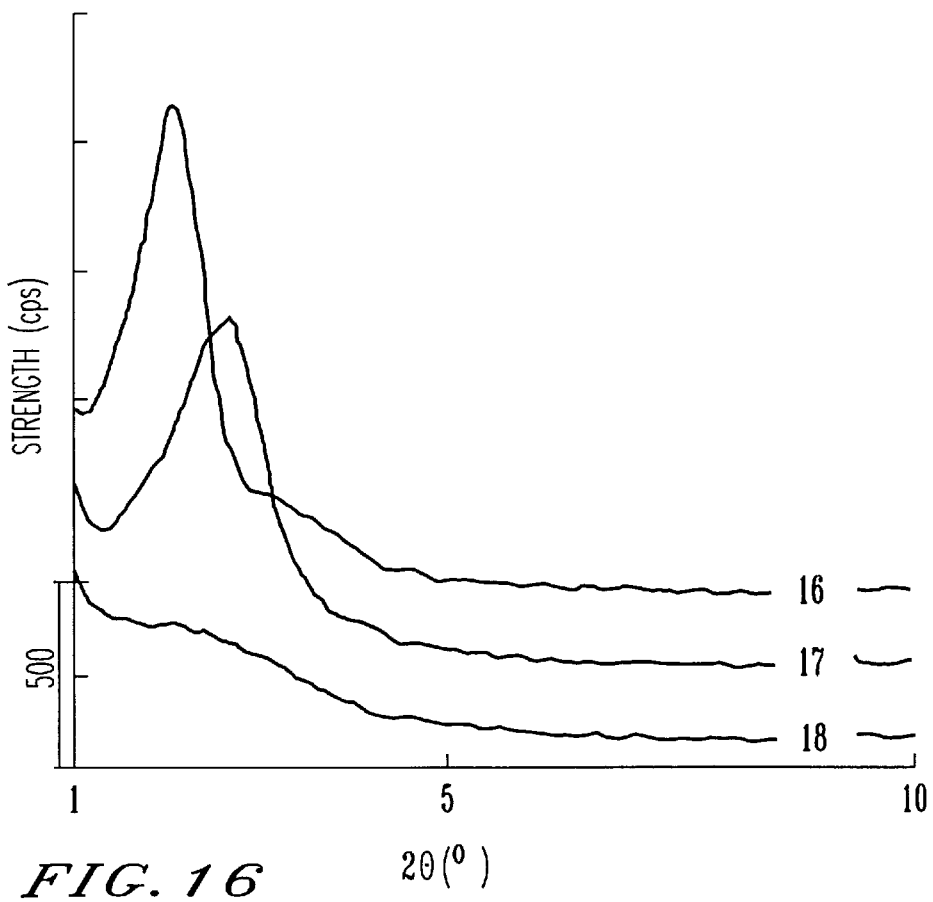
FIG. 16 is a view showing the XRD patterns of samples 16 to 18 obtained in Example 6.
Figure 17:
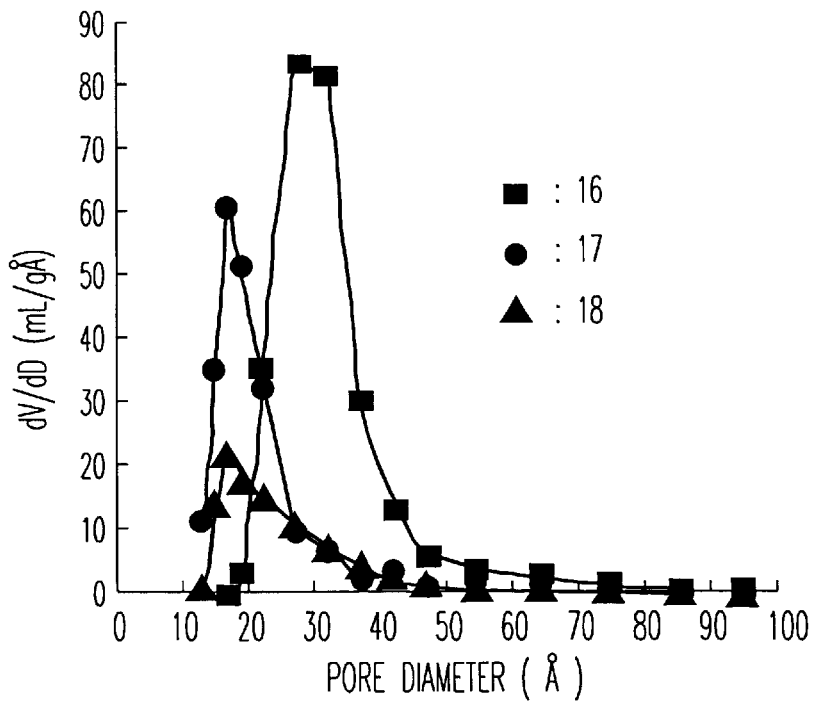
FIG. 17 is a view showing the pore size distribution curve after removal of the surfactant from samples 16 to 18 obtained in Example 6.

The XRD patterns of these samples are shown in FIG. 16 and the pore size distribution curves of each sample from which the surfactant had been removed according to Example 2 are shown in FIG. 17. In the results shown in FIG. 16, sample 18 did not exhibit a clear diffraction peak. Sample 16 had a sharper diffraction peak than sample 17. The pore size distribution curves shown in FIG. 17 show that samples 16 and 17 had a mean pore diameter of about 3 nm and about 2 nm, respectively. The relative specific surface areas of the three samples were: sample 16>sample 17>sample 18. Although a pore diameter of 1.5 nm or less cannot be evaluated by the nitrogen adsorption method, it is believed that sample 18 contains micro pores of 1.5 nm or less.

Figure 18:
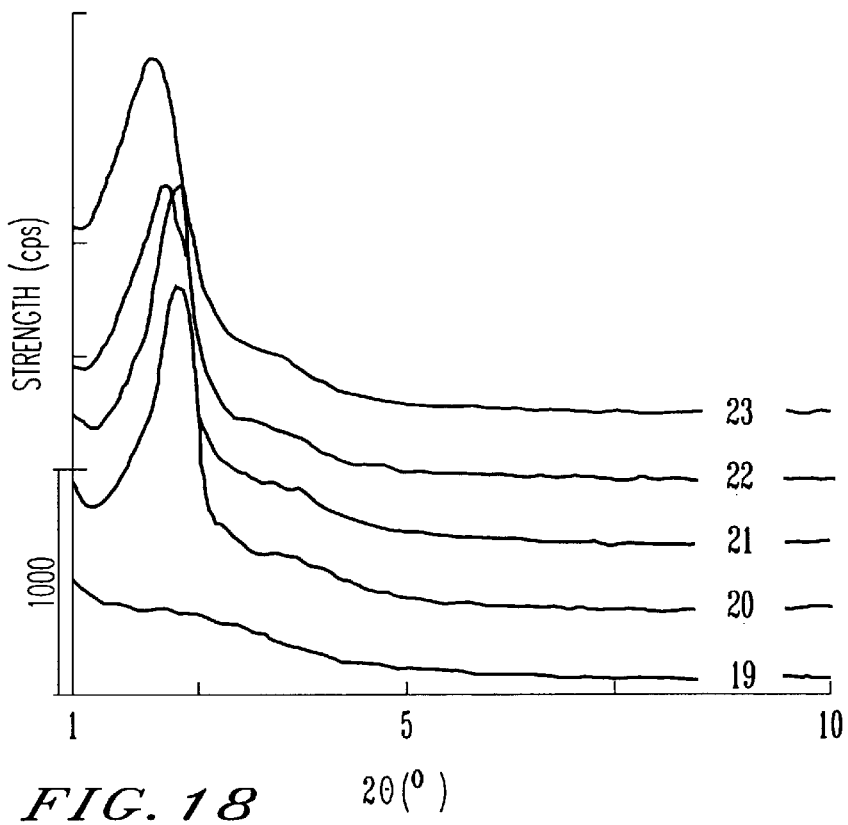
FIG. 18 is a view showing the XRD patterns of samples 19 to 23 obtained in Example 6.
Figure 19:
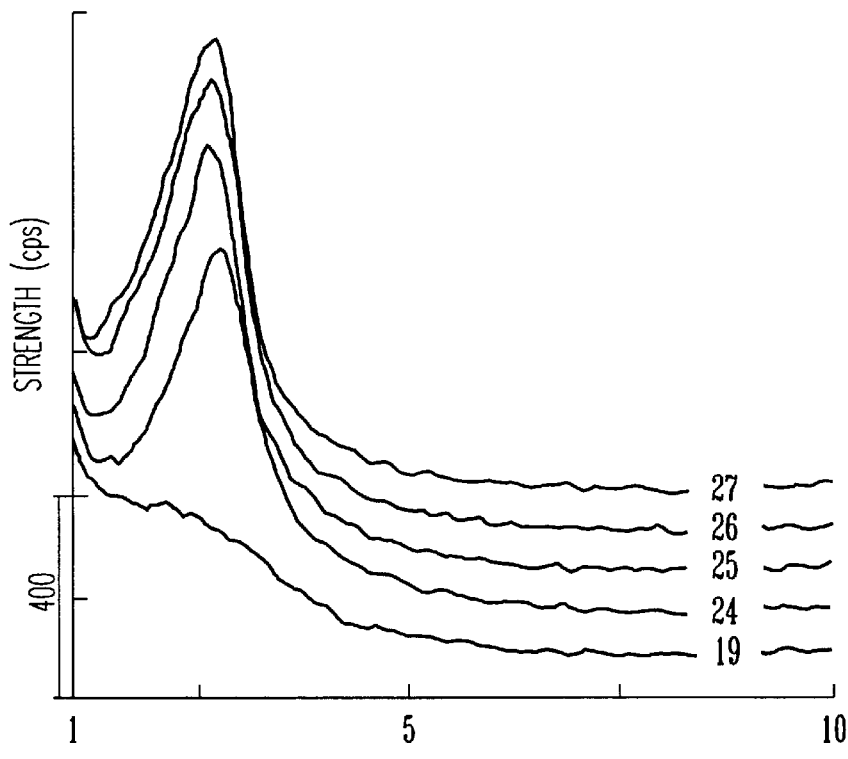
FIG. 19 is a view showing the XRD patterns of samples 19, 24 to 27 obtained in Example 6.

Further, in this example, the effect of the molar ratio of the BTMe/surfactant (BTMe/S) on the structure of the product was evaluated. FIG. 18 and FIG. 19 show XRD patterns of products (before removal of surfactant)(samples 19 to 27) synthesized according to the polycondensation reaction system in Example 2, except the molar ratio of BTMe/S (hexadecyltrimethylammonium chloride or dodecyltrimethylammonium bromide) was varied according to the range shown in Table 3.

TABLE 3

| Sample | BTMe/S molar ratio (number of carbon atoms in the surfactant) |
|---|---|
| 19 | 75/0 |
| 20 | 75/9 (C16) |
| 21 | 75/18 (C16) |
| 22 | 75/36 (C16) |
| 23 | 75/72 (C16) |
| 24 | 75/9 (C12) |
| 25 | 75/18 (C12) |
| 26 | 75/36 (C12) |
| 27 | 75/72 (C12) |

When the content of the surfactant (S) was large, the XRD peak of the product tended to broaden and shift to the lower angle side. If a surfactant having 16 carbon atoms was utilized in the BTMe/S ratio range from 75/9 to 75/18, products having relatively excellent regularity were obtained (samples 20 and 21). On the other hand, when a surfactant having 12 carbon atoms was used (samples 24 to 27), the XRD peak had a tendency to increase somewhat according to an increase in the amount of surfactant.

EXAMPLE 7

Si Starting Materials

Figure 20:
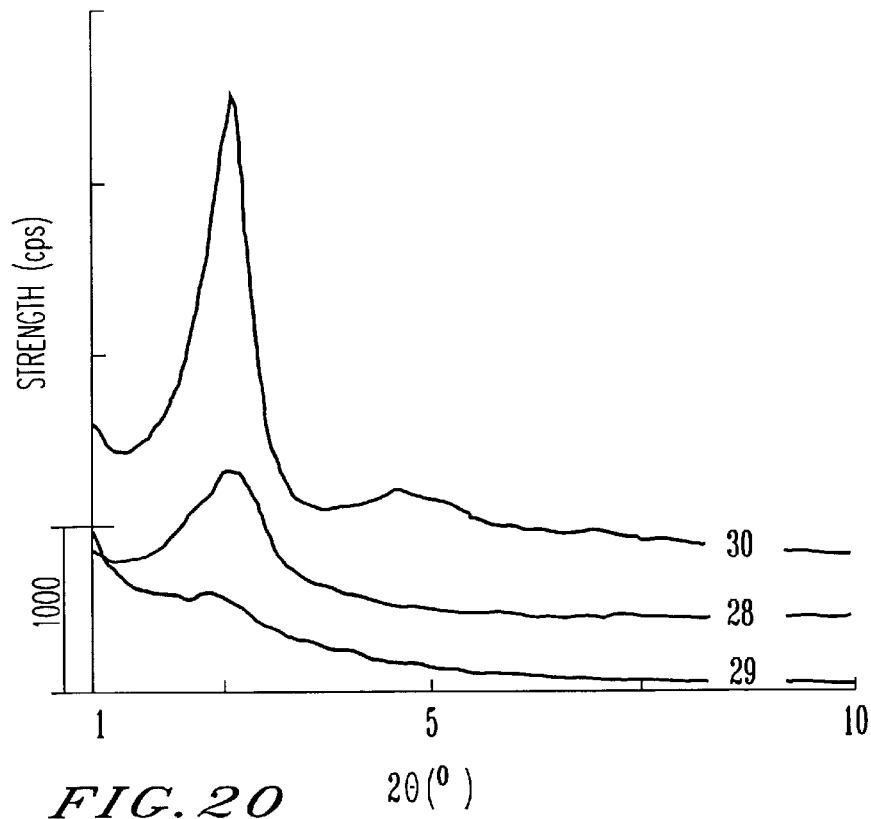
FIG. 20 is a view showing the XRD patterns of samples 28 to 30 obtained in Example 7.
Figure 21:
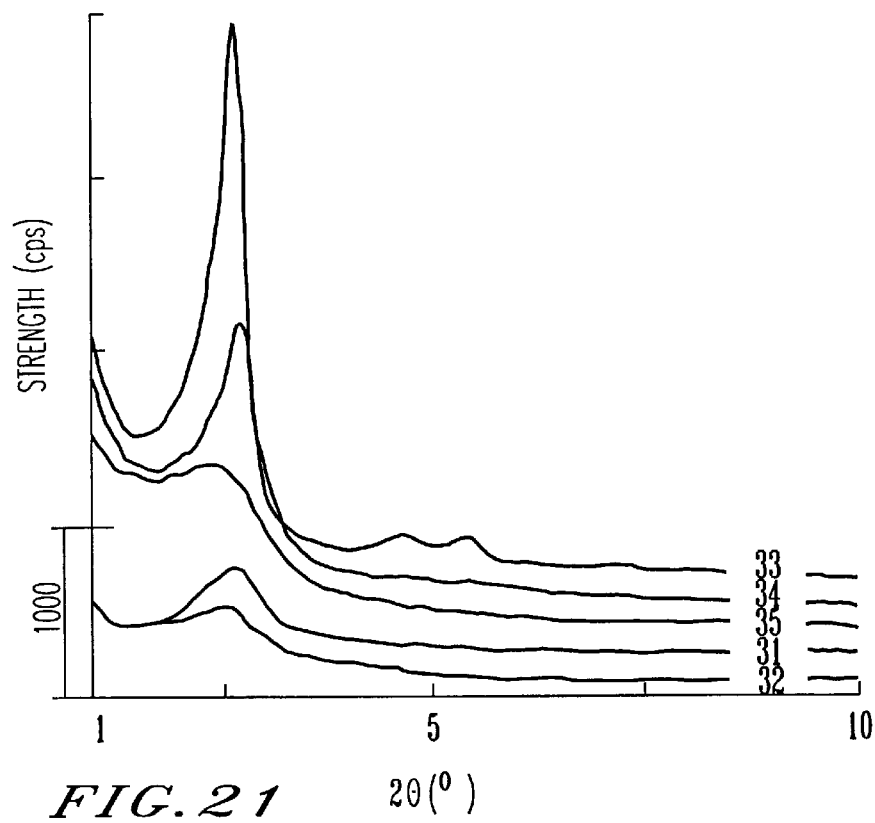
FIG. 21 is a view showing the XRD patterns of samples 31 to 35 obtained in Example 7.

XRD patterns are shown in FIG. 20 for products (before removal of surfactant)(samples 28 to 30) obtained by performing the polycondensation reaction using the same conditions (reaction molar ratio and other reaction conditions) as shown in Example 2, except that BTMe, 1,2-bis(trichlorosilyl)ethane (BECl) or $Si(OCH_3)_4$ were respectively used as the Si starting material. XRD patterns are shown in FIG. 21 for products (before removal of surfactant) (samples 31 to 35) obtained by performing the polycondensation reaction using the same conditions (reaction molar ratio and other reaction conditions) as those for the polycondensation system via an oligomer shown in Example 4, except that BTMe, BECl, $SiCl_4$, or $BECl:SiCl_4$ (weight ratio, 1:1) were respectively used as the Si starting material.

It was found that when $Si(OCH_3)_4$ is used (sample 30), a product having high regularity tends to be formed. On the other hand, when BECl(sample 29) was used, only a product having low regularity could be obtained. If the products were synthesized using the via oligomer system, the starting materials that produced products having high regularity are arranged in the following descendant order: $SiCl_4$ (samples 33 and 34)>BTMe (sample 31)>BECl(sample 32), as shown in FIG. 21. The product obtained by using $SiCl_4$ as the starting material exhibited excellent regularity (FIG. 21).

From the experimental results above, a correlation was noted. In particular, when the hydrophilicity of the Si starting material is high, the regularity in structure of the product is high. It is believed that because BTMe and BECl containing —$CH_2CH_2$—, which is a hydrophobic group, do not easily form regular micelles with the surfactant, regularity in the structure of the products is poor compared to systems in which $SiCl_4$ or $Si(OCH_3)_4$ are utilized.

EXAMPLE 8

Removal of Surfactant (1)

Figure 22:
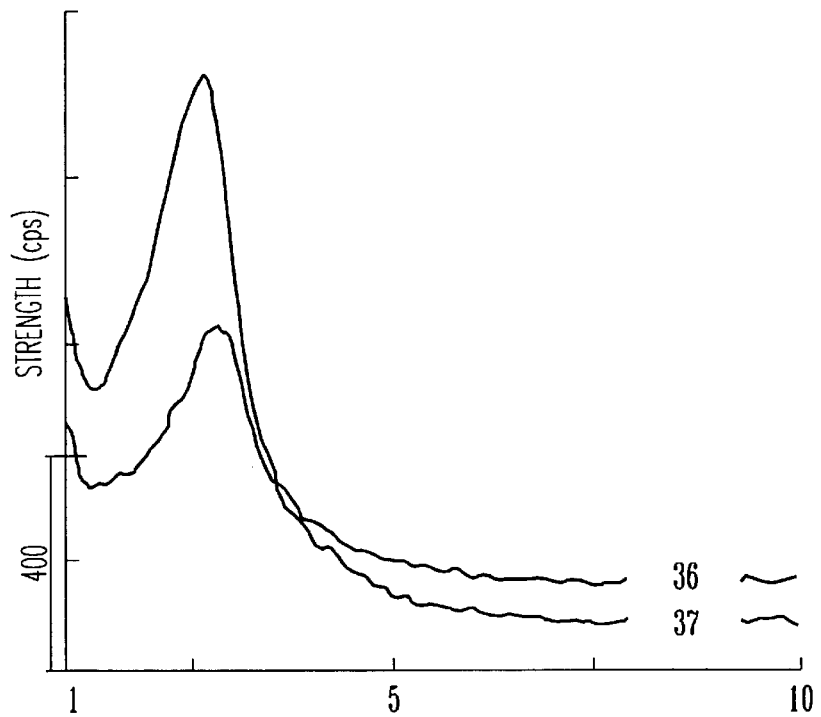
FIG. 22 is a view showing the XRD patterns of samples 36 and 37 obtained in Example 8.

1.0 g of the porous material precursor (i.e., the product before removal of surfactant) synthesized according to Example 2 was added to 500 ml of a HCl—EtOH solution (36 g concentrated hydrochloric acid/1 L EtOH), the mixture was stirred for 10 hours at 70° C., left for 14 hours at room temperature, and further stirred for 10 hours at 70° C. Then, the mixture was cooled to room temperature before filtration. The precipitate was washed with 150 ml of anhydrous ethanol and air-dried to obtain a porous material. XRD patterns of the samples before and after extraction of the surfactant according to this example (before extraction: sample 36; after extraction: sample 37) are shown in FIG. 22. Also $^{29}$Si-NMR spectra are shown in FIG. 23.

In the case of removal of the surfactant in this example (70° C., HCl—EtOH in high concentration), the XRD peak is weaker and the d value is lower by about 1.4, as compared with the structure of the product obtained by extraction of the surfactant at 50° C. shown in Example 2. It was found that a change in the structure of a product is greater under removal conditions at 70° C.

Figure 23A:
FIG. 23 is a view showing the $^{29}$Si-NMR spectra of samples 36 and 37 obtained in Example 8.
Figure 23B:
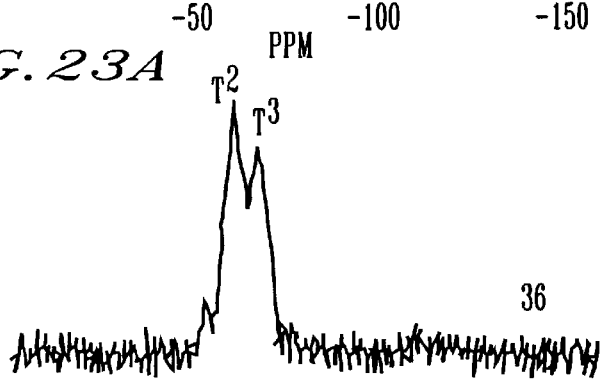

The decrease in the peak ratio T2/T3 in the $^{29}$Si NMR spectra, due to removal of the surfactant, indicates the occurrence of re-polycondensation of the remaining Si—OCH$_3$ (or Si—OH) by HCl—EtOH treatment (FIG. 23). It was found that the surfactant was almost completely removed, because the $^{13}$C-NMR spectrum of the sample treated at 70° C. did not have a resonant peak consistent with the surfactant carbon atoms.

EXAMPLE 9
Removal of Surfactant (2)

Figure 24:
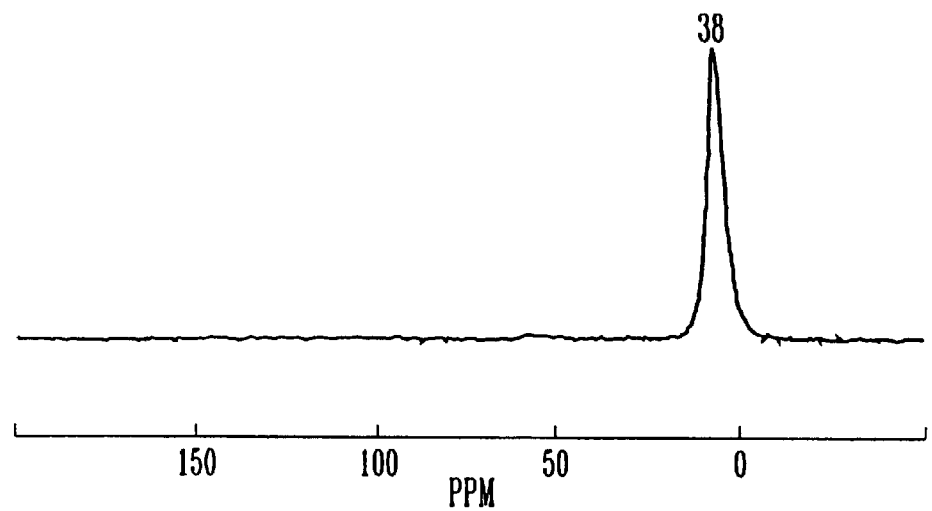
FIG. 24 is a view showing the $^{13}$C-NMR spectrum of sample 38 obtained in Example 9.
Figure 25:
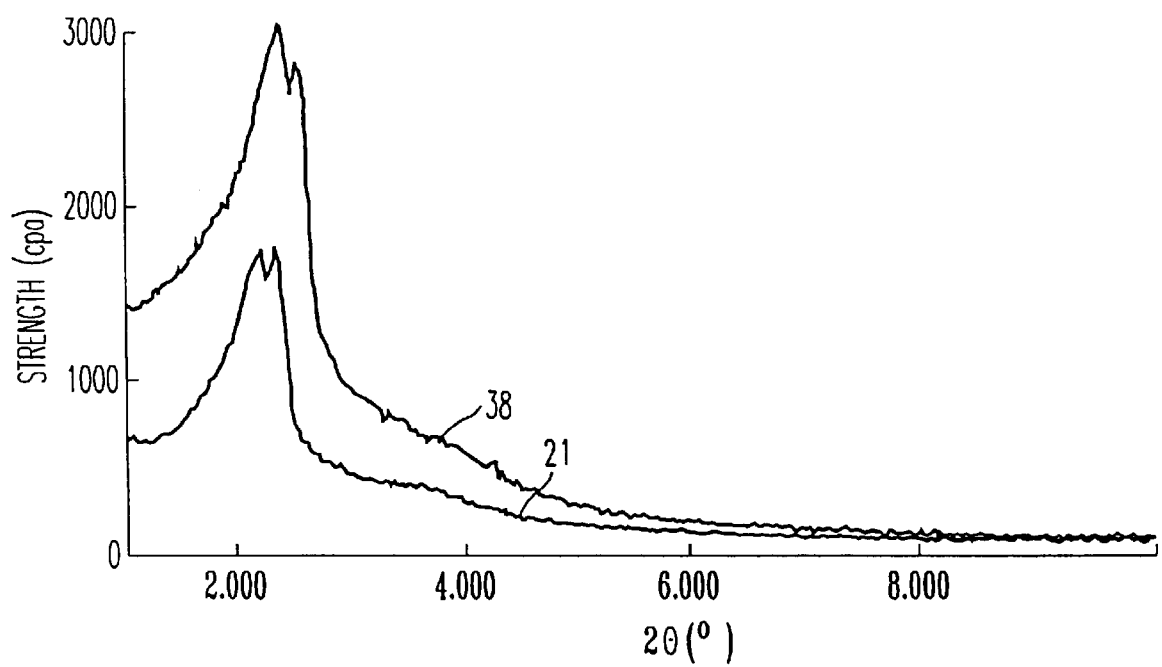
FIG. 25 is a view showing the XRD patterns of sample 38 obtained in Example 9 and XRD patterns of sample 21 obtained in Example 6.
Figure 26:
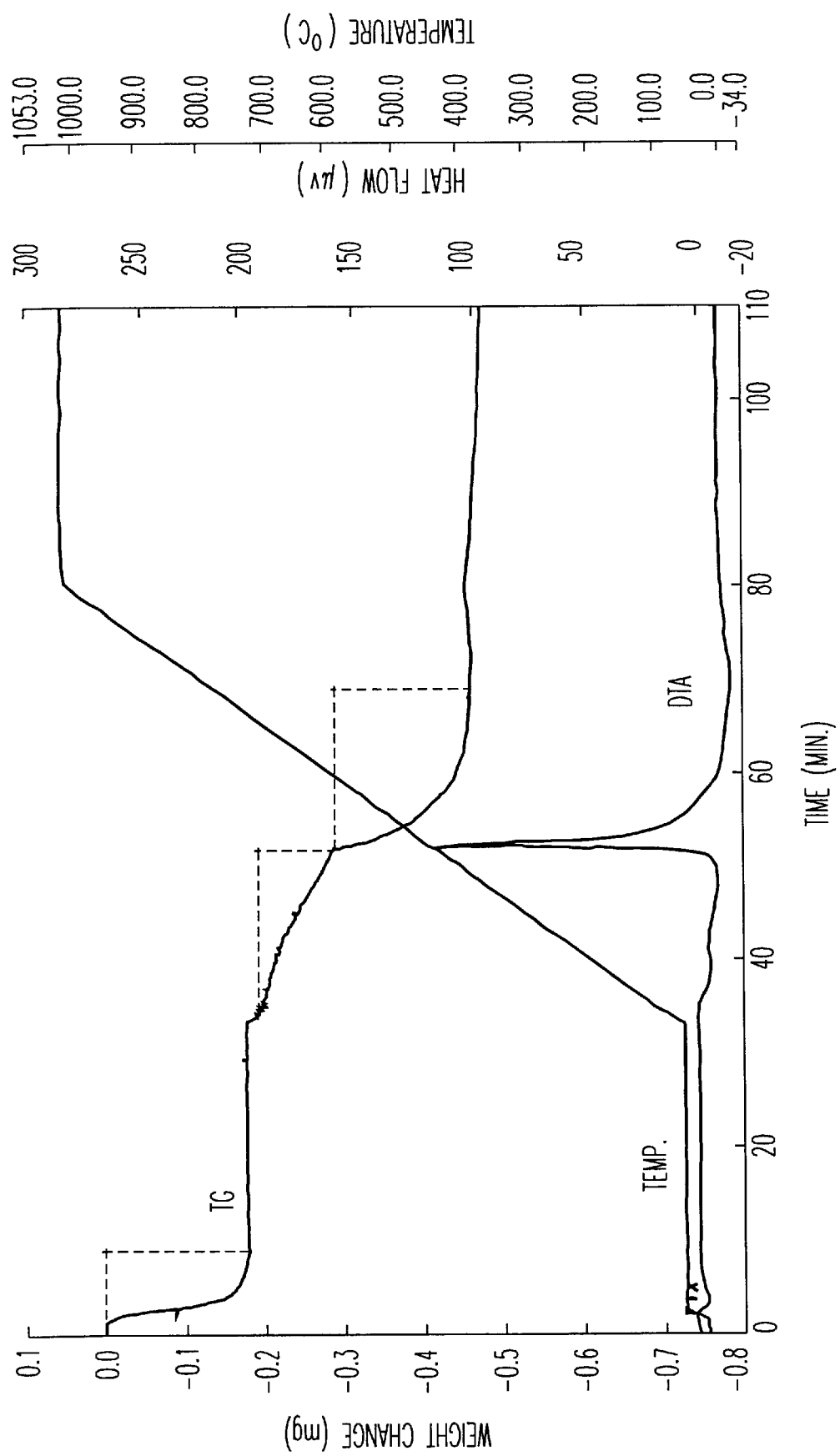
FIG. 26 is a view showing results of a thermogravimetric analysis of sample 38 obtained in Example 9.
Figure 27A:
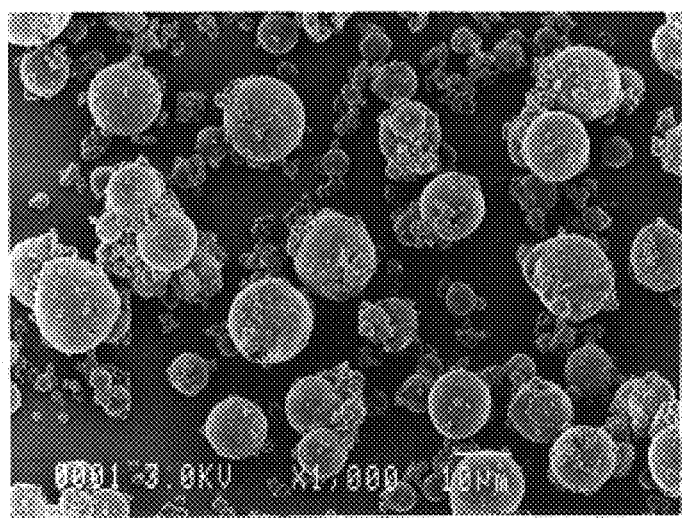
FIG. 27A is a scanning electron micrograph of sample 39 obtained in Example 10 having a magnification of 1000×.
Figure 27B:
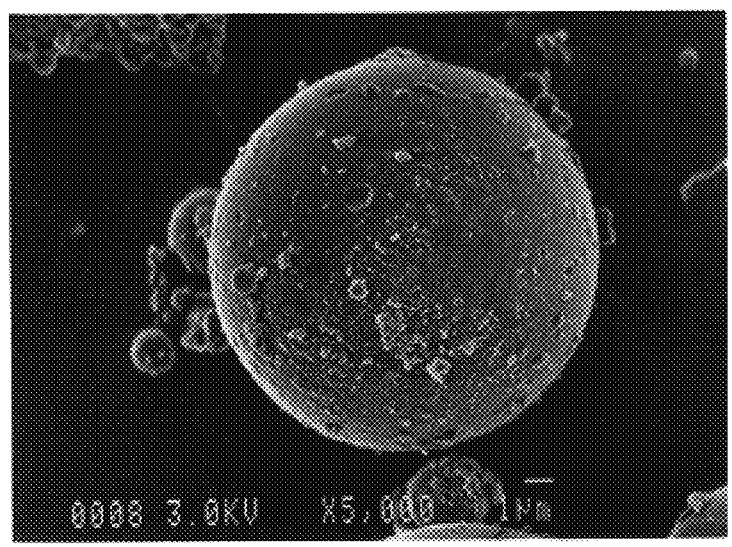
FIG. 27B is a scanning electron micrograph of sample 39 obtained in Example 10 having a magnification of 5000×.
Figure 28:
FIG. 28 is a transmission electron micrograph (with a magnification of 400,000×) of sample 39 obtained in Example 10.
Figure 29:
FIG. 29 is a view showing an electron diffraction pattern of sample 39 corresponding to FIG. 28.
Figure 30:
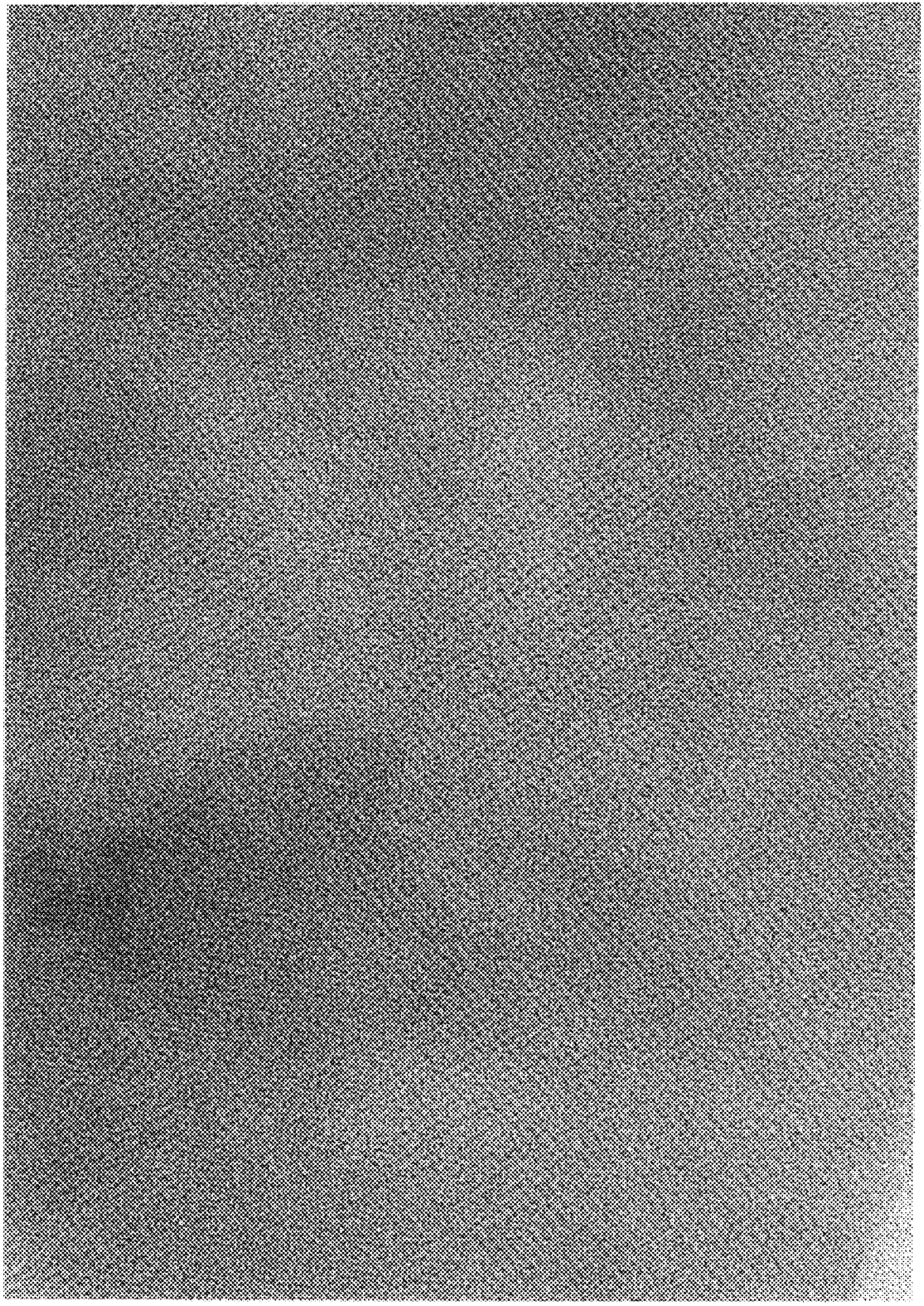
FIG. 30 is a transmission electron micrograph (with a magnification of 400,000×) of sample 39 obtained in Example 10.
Figure 31:
FIG. 31 is an electron diffraction pattern of sample 39 corresponding to FIG. 30.

1 g of porous material precursor (sample 21) produced using the BTMe/S(C16) ratio of 75/18, as described in Example 6, was added to 153.8 g of diluted hydrochloric acid (prepared by mixing 3.8 g of concentrated hydrochloric acid with 150 g of ion-exchanged water), the mixture was stirred for 6 hours at 50° C. and filtered. The recovered precipitate was treated with a HCl—H$_2$O solution under the same conditions, then washed three-times with 350 ml of ion-exchanged water and air-dried to obtain a porous material (sample 38). Element analysis, $^{13}$C-NMR, X-ray diffraction and thermogravimetric analysis were conducted using this porous material and the results are shown in FIGS. 24–26, respectively.

The results of the element analysis of this material are as follows: C: 13.1%, H: 4.5%, N: 0%, SiO$_2$: 75.6%. Failure to detect a nitrogen (N) component indicated complete removal of the surfactant. In the $^{13}$C-NMR spectrum (FIG. 24) of this porous material, peaks at d=6 and 60 ppm were observed; however, no peak was observed at d=18 ppm. Therefore, the peak at d=18 ppm (example 2) observed in the case of extraction of the surfactant in ethanol have been attributed to Si—C$_2$H$_5$ produced by reaction of the ethanol solvent with the surface silanol group. From the XRD patterns (FIG. 25), it was confirmed that a regular structure is maintained. From the thermogravimetric analysis (FIG. 26), a significant reduction in weight was observed at 441° C., which indicates high heat resistance of this material.

EXAMPLE 10
Synthesis of Mesoporous Substance (2)

Into a 100 ml beaker were added 0.432 g (1.35 mmol) of n-hexadecyltrimethylammonium chloride, 30 g of ion-exchanged water and 1.5 g of a 6N NaOH aqueous solution (containing 7.5 mmol of NaOH). 2.03 g (7.5 mmol) of BTMe was added with vigorous stirring at room temperature and stirred for 3 hours. After being left for 14 hours at room temperature, the mixture was stirred for 12.5 hours, and the mixture was left for another 14 hours, then stirred for 6.9 hours and filtered. The precipitate was washed twice with 300 ml of ion-exchanged water and 1.90 g of a porous material precursor was obtained after being air-dried.

Removal of the surfactant from this porous material precursor was performed according to the following two methods.

(1) 1.0 g of the precursor was added to a mixture of 150 ml of anhydrous ethanol and 3.8 g of concentrated hydrochloric acid, the mixture was stirred for 6 hours at 50° C. and was filtered. The recovered precipitate was treated with HCl—EtOH again under the same conditions. The product was washed twice with 150 ml of anhydrous ethanol and air-dried to obtain a porous material (sample 39).

(2) 1.0 g of the precursor was added to a mixture of 50 ml of a HCl—EtOH solution (36% hydrochloric acid/1 L solution), the mixture was stirred for 10 hours at 70° C., left for 14 hours at room temperature and was further stirred for 10 hours at 70° C. Then the mixture was cooled to room temperature before filtration. The precipitate was washed with 150 ml of anhydrous ethanol, and air-dried to obtain a porous material (sample 40).

FIGS. 27 to 37 show the results of various analysis of these materials. The scanning electron micrographs of sample 39 shown in FIGS. 27A and 27B demonstrate that this sample has a spherical shape with a particle size in the submicron to tens of microns range. FIG. 28 and FIG. 29, FIG. 30 and FIG. 31, respectively, show TEM photographs of sample 39; however, surfaces observed of a crystal are different. Further, the pore structure of this sample was determined to be three-dimensional hexagonal judging from the electron beam diffraction photographs on respective observation surfaces.

Figure 32:
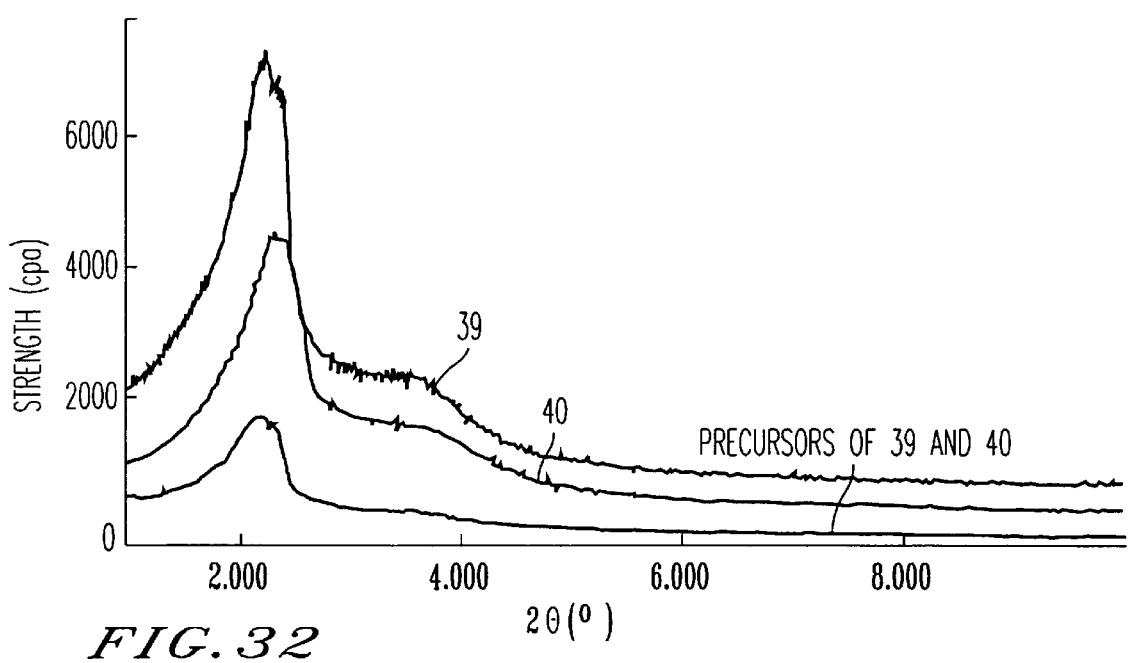
FIG. 32 is a view showing the XRD patterns of the porous material precursors of samples 39 and 40 obtained in Example 10.
Figure 33:
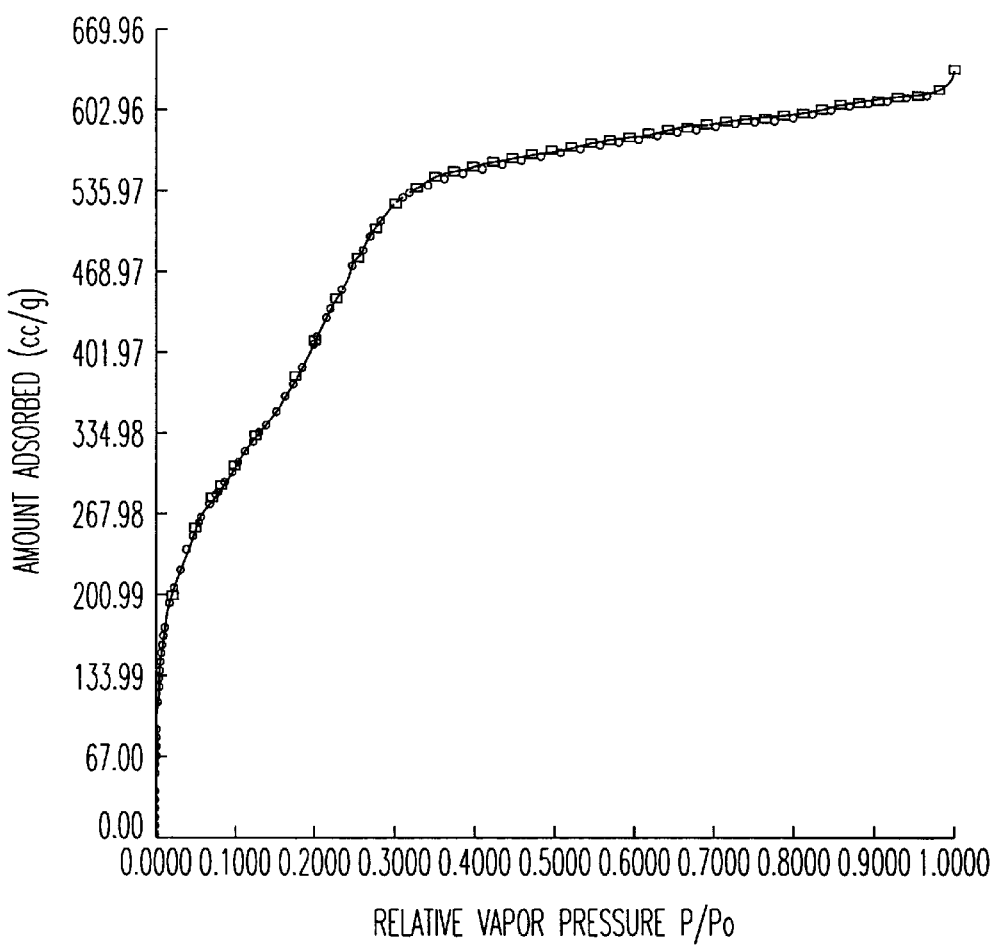
FIG. 33 is a view showing the nitrogen adsorption isotherm of sample 39 obtained in Example 10.
Figure 34:
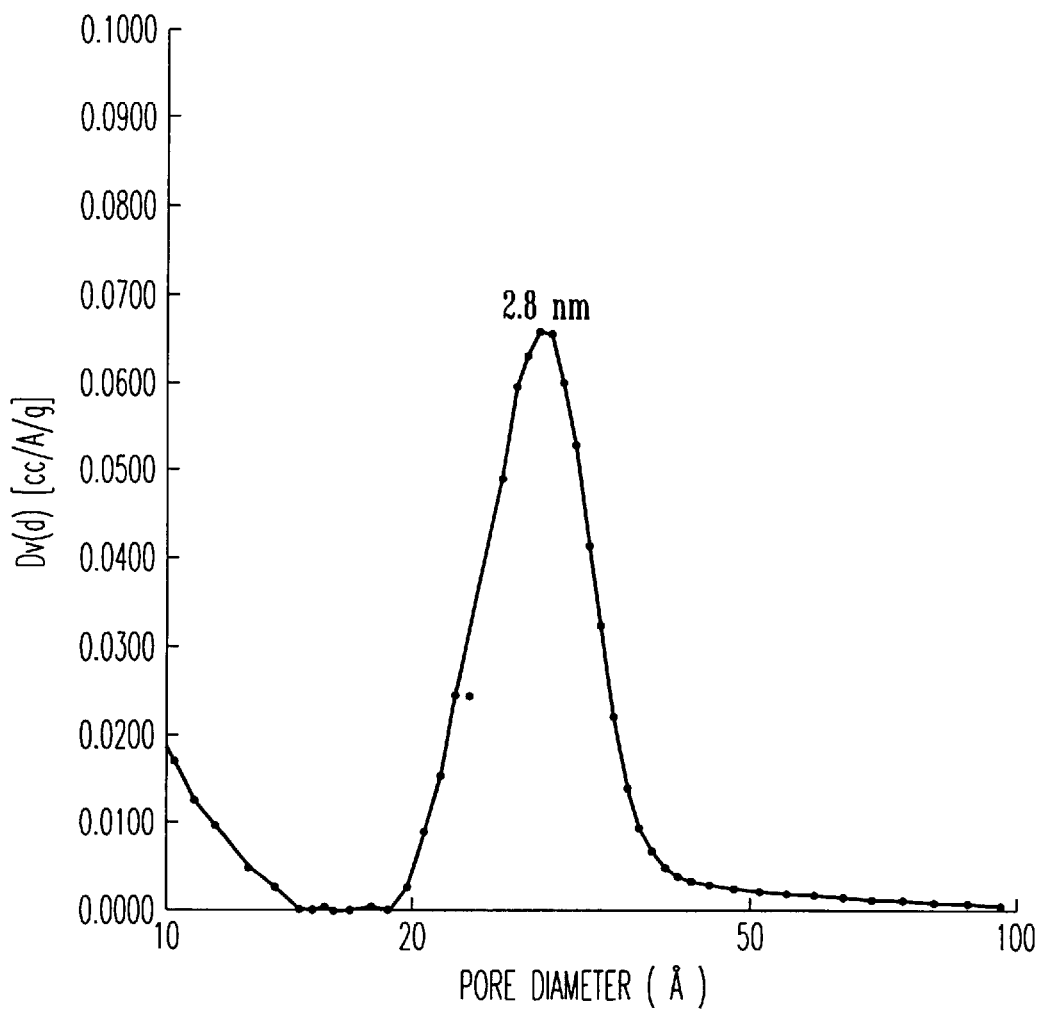
FIG. 34 is a view showing the pore size distribution curve of sample 39.
Figure 35:
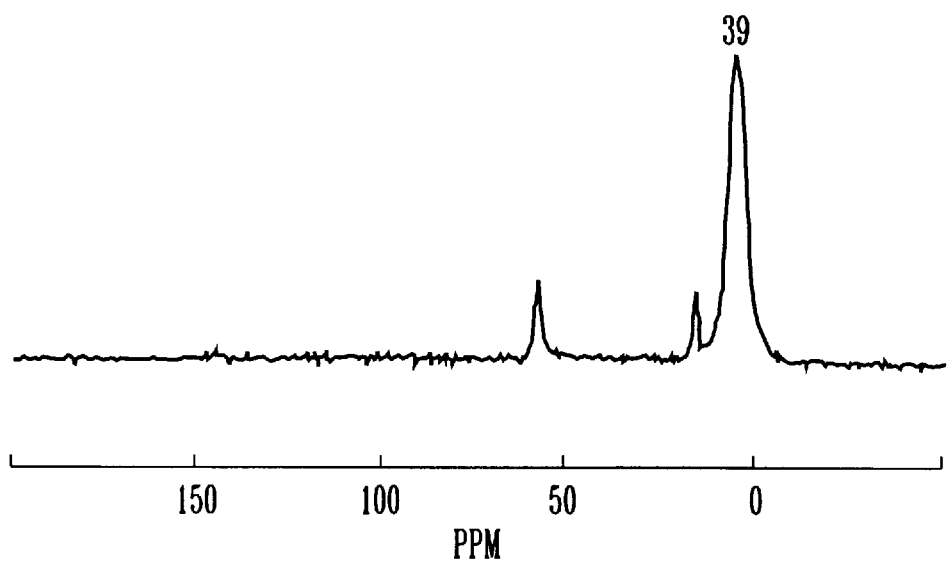
FIG. 35 is a view showing the $^{13}$C-NMR spectrum of sample 39 obtained in Example 10.
Figure 36A:
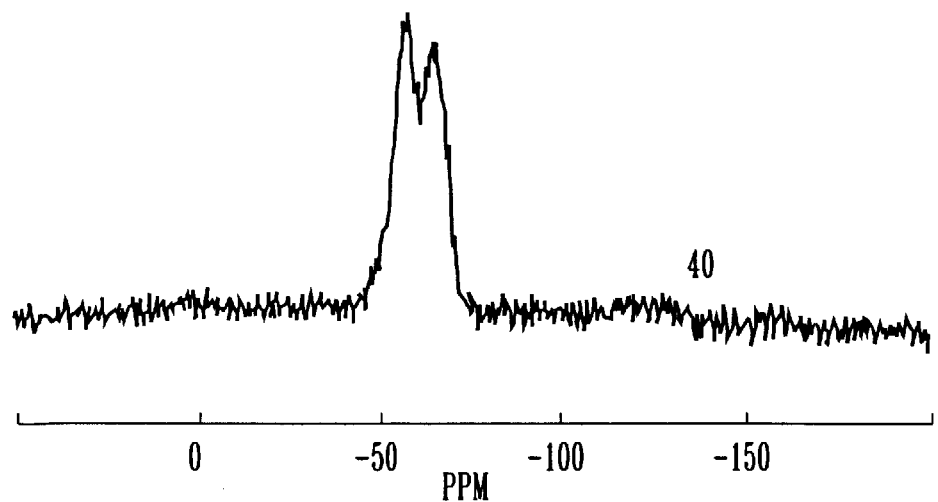
FIG. 36 is a view showing the $^{29}$Si-NMR spectra of the porous material precursors of samples 39 and 40 obtained in Example 10.
Figure 36B:
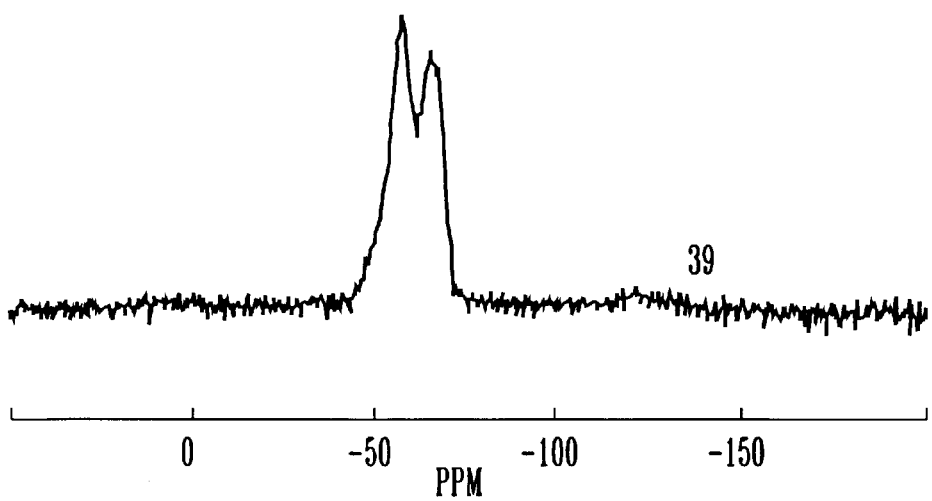
Figure 36C:
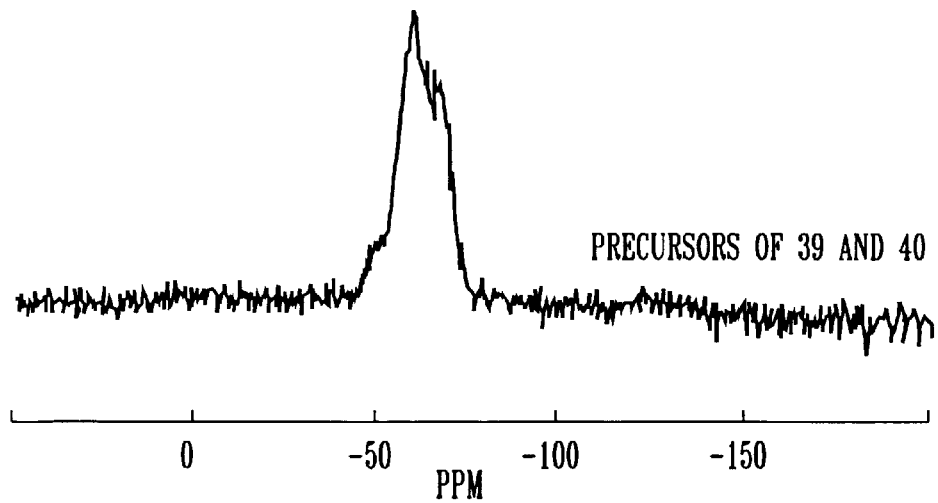
Figure 37:
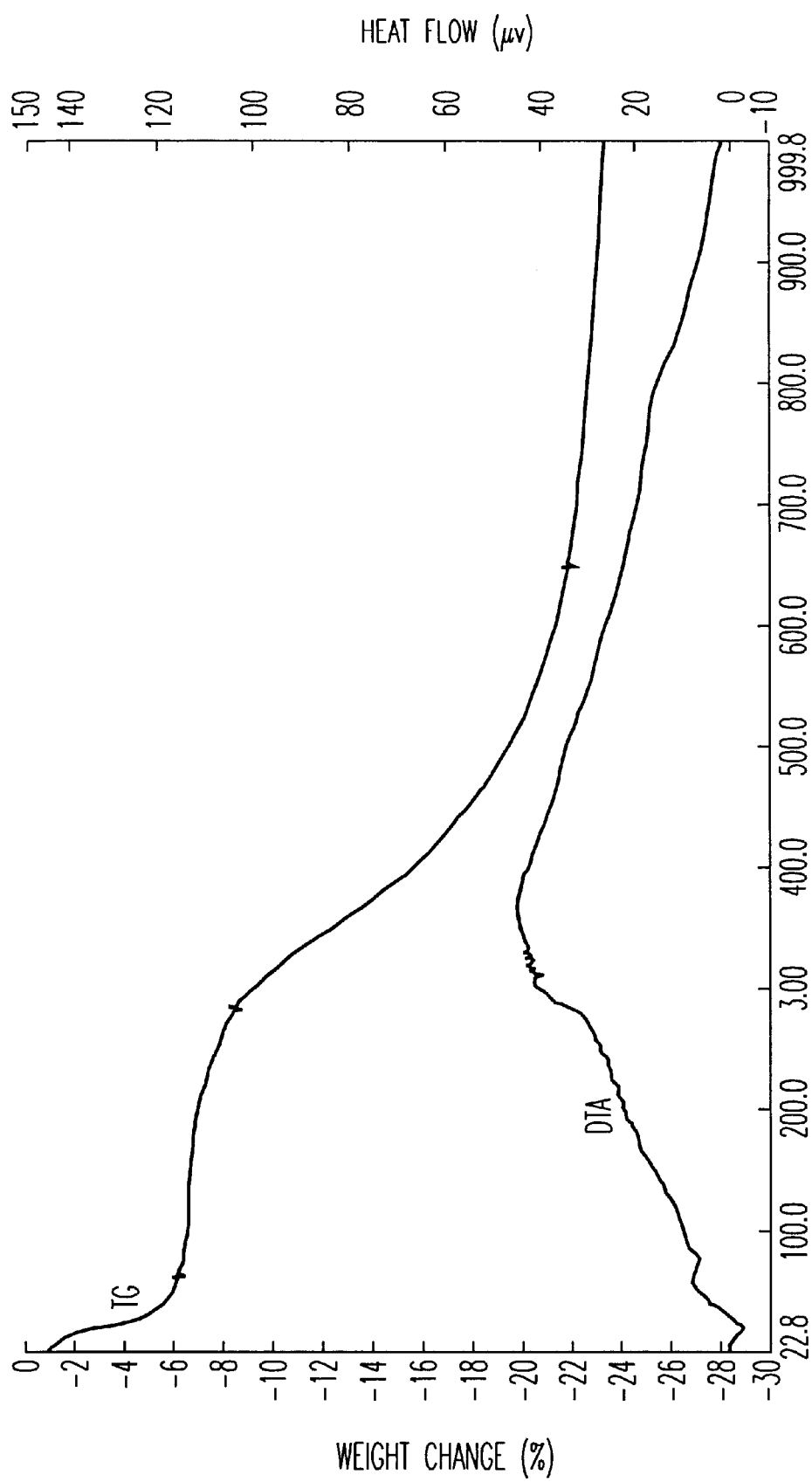
FIG. 37 is a view showing results of a thermogravimetric analysis of sample 39 obtained in Example 10.

From the XRD patterns shown in FIG. 32, it was confirmed that samples 39 and 40, respectively, have a three-dimensional hexagonal structure. From the nitrogen adsorption isotherms and the pore size distribution curves shown in FIGS. 33 and 34, respectively, it was found that the mean pore diameter was 2.8 nm and 88% of the total pore volume was contained in the pore diameter range of ±40% from the mean pore diameter. It was also confirmed that the pore size distribution was uniform.

The results of the element analysis of this porous material (sample 39) are as follows: C: 14.5%, H: 4.4%, N: 0%, SiO$_2$: 76.6%. The results show that the surfactant is removed completely, the C/Si molar ratio is 1 and carbon atoms are integrated in the pore wall, consistent with the theory described above. These conclusions were also confirmed by the results of the NMR data shown in FIGS. 35 and 36 and the thermogravimetric analysis shown in FIG. 37.

EXAMPLE 11
Synthesis of Mesoporous Substance (3)

Figure 38:
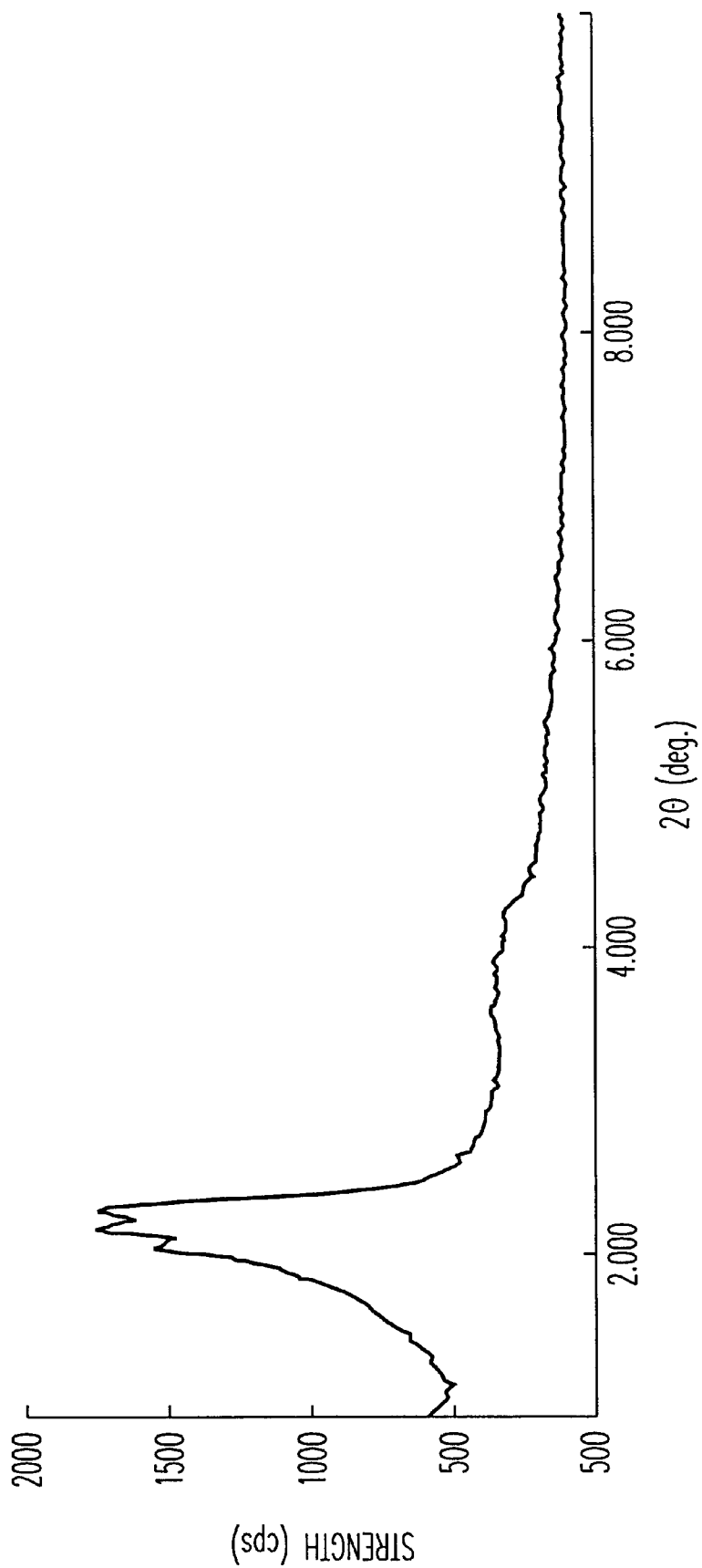
FIG. 38 is a view showing the XRD patterns of sample 41 obtained in Example 11.

Into a 100 ml beaker were added 0.432 g of n-hexadecyltrimethylammonium chloride, 30 g of ion-exchanged water and 1.5 g of a 6N NaOH aqueous solution (containing 7.5 mmol of NaOH). 2.03 g (7.5 mmol) of BTMe was added with vigorous stirring while cooling to 0° and stirred for 8 hours. The product was filtered and air-dried and 0.86 g of a solid product (sample 41) was obtained. The x-ray diffraction pattern of this porous material precursor is shown in FIG. 38 and have three overlying peaks around 2° and several peaks around 3 to 5°. Therefore, the product is believed to have a hexagonal structure having a high regularity in structure.

EXAMPLE 12
Synthesis of Mesoporous Substance (4)

Figure 39:
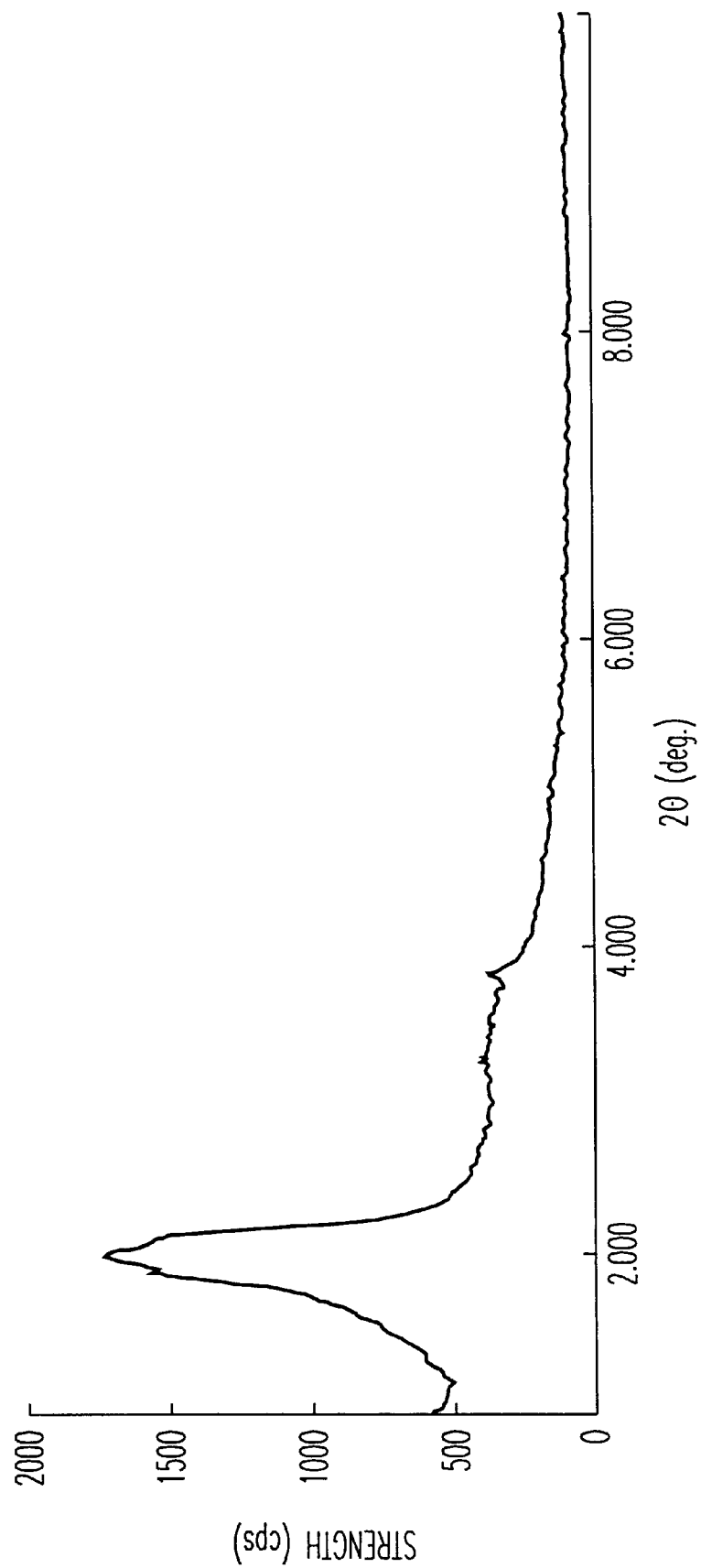
FIG. 39 is a view showing the XRD patterns of sample 42 obtained in Example 12.

Into a 100 ml beaker were added 0.313 g (0.9 mmol) of n-octadecyltrimethylammonium chloride [Cl$_{18}$H$_{37}$N(CH$_3$)$_3$Cl], 30 g of ion-exchanged water and 1.5 g of a 6N NaOH aqueous solution (containing 7.5 mmol of NaOH). 2.03 g (7.5 mmol) of BTMe was added with vigorous stirring at room temperature and stirred for 3 hours. After being left for 14 hours at room temperature, the mixture was stirred for 12.5 hours, then was left for another 14 hours, then stirred for 6.9 hours and finally filtered. The precipitate was washed twice with 300 ml of ion-exchanged water and 0.705 g of a solid product (sample 42) was obtained after air-drying. The x-ray diffraction pattern of this porous material precursor is shown in FIG. 39 and have three overlying peaks around 2° and several peaks around 3 to 5°. Therefore, this product is also believed to have a hexagonal structure having a high regularity in structure.

EXAMPLE 13
Changing the Organic/Inorganic Composition

Into a 300 ml beaker were added 2.304 g of n-hexadecyltrimethylammonium chloride, 120 g of ion-exchanged water and 6.0 g of a 6N NaOH aqueous solution (containing 7.5 mmol of NaOH). A mixture of BTMe and tetramethyl orthosilicate [TMOS:Si $(OCH_3)_4$] was added with vigorous stirring at room temperature. In addition, other samples were prepared by changing the TMOS/BTMe ratio to 0/100, 20/80, 50/50, 80/20, 90/10, 95/5, 100/0, respectively, while maintaining the combined total molar amount of TMOS and BTMe at 30 mmol.

Each mixture was stirred for 3 hours. After being left for 14 hours at room temperature, the mixture was stirred for 12.5 hours, then was left for another 14 hours, then stirred for 6.9 hours and finally filtered. The precipitate was washed twice with 300 ml of ion-exchanged water and further washed 4 times with 500 ml of water at 50° C.

Figure 40A:
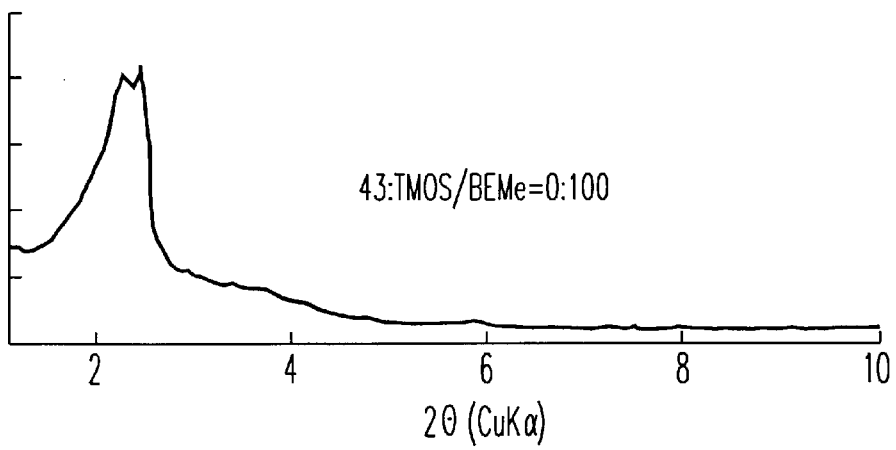
FIG. 40 is a view showing the XRD patterns of samples 43 to 45 obtained in Example 13.
Figure 40B:
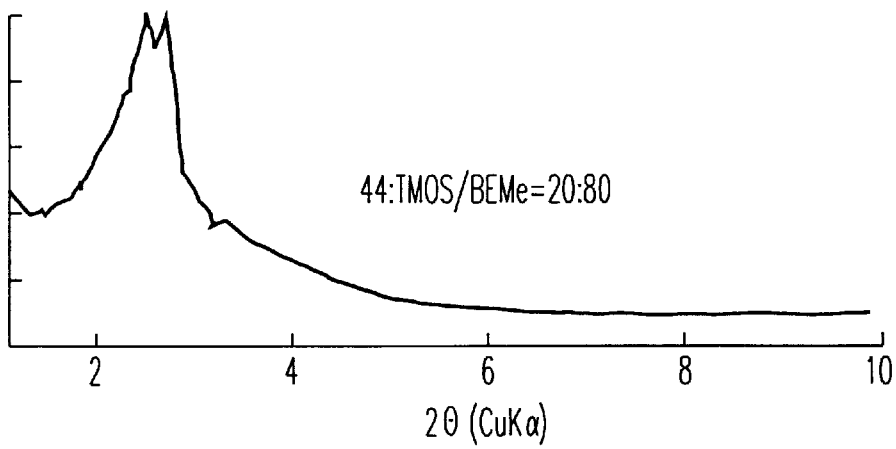
Figure 40C:
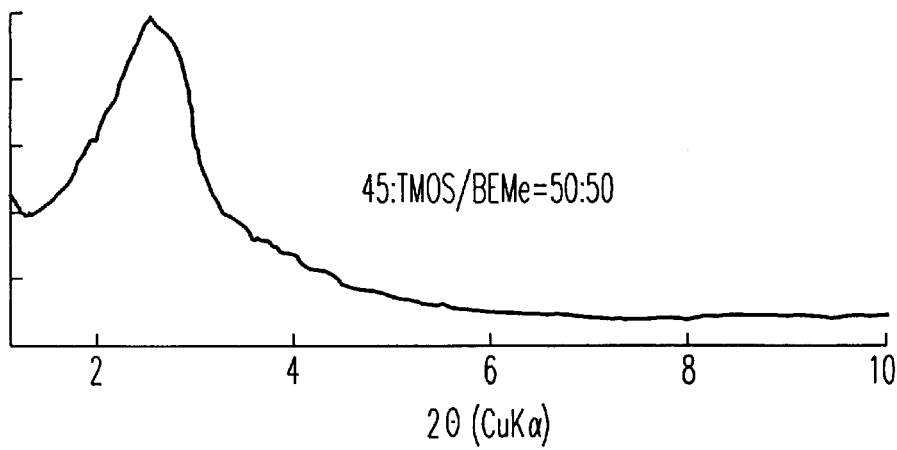
Figure 41A:
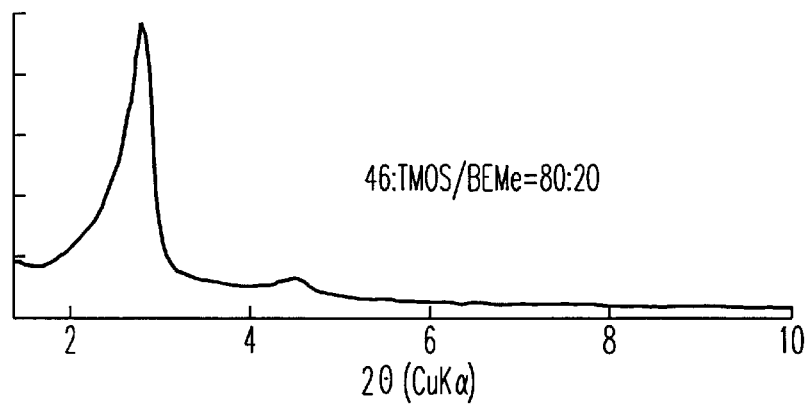
FIG. 41 is a view showing the XRD patterns of samples 46 to 49 obtained in Example 13.
Figure 41B:
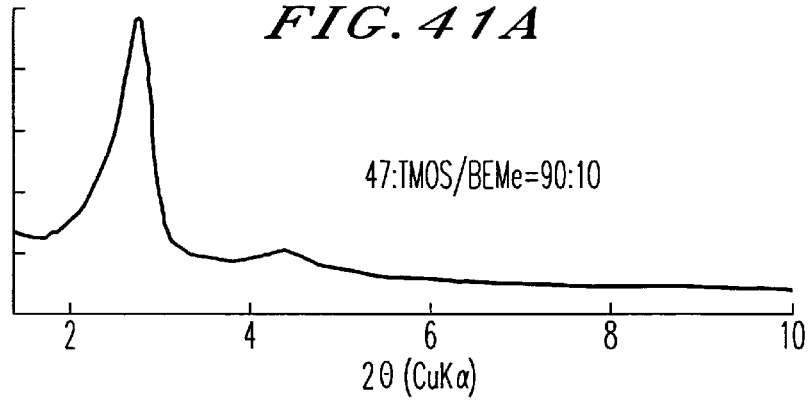
Figure 41C:
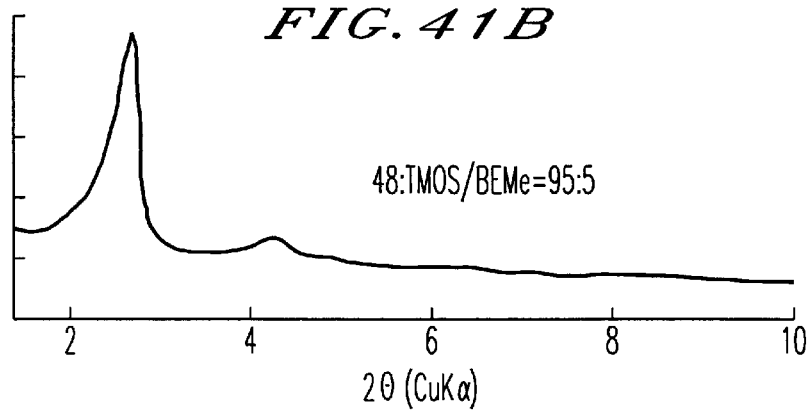
Figure 41D:
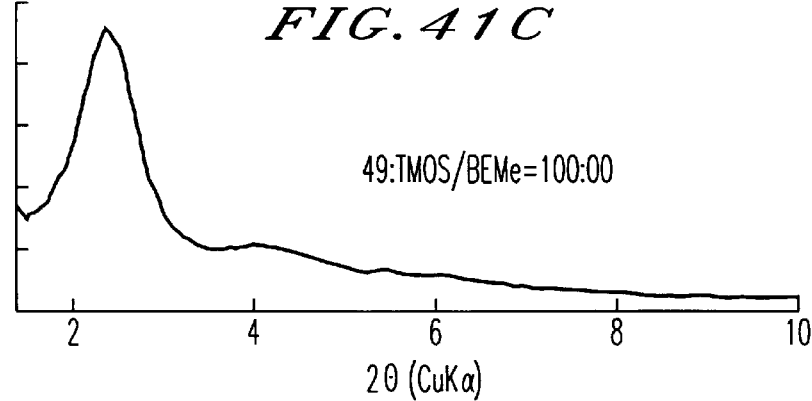

The XRD patterns of the resulting 7 porous material precursors (samples 43 to 49) are shown in FIGS. 40 and 41. In conclusion, when the TMOS/BTMe ratio was 50/50 or less (0/100, 20/80, 50/50; samples 43, 44, 45), porous material precursors having a cubic structure were formed. On the other hand, when the TMOS/BTMe ratio was 80/20, 90/10, 95/5 or 100/0 (samples 46, 47, 48, 49), hexagonal structures were formed.

EXAMPLE 14
Improved Stability by Hydrothermal Treatment 1 g of a porous material precursor (sample 46) synthesized under the condition in which the TMOS/BTMe ratio was 80/20, as in Example 13, was dispersed into an aqueous solution prepared by dissolving 0.576 g of hexadecyltrimethylammonium chloride in 30 g of water. A 1 N aqueous hydrochloric acid solution was added to the dispersion to adjust the pH to 8 to 8.5 and this dispersion was stirred for 20 hours at room temperature. Then, the dispersion was stirred at 70° C. for 7 hours while heating. Solid components were filtered and air-dried (sample 50).

To remove the surfactant, 1.0 g of the solid product was added to a mixture of 150 ml of anhydrous ethanol and 3.8 g of concentrated hydrochloric acid, the mixture was stirred for 6 hours at 50° C., and then was filtered. The recovered precipitate was treated with HCl—EtOH again under the same conditions. The product was washed twice with 150 ml of anhydrous ethanol and air-dried to obtain a porous material (sample 51). This porous material was further baked at 550° C. in air for 6 hours (sample 52).

Figure 42A:
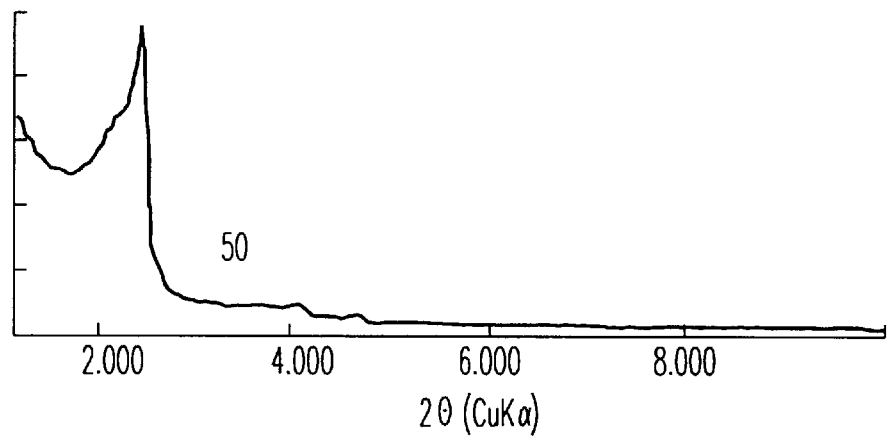
FIG. 42 is a view showing the XRD patterns of samples 50 to 52 obtained in Example 14.
Figure 42B:
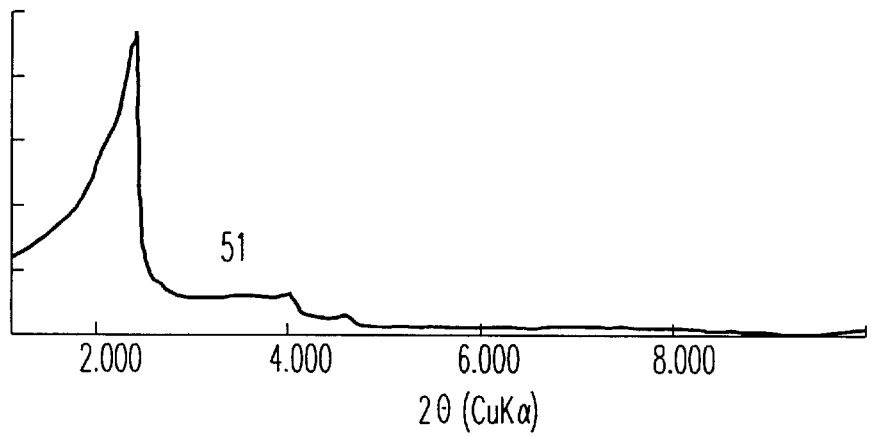
Figure 42C:
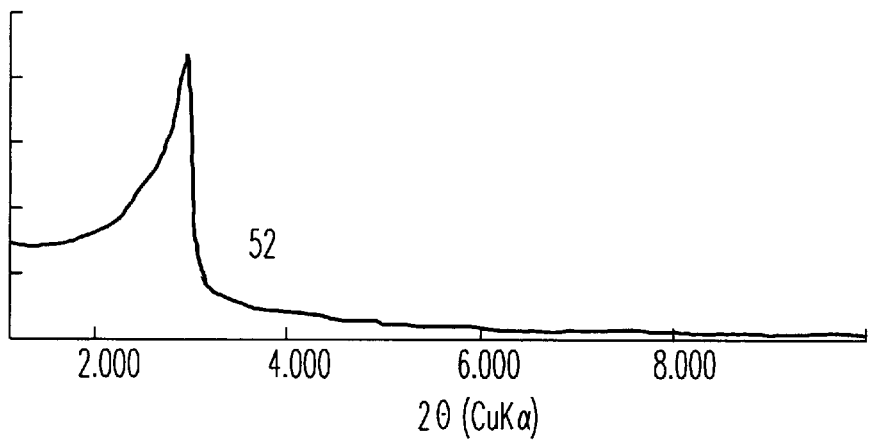
Figure 43:
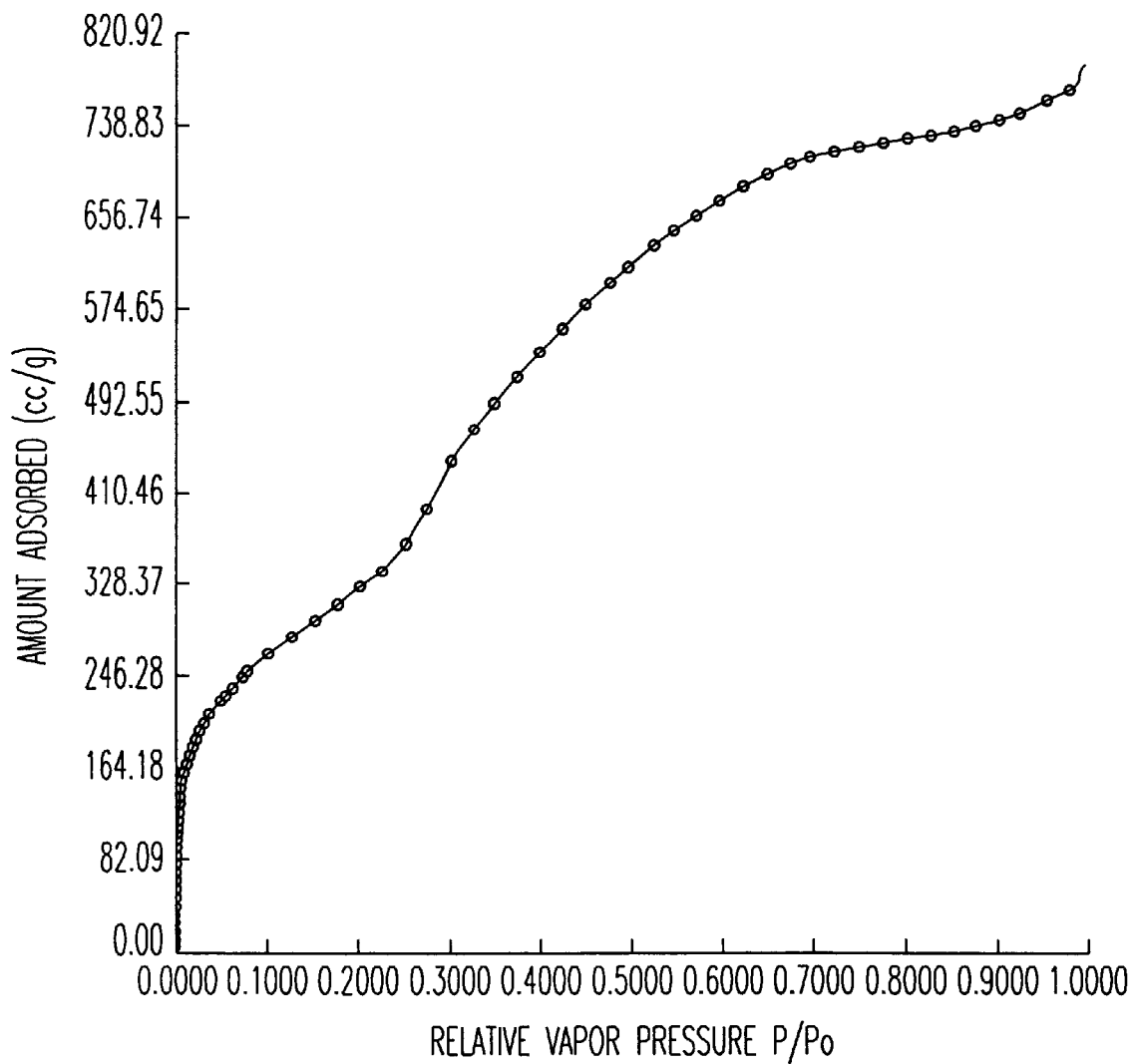
FIG. 43 is a view showing the nitrogen adsorption isotherm of sample 51.
Figure 44:
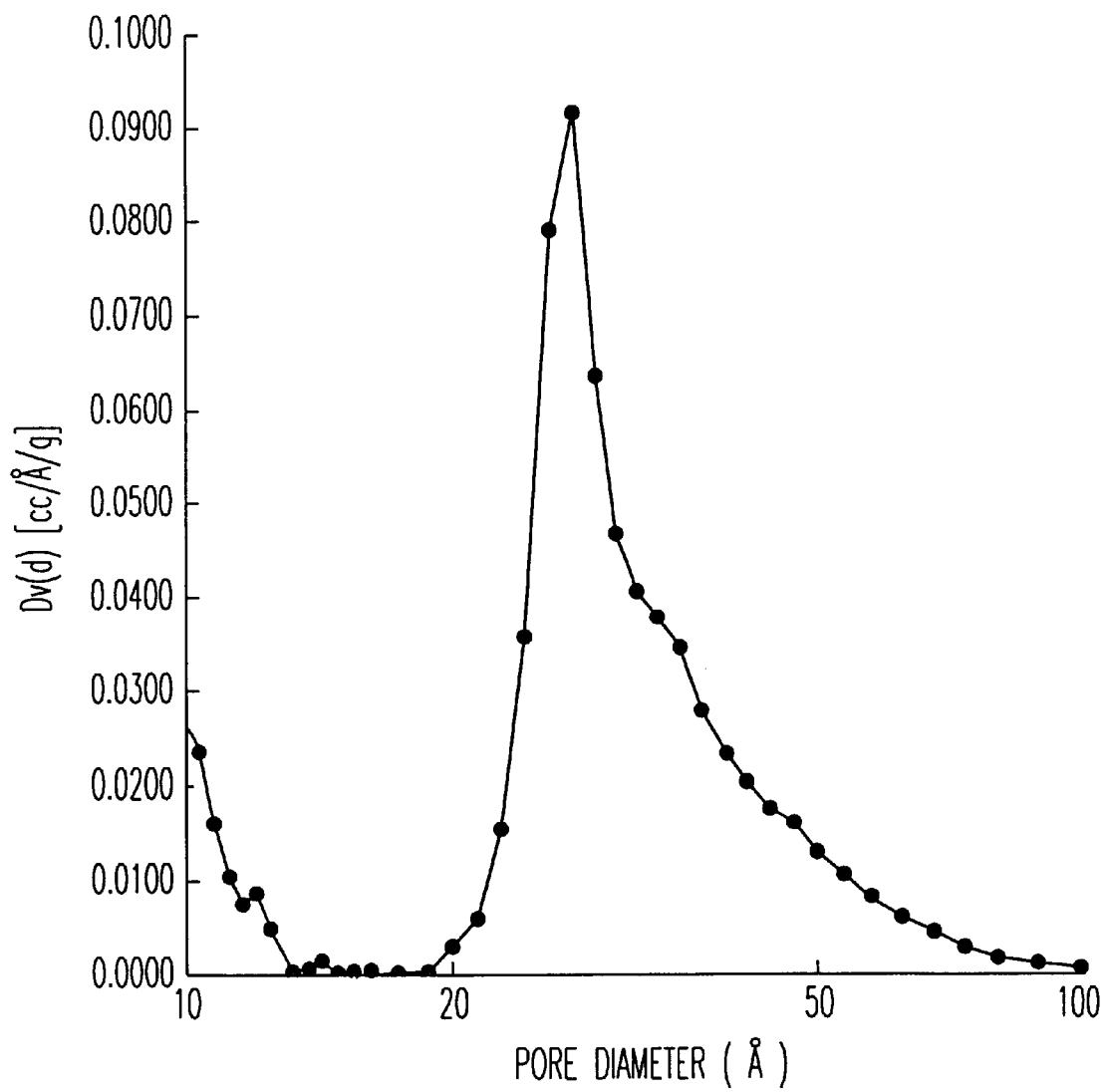
FIG. 44 is a view showing the pore size distribution curve of sample 51.
Figure 45:
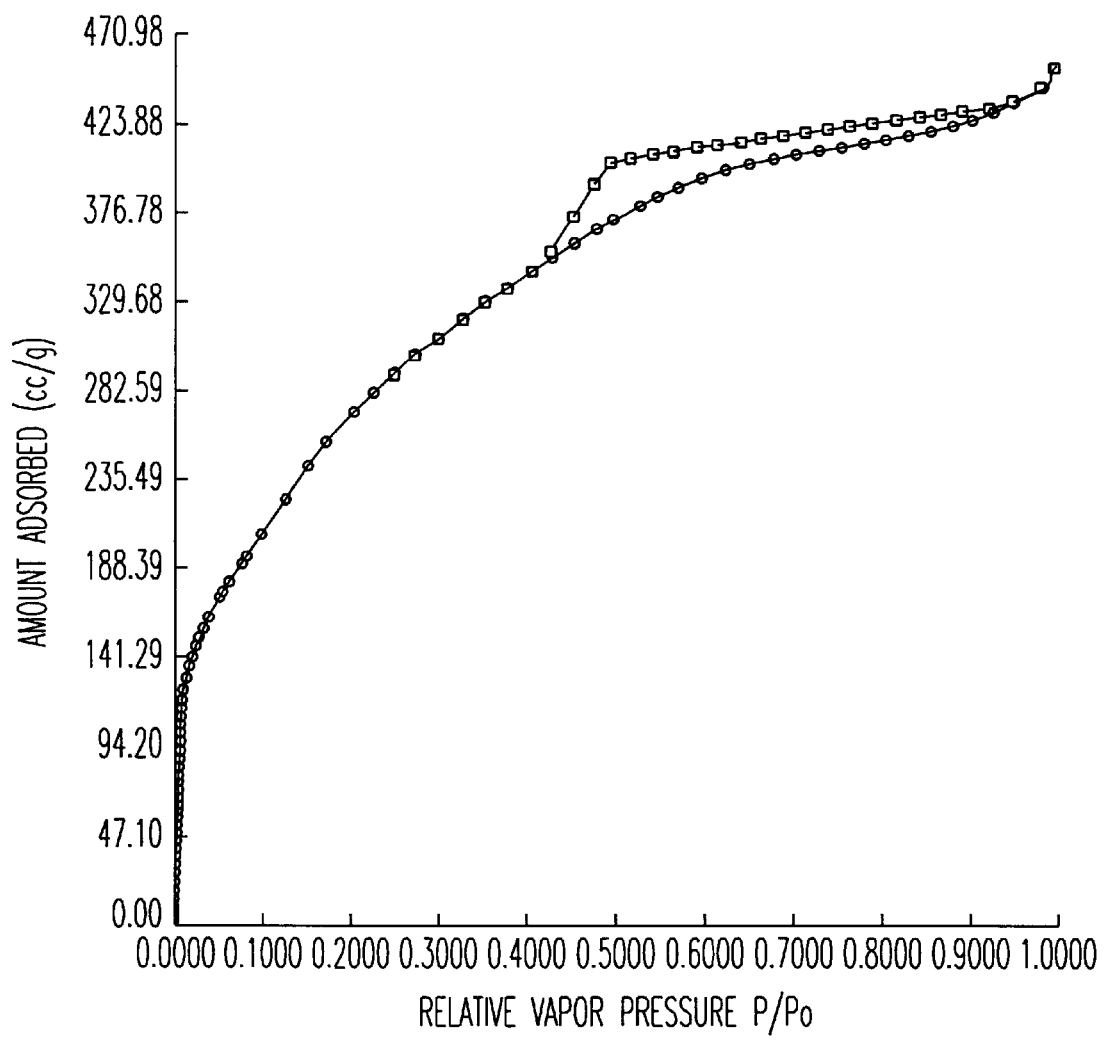
FIG. 45 is a view showing the nitrogen adsorption isotherm of sample 52.
Figure 46:
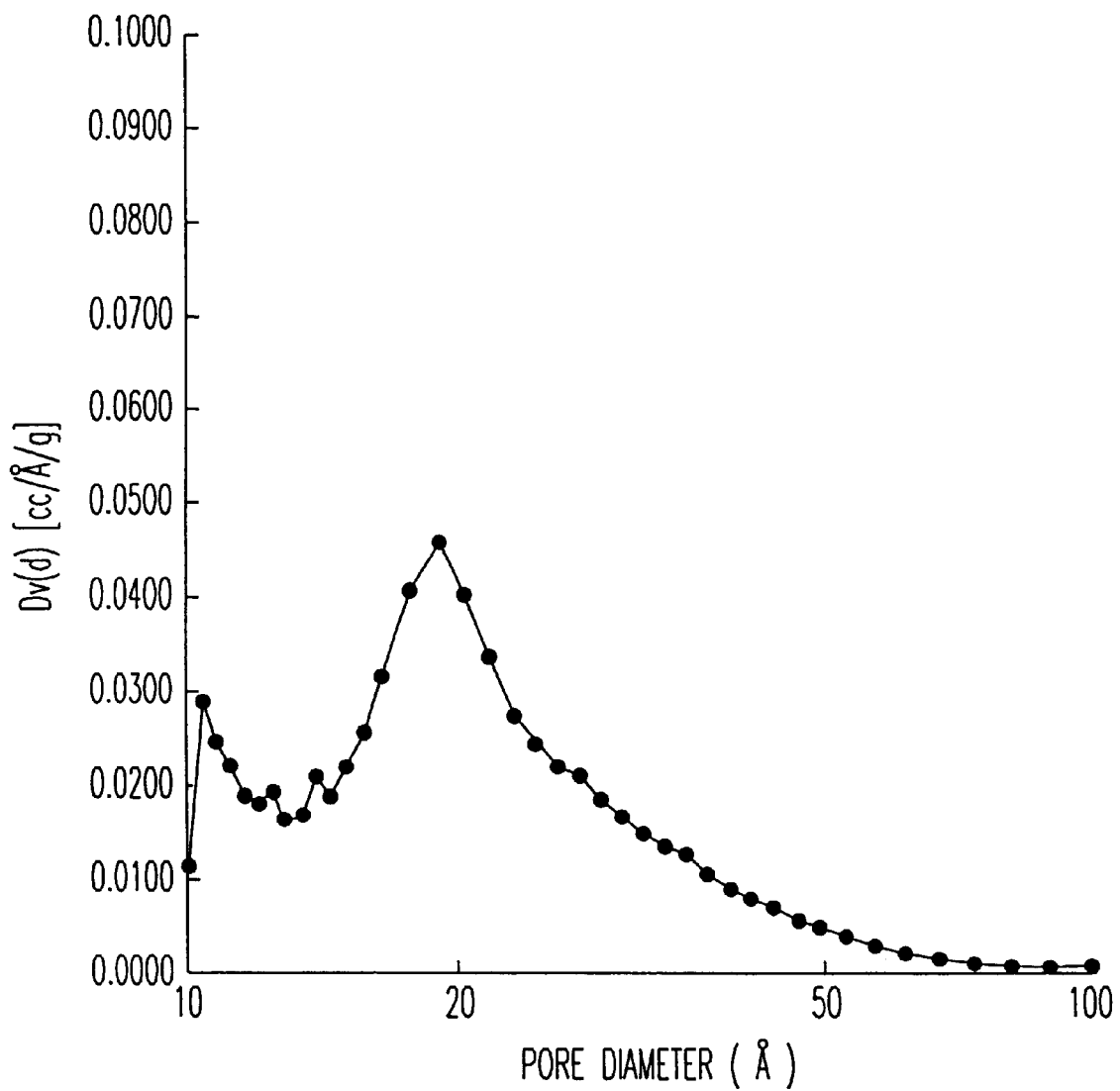
FIG. 46 is a view showing the pore size distribution curve of sample 52.

FIG. 42 shows XRD patterns of a hydrothermal-treated sample (sample 50), a sample from which the surfactant was extracted (sample 51), and a sample that was subsequently baked (sample 52). When compared with the XRD pattern of sample 45 in FIG. 40, the hydrothermal treatment appears to improve the structure regularity as evidenced by the fact that the XRD peak becomes sharper. After hot water treatment, sample 50 maintained its regularity in the hexagonal structure even after extraction of the surfactant, and the structure is stable. Further, the XRD peaks remain even after baking, indicating that the structure stability and heat resistance are excellent.

FIGS. 43, 44 and FIGS. 45, 46 show nitrogen adsorption isotherms and pore size distribution curves of sample 50 and sample 51, respectively. From these results, it is recognized that both in the sample from which the surfactant was extracted (sample 51) and the sample that was subsequently baked (sample 52), about 64% of the total pore volume is contained in the pore diameter range of ±40% from the mean pore diameter and uniform meso pores are formed.

EXAMPLE 15
Change in Surfactant/$H_2O$ Composition

Figure 47A:
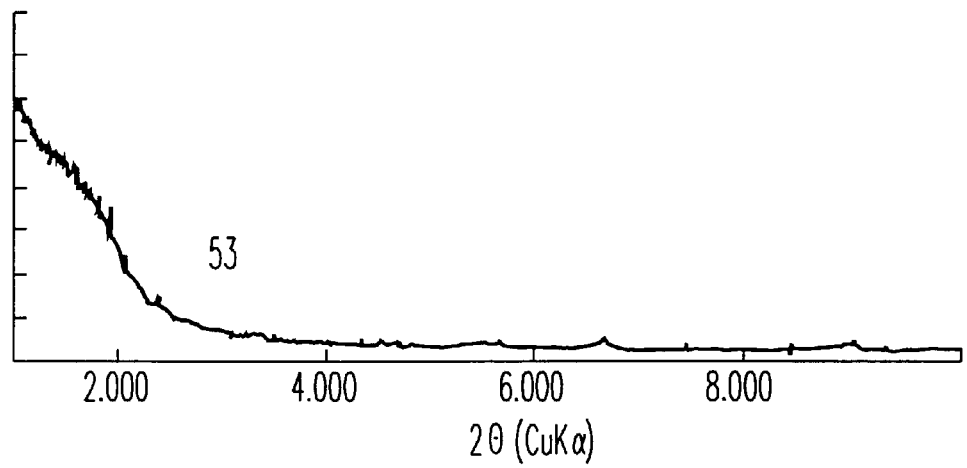
FIG. 47 is a view showing the XRD patterns of samples 53 to 55 obtained in Example 15.
Figure 47B:
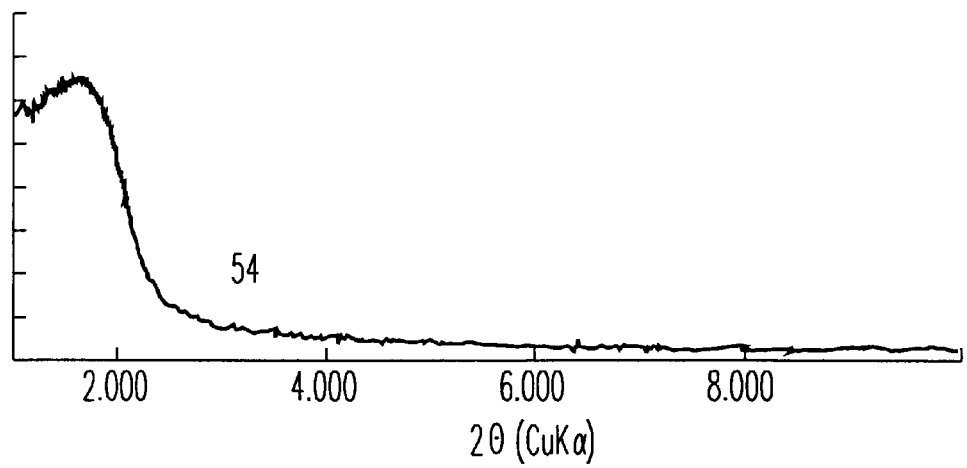
Figure 47C:
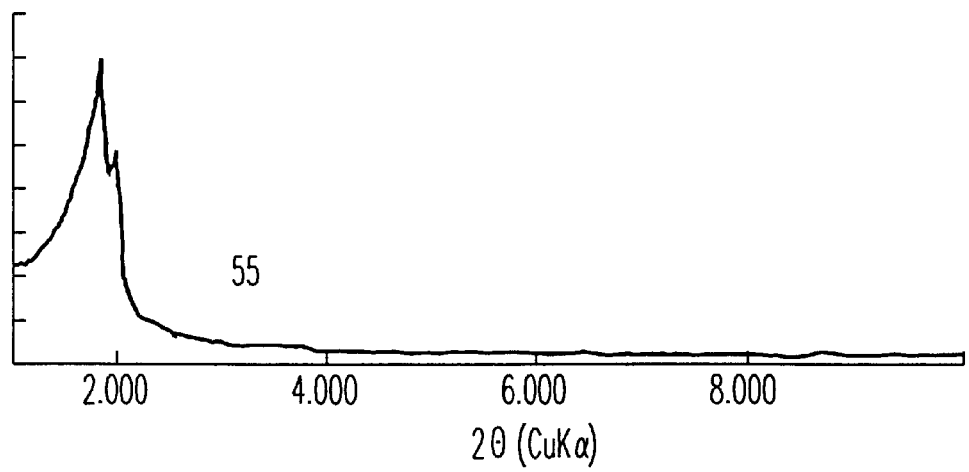
Figure 48A:
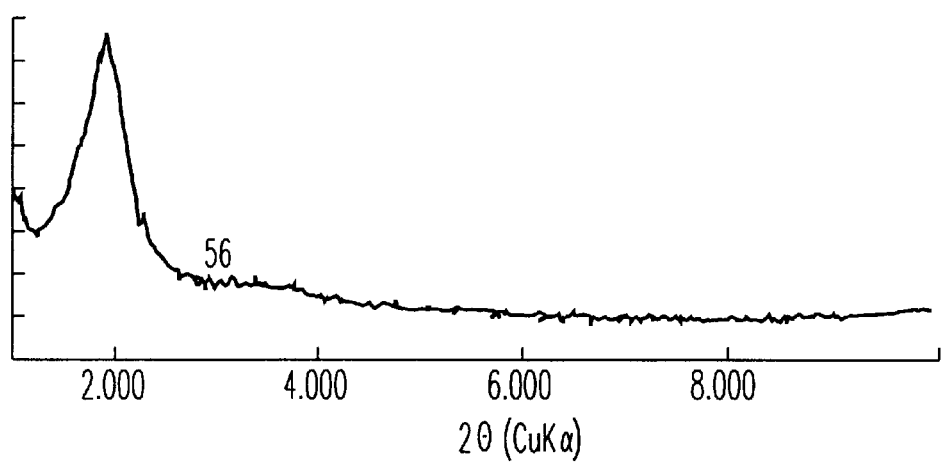
FIG. 48 is a view showing the XRD patterns of samples 56 to 58 obtained in Example 15.
Figure 48B:
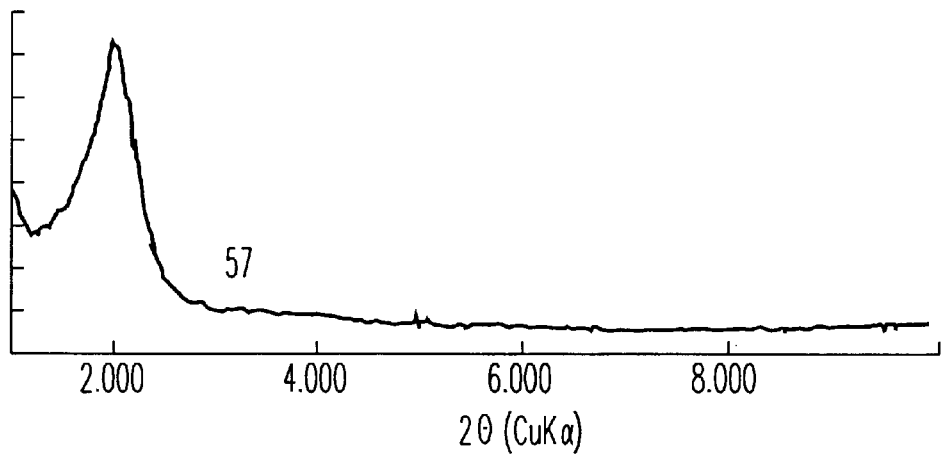
Figure 48C:
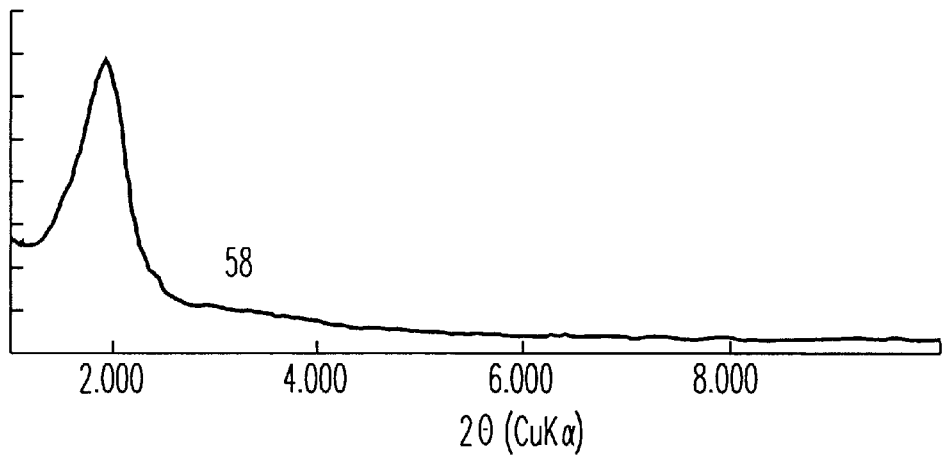

Into a 300 ml beaker were added 1.5 g of n-hexadecyltrimethylammonium chloride and 7.5, 15, 30, 35, 40 or 45 g of ion-exchanged water, respectively, and to this solution was added a 6N NaOH aqueous solution so that the $H_2O$/6N NaOH ratio was 12.5 (g/g). BTMe was added to each beaker with vigorous stirring until the ratio of S/BTMe was 1.5/1.425 (g/g). These samples were aged at room temperature for 3 days, and subsequently 17 hours at 100° C., and then air-dried without further work up. The XRD patterns of the resulting 6 porous material precursors (samples 53 to 58) are shown in FIGS. 47 and 48.

When the ratio of S/$H_2O$ was 1.5/7.5 (sample 53), a clear peak was not observed. However, when the ratio of S/$H_2O$ was 1.5/15 (sample 54), a broad peak was observed, which is believed to indicate a laminated or irregular structure. Further, when the ratio of S/$H_2O$ was 1.5/30 (sample 55), a peak was observed that is believed to indicate a cubic structure. Finally, when the ratio of S/$H_2O$ was 1.5/35 (sample 56), 1.5/40 (sample 57) and 1.5/45 (sample 58), patterns corresponding to a hexagonal structure were observed.

EXAMPLE 16
Synthesis of Mesoporous Substance (5)

BTMe was added dropwise to a mixed solution of n-octadecyltrimethylammonium chloride (ODTMA), sodium hydroxide (NaOH) and water ($H_2O$) while stirring the mixture vigorously at 25° C. When the mixing molar ratio of each of the starting materials (BTMe:ODTMA:NaOH:$H_2O$) was 1:0.12:1:231, a white precipitate was quickly formed upon addition of the BTMe. This precipitate was stirred for 24 hours at 25° C. without further work up.

On the other hand, when the mixing molar ratio was 1:0.57:2.36:353, no white precipitate was formed upon the addition of BTMe. However, after stirring the mixture for 14 hours at 25° C. and then heating to 95° C., a white precipitate was formed. This precipitate was stirred for 21 hours at 95° C.

The resulting two precipitates were filtered, washed with a sufficient amount of water, and then dried to obtain two kinds of powders. 1 g of each powder was dispersed in 150 ml of water into which 3.8 g of a 36% aqueous hydrochloric acid solution had been added, the mixture was stirred for 6 hours at 50° C. and the precipitate was filtered and washed with water. This filtrate was again dispersed in 150 ml of water into which 3.8 g of a 36% aqueous hydrochloric acid solution had been added, and stirred for 6 hours at 50 ° C. The precipitate was filtered, washed with water and dried to obtain a powder (samples 59, 60).

Figure 49:
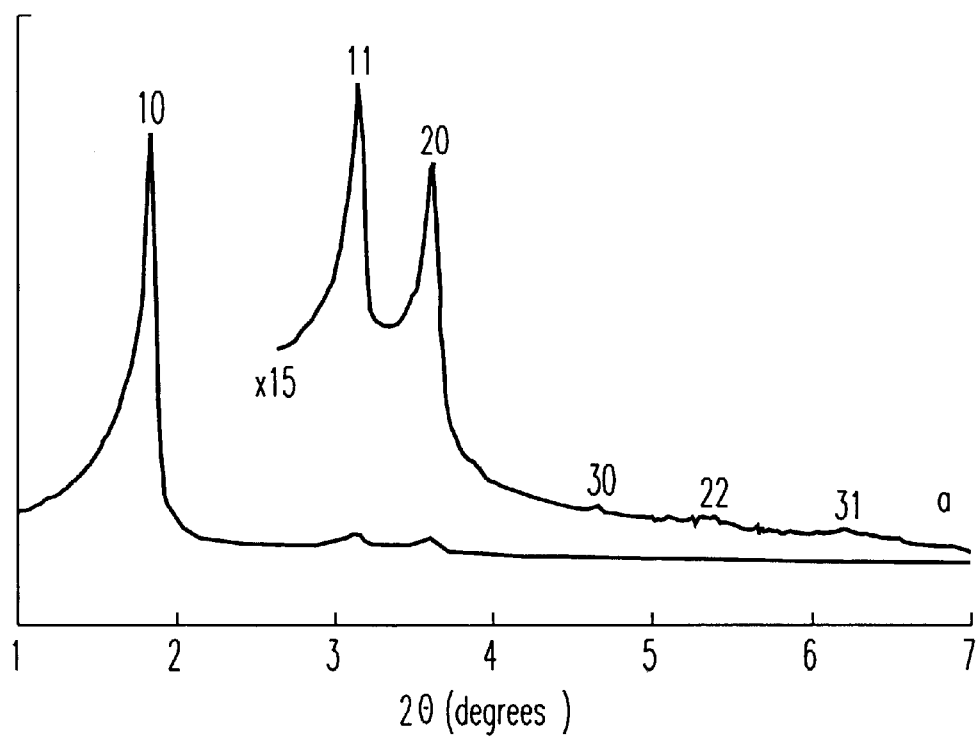
FIG. 49 is a view showing the XRD pattern of sample 59 obtained in Example 16.
Figure 50:
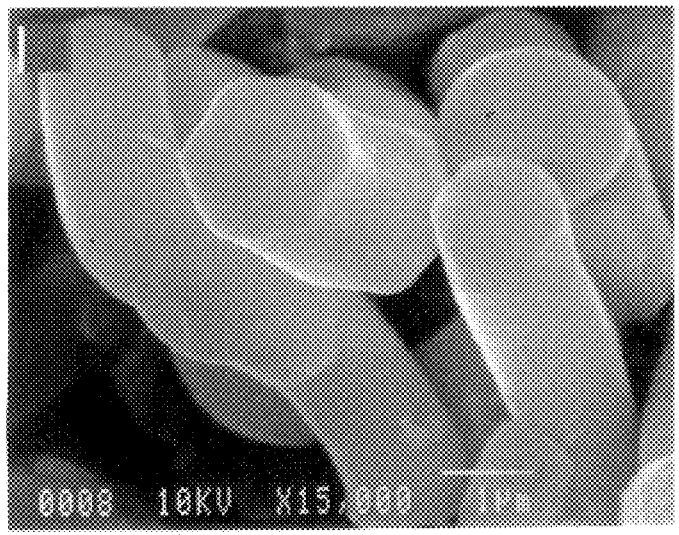
FIG. 50 is a view showing the scanning electron micrograph of sample 59.
Figure 51:
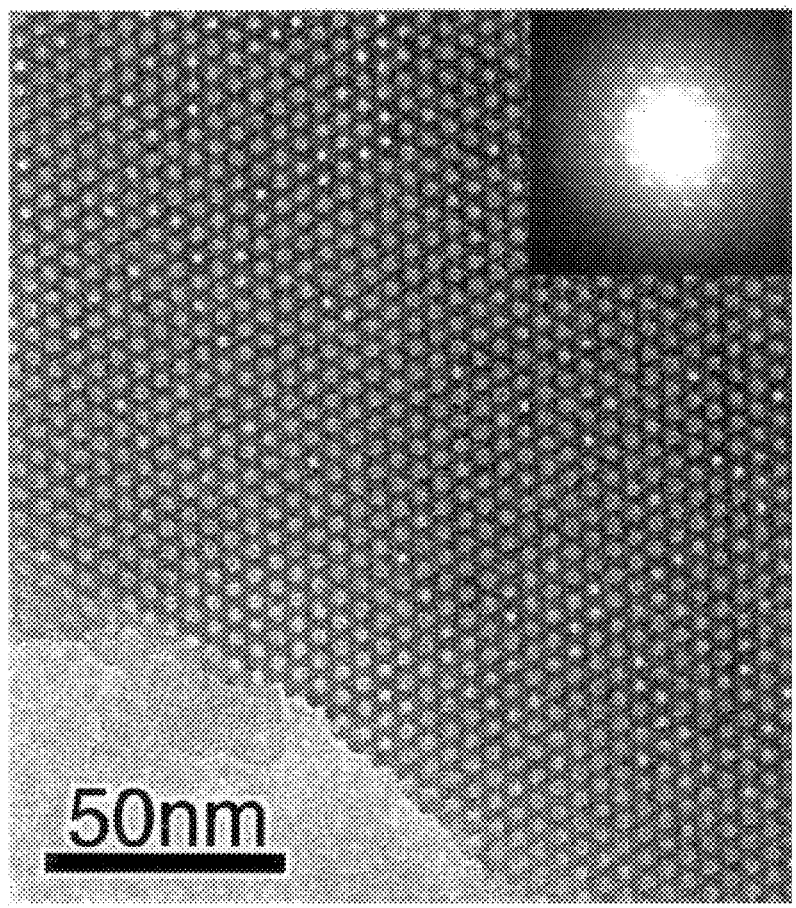
FIG. 51 is a view showing the transmission electron micrograph of sample 59.

The x-ray diffraction pattern of the powder (sample 59) prepared from the mixture having the first molar ratio is shown in FIG. 49, in which 6 peaks indicating a two-dimensional hexagonal structure (a=57.0 Å) were observed and high regularity in the structure was shown. Further, a scanning electron micrograph (see FIG. 50) showed that this sample has a hexagonal rod shape, reflecting the pore arrangement structure. Further, in a transmission electron micrograph (see FIG. 51), regularly arranged, hexagonal pores were observed. From the electron beam diffraction pattern shown together at the upper right corner in FIG. 51, a high dimension spot having up to 6-dimensions was observed, showing high crystallinity. Further, this sample had a pore diameter of 31 Å and a specific surface area of 750 m$^2$/g.

Figure 52:
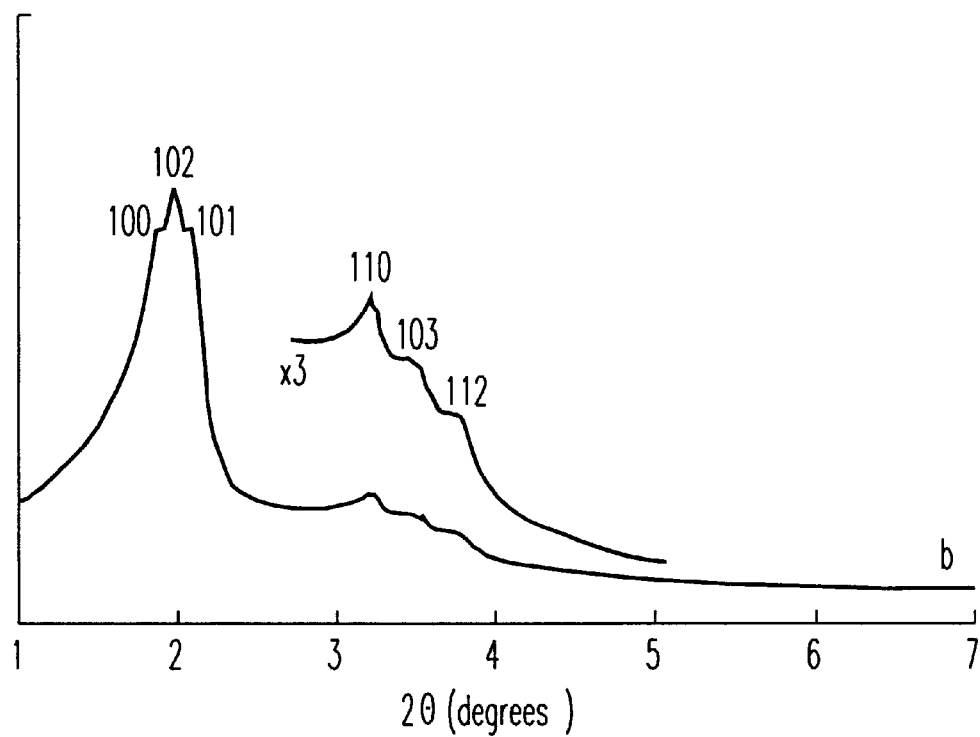
FIG. 52 is a view showing the XRD pattern of sample 60 obtained in Example 16.

The x-ray diffraction pattern of the powder (sample 60) prepared from the mixture having a second molar ratio is shown in FIG. 52. In this figure, 6 peaks showing a three-dimensional hexagonal structure (a=88.6 Å, c=55.4 Å) were observed. From a scanning electron micrograph, this sample was observed to have a spherical particle form. Further, from several electron beam diffraction patterns measured by placing the sample inclined to the incident direction of an electron beam, the three-dimensional hexagonal structure was confirmed. This sample had a mean pore diameter of 27 Å and a specific surface area of 1170 m$^2$/g.

From the measurement results of the $^{29}$Si-NMR and $^{13}$C-NMR spectra, it was confirmed that an ethylene group (—CH$_2$CH$_2$—) was integrated into the pore walls of each of the above-described samples and Si—C covalent bonds were formed.

EXAMPLE 17
Organic Groups and Surfactants

Figure 53:
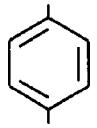
FIG. 53 is a view showing raw materials and the mixture ratio for samples 61 to 67 prepared in Example 17.
Figure 53:
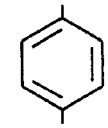
Figure 53:
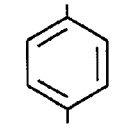
Figure 54A:
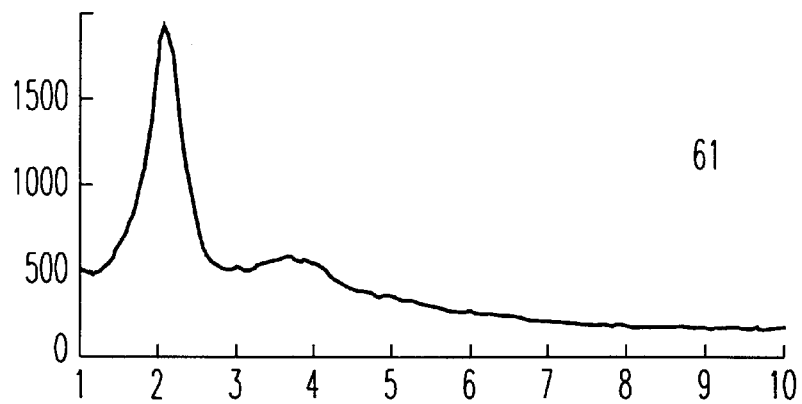
FIG. 54 is a view showing the x-ray diffraction patterns of samples 61 to 67.
Figure 54B:
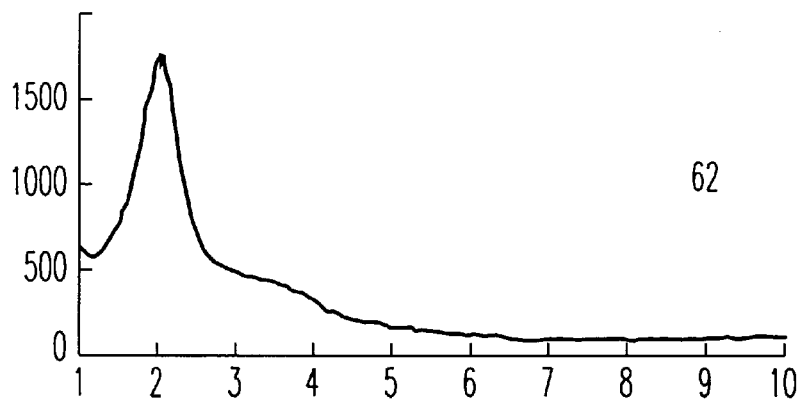
Figure 54C:
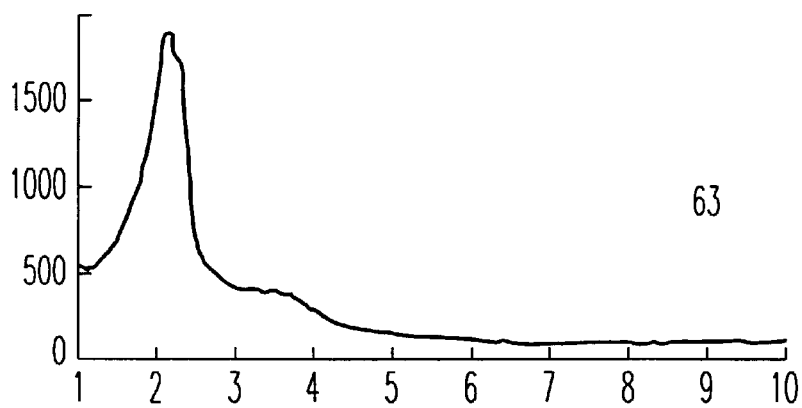
Figure 54D:
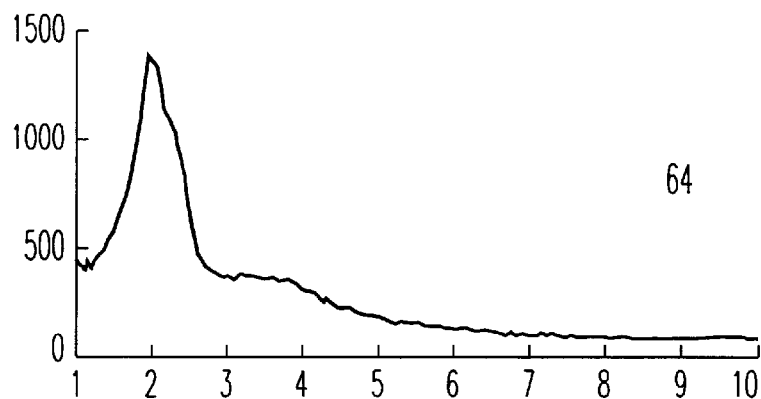
Figure 54E:
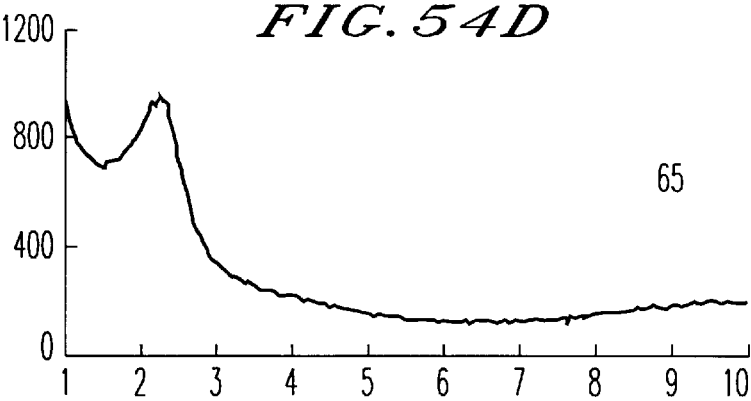
Figure 54F:
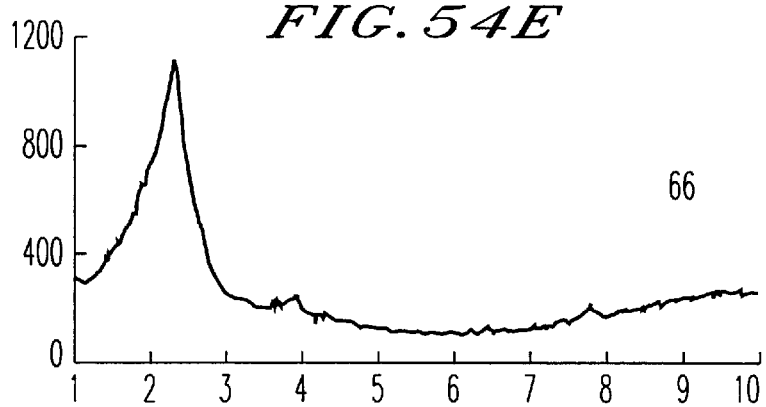
Figure 54G:
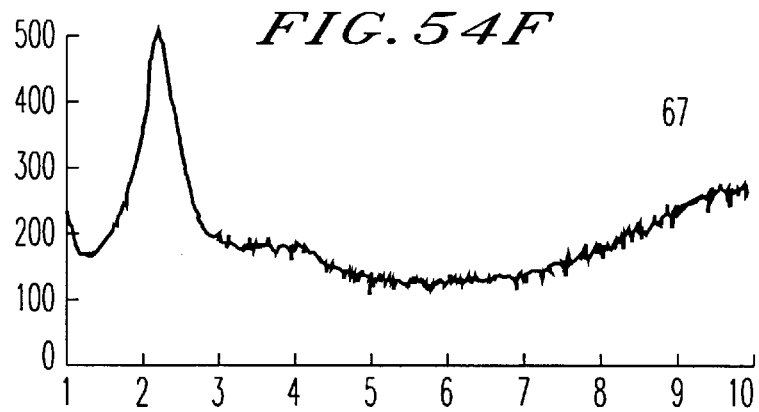
Figure 56A:
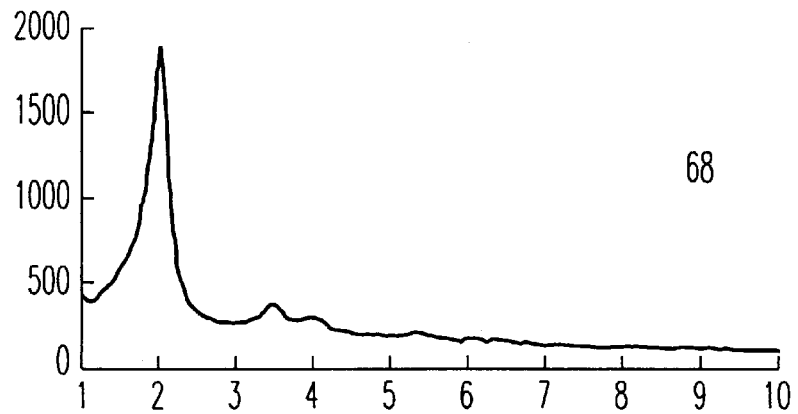
FIG. 56 is a view showing the XRD patterns of samples 68 to 73.
Figure 56B:
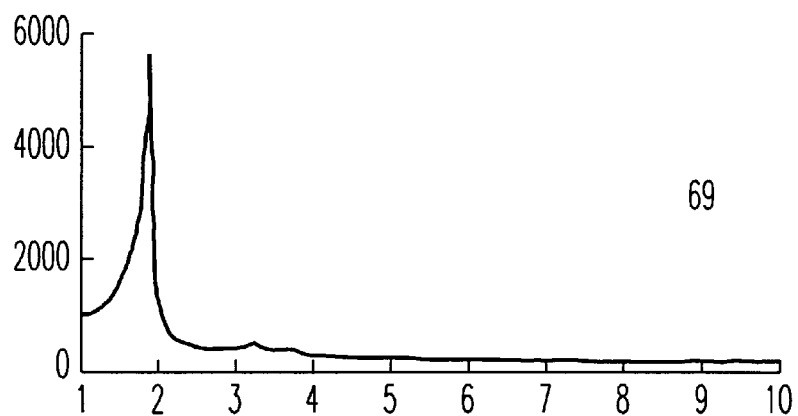
Figure 56C:
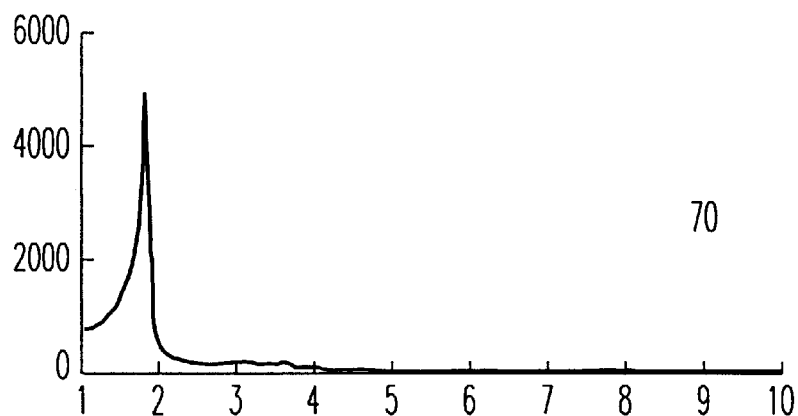
Figure 56D:
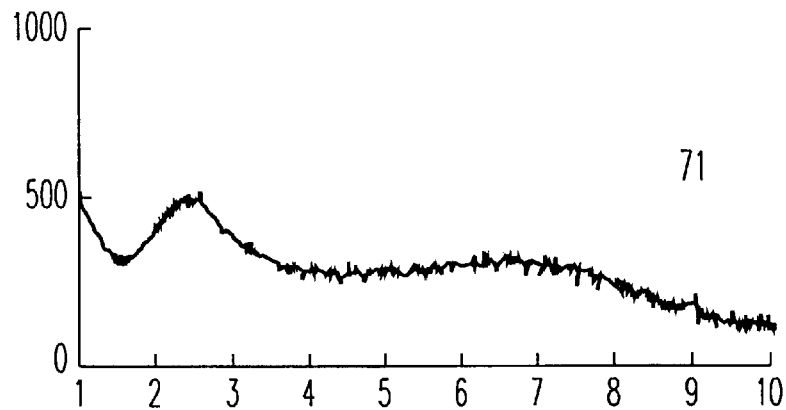
Figure 56E:
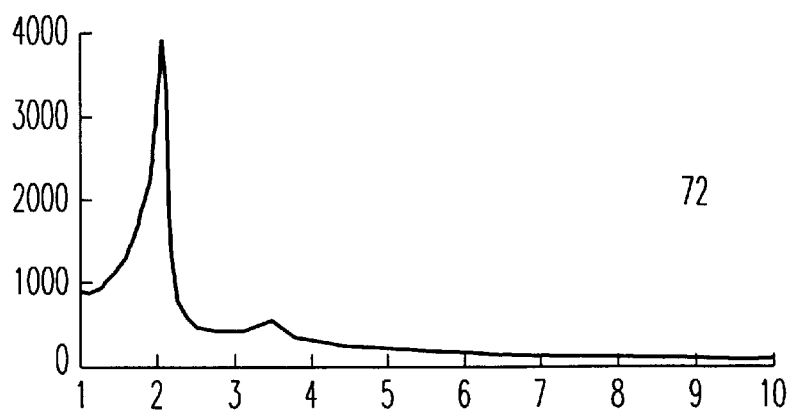
Figure 56F:
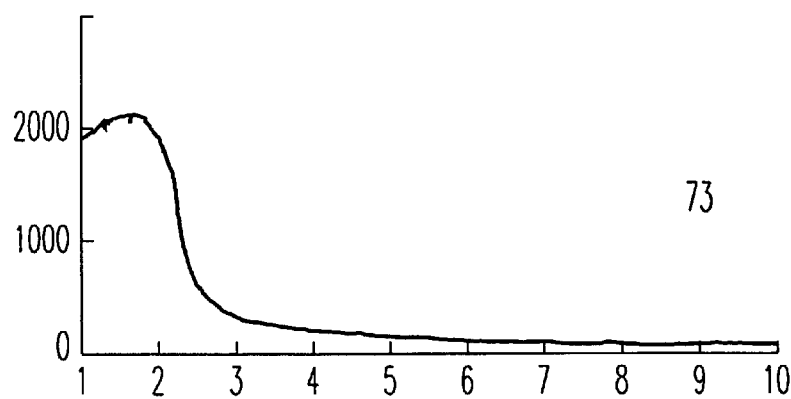

Into a bottle having a screw at the inlet port, hexadecyltrimethylammonium chloride (C16 surfactant), ion-exchanged water and a 6N NaOH solution were added with stirring at room temperature. Various organometallic compounds (R$^2$O)$_3$Si—R$^1$—Si (OR$^2$)$_3$ shown in FIG. 53 were added dropwise to the mixture, a cap was screwed onto the inlet port, the mixture was stirred for 30 hours at room temperature and then filtered. The precipitates were air-dried to obtain various powders. The various organometallic compounds and mixing ratios with other starting materials are shown together in FIG. 53. X-ray diffraction patterns of the resulting 7 powders (samples 61 to 67) are shown in FIG. 54.

EXAMPLE 18
Organic Groups and Surfactants

Into a bottle a having a screw at the inlet port, octadecyltrimethylammonium chloride (C18 surfactant), ion-exchanged water and a 6N NaOH solution were respectively added with stirring at room temperature. Various organometallic compounds (R$^2$O)$_3$Si—R$^1$—Si (OR$^2$)$_3$ shown in FIG. 55 were respectively added dropwise to the mixture, a cap was screwed onto the inlet port, the mixture was stirred for 5 hours at room temperature and then left for 15 hours. The reaction product was transferred to a triple-necked flask, the mixtures were stirred for 9 hours at 95 to 98° C., then cooled to room temperature, filtered and the precipitates were air-dried to obtain 6 powders (samples 68 to 73). The various organometallic compounds and mixing ratios with other starting materials are shown together in FIG. 55. The x-ray diffraction patterns of the resulting powders are shown in FIG. 56.

EXAMPLE 19

Figure 57A:
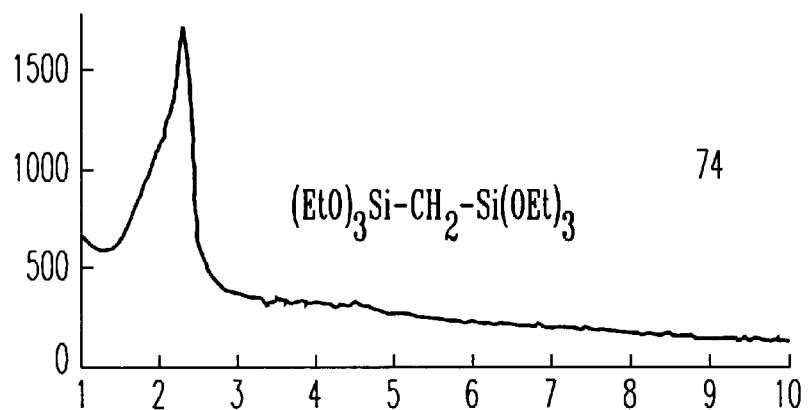
FIG. 57 is a view showing the XRD patterns of samples 74 to 76 obtained in Example 19.
Figure 57B:
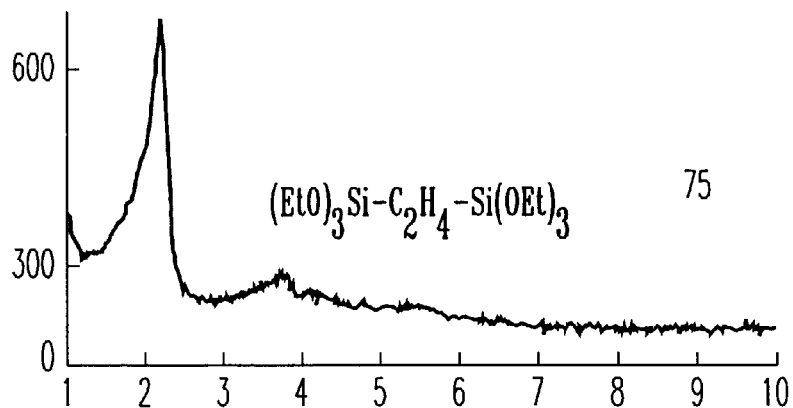
Figure 57C:
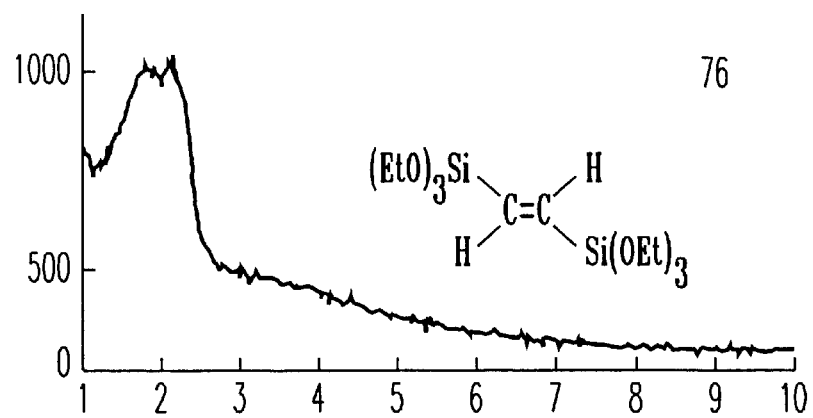

The stirring, standing, stirring, cooling and filtration steps were performed using by the same procedure as in Example 18 and at the same mixing ratio of samples 68, 69 and 72 in Example 18. The pH of the resulting filtrates were adjusted to 8 to 8.5 with 1N hydrochloric acid to obtain a precipitate. These precipitates were filtered and dried to obtain powders (samples 74 to 76). X-ray diffraction patterns of these powders are shown in FIG. 57.

EXAMPLE 20

A triblock copolymer (hereinafter, simply referred to as P104, manufactured by BASF) represented by the formula (EO)$_{17}$(PO)$_{58}$(EO)$_{17}$ was used as a nonionic surfactant and (CH$_3$O)$_3$SiCH$_2$CH$_2$Si(OCH$_3$)$_3$(BTMe) was used as a skeleton component. In the presence of P104, hydrolysis was performed to condense BTMe, using hydrochloric acid as a catalyst.

0.44 g of P104 (0.00009 mol) was dissolved in 26.5 ml of ion-exchanged water, and to this solution was added 5 ml (0.061 mol) of a 12N hydrochloric acid aqueous solution (total water amount; 1.67 mol). 1.42 g (0.00525 mol) of a skeleton component (CH$_3$O)$_3$SiCH$_2$CH$_2$Si(OCH$_3$)$_3$(BTMe) was added while stirring the mixture vigorously at 45° and the mixture was then stirred for 10 hours without further work up. Within several minutes of the addition of BTMe, a white precipitate (a precursor) was formed. The mixture was further stirred for 10 hours in a hot water bath at 70° C. and the precursor was filtered. The precursor was washed twice with 300 ml of ion-exchanged water and left overnight in a drying vessel at 45° C. This sample was identified as precursor sample 77 (powder).

EXAMPLE 21

0.35 g of precursor sample 77 was dissolved in 100 ml of ethanol, exposed in a supersonic washing machine for about 15 minutes and the precipitate was recovered by filtration. This operation was repeated twice and then the recovered precipitate was left in the drying vessel at 45° C. overnight to obtain sample 78 (powder).

EXAMPLE 22

0.44 g (0.00009 mol) of P104 was dissolved in 26.5 ml of ion-exchanged water. To this solution was added 5 ml of a 12N hydrochloric acid aqueous solution (HCl:0.061 mol) (total water amount: 1.67 mol). 1.42 g (0.00525 mol) of BTMe was added while stirring vigorously in a hot water bath at 45° C., and stirred further for another 10 hours without further work up. A monomer was added and a white precipitate formed within several minutes. The mixture was further stirred for 10 hours in a hot water bath at 70° C. Then, in the hot water bath at 70° C., 12 ml of a 3N sodium hydroxide aqueous solution (NaOH:0.036 mol) was added to this reaction solution, the mixture was stirred for 3 hours, and the white precipitate was filtered. The precipitate was washed twice with 300 ml of ion-exchanged water and then left overnight in a drying vessel at 45° C. to obtain precursor sample 79 (powder).

EXAMPLE 23
Structural Analysis of Samples 77 to 79

Figure 58:
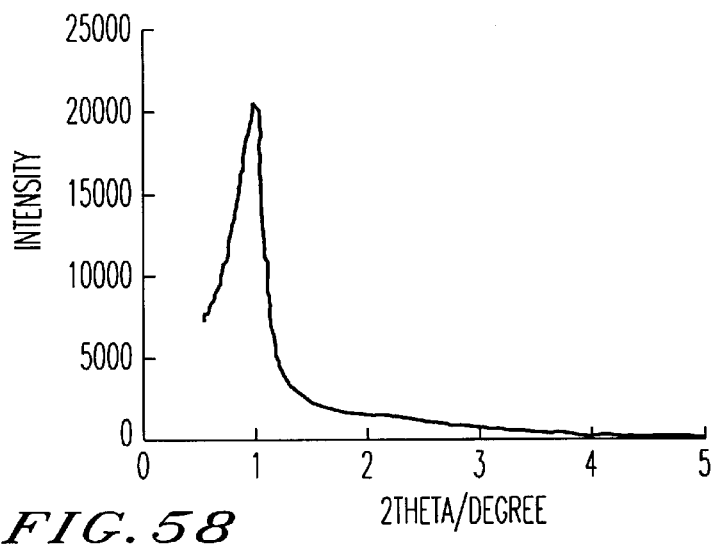
FIG. 58 is a view showing the XRD pattern of precursor sample 77.
Figure 59:
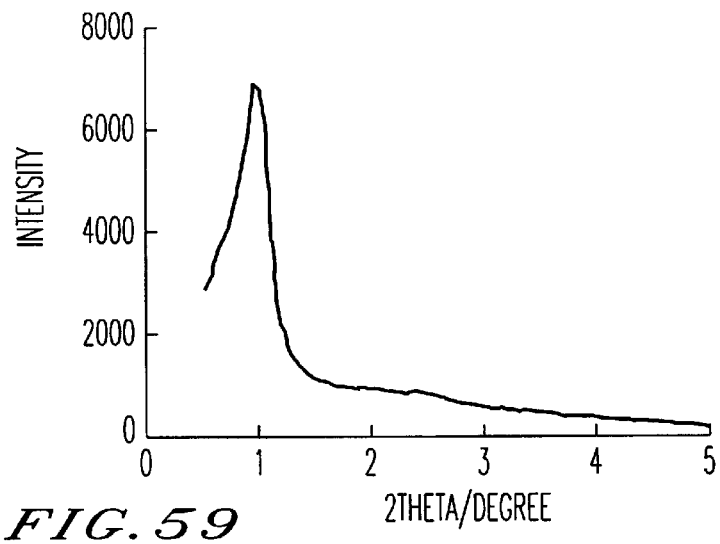
FIG. 59 is a view showing the XRD pattern of sample 78.
Figure 60:
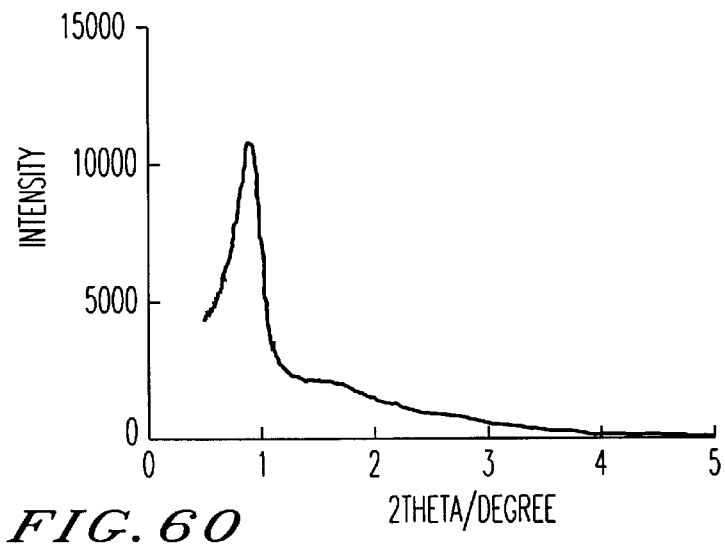
FIG. 60 is a view showing the XRD pattern of precursor sample 79.

Structure analysis of the products (samples 77 to 79) was performed by powder x-ray diffraction. FIG. 58 shows the XRD pattern of the lower angle ranges of a precursor sample 77. This precursor showed a strong peak of d=92.91 Å (2 θ=0.945) at a lower angle range and a weak shoulder peak at a higher angle side. FIG. 59 shows the XRD pattern of sample 78. After removal of the surfactant by ethanol solvent, the skeleton structure was maintained. d=95.54 Å ((2 θ=0.920). FIG. 60 shows the XRD pattern of precursor sample 79. This precursor showed a strong peak of d=94.91 Å (2 θ=0.930) and a weak shoulder peak at a higher angle side. When compared with precursor sample 77, a tendency to increase the degree of polycondensation in the skeleton was observed and regularity in the structure is improved by changing the pH of the reaction system from acidic to basic after production of a white precipitate.

Figure 61:
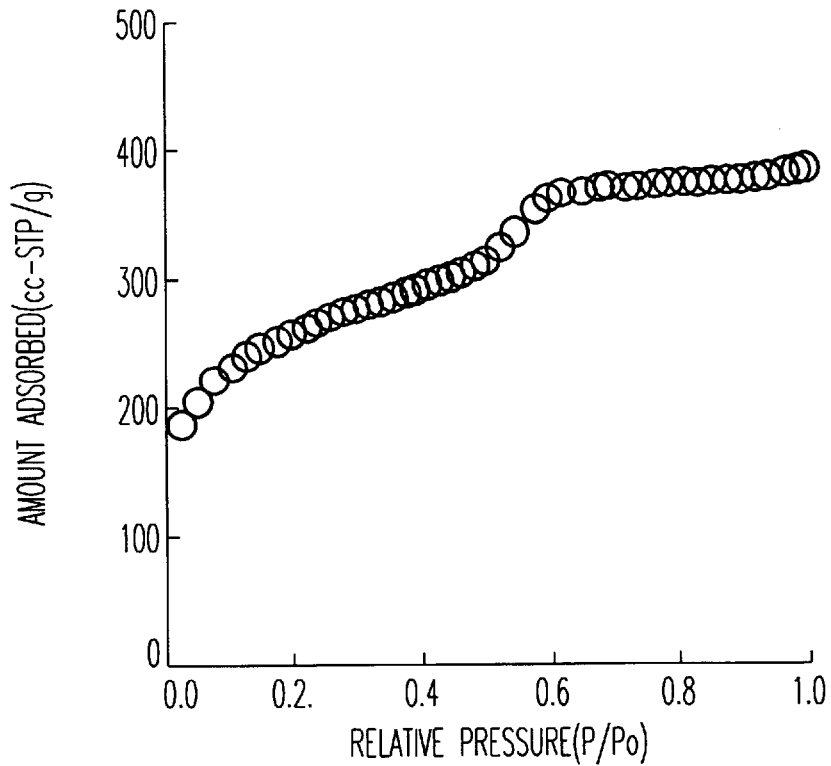
FIG. 61 is a view showing the nitrogen adsorption isotherm of sample 78.
Figure 62:
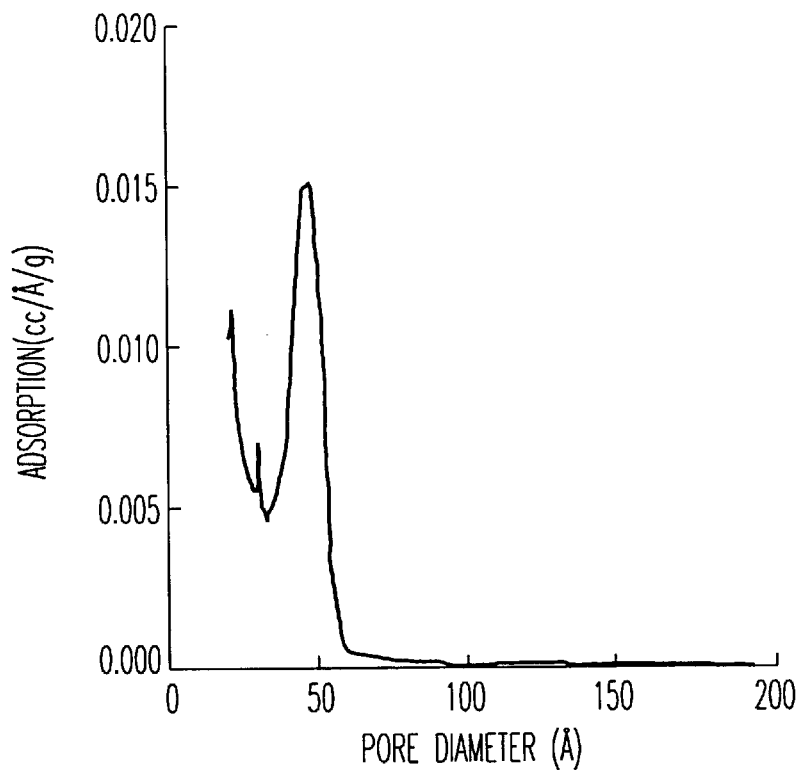
FIG. 62 is a view showing the pore size distribution curve according to the BJH method of sample 78.

Sample 78 was subjected to nitrogen adsorption measurement and FIG. 61 shows the nitrogen adsorption isotherm. Around the relative pressure of $P/P_o=0.5$, a steep rise in the adsorption amount by capillary condensation was observed, revealing the presence of pores. FIG. 62 shows the pore size distribution curve analyzed using a BJH method, in which it was found that the porous material had a pore diameter of 4.55 nm. 90% or more of the total pore volume was contained in the range of ±40% of the mean pore diameter. The BET specific surface area was 878.1 $m^2/g$ and the pore wall thickness was at least 6.53 nm.

What is claimed is:

1. A porous material comprising:
   a mesoporous material having pores, in which at least 60% total pore volume is within a range of ±40% from a mean pore diameter or at least one peak is present in an x-ray diffraction pattern at a diffraction angle corresponding to a d value of at least 1 nm and comprising:
   a skeleton comprising at least two metal atoms, at least one oxygen atom and at least one organic group bound to at least two metal atoms.

2. The porous material of claim 1, wherein the organic group is at least one group selected from an alkylene group, an alkenylene group, alkynylene group, phenylene group, hydrocarbons containing a phenylene group, organic groups derived from compounds having at least one carbon atom, an amido group, amino group, imino group, mercapto group, sulfone group, carboxyl group, ether group and acyl group.

3. The porous material of claim 1, wherein the organic group is selected from the group consisting of an alkyl group having a valency of at least two, an alkenyl group having a valency of at least two and an aromatic ring-containing a hydrocarbon group having a valency of at least two.

4. The porous material of claim 1, wherein the at least two metal atoms are selected from the group consisting of silicon, aluminum, zirconium, tantalum, niobium, tin, hafnium, magnesium, molybdenum, cobalt, nickel, gallium, beryllium, yttrium, lanthanum, lead and vanadium.

5. The porous material of claim 1, having a mean pore diameter of from about 1 nm to about 30 nm.

6. The porous material of claim 1, wherein the metal atoms are silicon.

7. The porous material of claim 1, wherein the porous material has a shape selected from the group consisting of a two-dimensional hexagonal structure, a three-dimensional hexagonal structure, a cubic structure, a lamella structure and an irregular structure.

8. The porous material of claim 1, wherein the porous material is a particle having a spherical shape or a hexagonal rod shape.

9. The porous material of claim 1, wherein the mesoporous material has a specific surface area of at least 700 $m^2/g$.

10. The porous material of claim 1, wherein the organic group is selected from the group consisting of an alkyl group having a valency of at least two, an alkenyl group having a valency of at least two and an aromatic ring-containing a hydrocarbon group having a valency of at least two, the metal atom is silicon, the mean pore diameter is from about 1 nm to about 30 nm and the mesoporous material has a specific surface area that is at least 700 $m^2/g$.

11. A method for forming a porous material comprising:
    polycondensing an organometallic compound in the presence of a surfactant, the organometallic compound comprising an organic group bound to at least two metal atoms, and a hydrolysis group bound to at least one of the at least two metal atoms.

12. The method of claim 11, wherein the organic group is at least one group selected from an alkylene group, an alkenylene group, alkynylene group, phenylene group, hydrocarbons containing a phenylene group, organic groups derived from compounds having at least one carbon atom, an amido group, amino group, imino group, mercapto group, sulfone group, carboxyl group, ether group and acyl group.

13. The method of claim 11, wherein the organometallic compound comprises at least one group consisting of an alkyl group which has a valency of at least two, an alkenyl group which has a valency of at least two and an aromatic ring-containing hydrocarbon group which has a valency of at least two.

14. The method of claim 11, wherein said at least two metal atoms are selected from the group consisting of silicon, aluminum, zirconium, tantalum, niobium, tin, hafnium, magnesium, molybdenum, cobalt, nickel, gallium, beryllium, yttrium, lanthanum, lead and vanadium.

15. The method of claim 11, wherein said metal atoms are silicon.

16. The method of claim 11, wherein said organometallic compound is selected from the group consisting of structures (1), (2), (3), (4), (5), and (6), wherein structure (1) is:

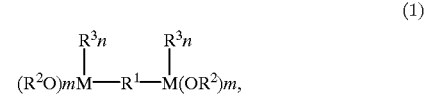

structure (2) is:

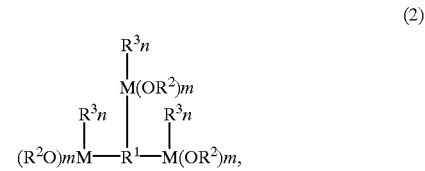

structure (3) is:

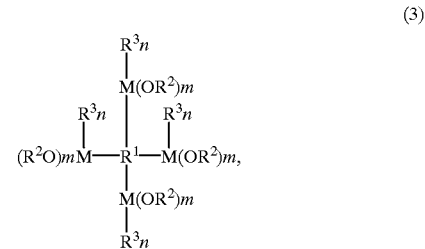

structure (4) is:

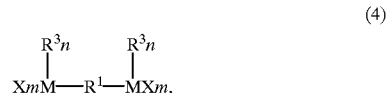

structure (5) is:

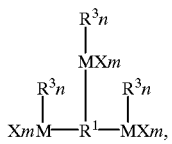

and structure (6) is:

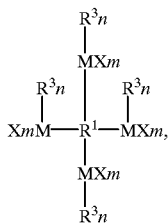

and wherein
each respective M is a metal atom,
each respective $R^1$ is an organic group,
each respective $R^2$ is a hydrocarbon group,
each respective $R^3$ is a hydrogen atom, hydroxyl group, or hydrocarbon group,
m is an integer of at least 1, and
n is an integer of 0 or more obtained by subtracting (m+1) from the valency of a metal atom M.

17. The method of claim 11, wherein said surfactant is an alkyltrimethylammonium compound having an alkyl chain of about 8 to 18 carbon atoms or a triblock copolymer having polyalkylene oxide chains.

18. The method of claim 11, wherein said polycondensation reaction is performed at a pH greater than 7.

19. The method of claim 11, wherein the hydrolysis group is an alkoxyl group or a halogen group.

20. The method of claim 19, wherein the organometallic compound comprises at least one of an alkyl group which has a valency of at least two, an alkenyl group which has a valency of at least two or an aromatic ring-containing hydrocarbon group which has a valency of at least two and the organometallic compound contains at least one of an amino group, an amido group, a mercapto group, a sulfone group or a carboxyl group, the metal atom is silicon, the surfactant is an alkyltrimethylammonium having an alkyl chain of about 8 to 18 carbon atoms or a triblock copolymer having polyalkylene oxide chains and the polycondensation reaction is performed at a pH greater than 7.

21. A method for forming a porous material comprising:
polycondensing at least a first compound and a second compound, wherein the first compound is an organometallic compound having an organic group bound to at least two metal atoms, and at least one hydrolysis group bound to each metal atom, and the second compound has at least one hydrolysis group bound to a metal atom.

22. The method of claim 21, wherein said hydrolysis group is an alkoxyl group or a halogen group.

23. The porous material of claim 1, wherein the organic group is a polar organic group.

24. The porous material of claim 1, wherein the organic group is a nonpolar organic group.

25. A porous material formed by:
polycondensing an organometallic compound in the presence of a surfactant, the organometallic compound comprising an organic group bound to at least two metal atoms, and a hydrolysis group bound to at least one of the two metal atoms.

26. A porous material comprising
a mesoporous material having pores, in which at least 60% total pore volume is within a range of ±40% from a mean pore diameter or at least one peak is present in an x-ray diffraction pattern at a diffraction angle corresponding to a d value of at least 1 nm and comprising:
a skeleton comprising at least two metal atoms, at least one oxygen atom and at least one organic group having a valency of at least two.

* * * * *